(12) United States Patent
Castagnetti et al.

(10) Patent No.: US 6,961,522 B1
(45) Date of Patent: Nov. 1, 2005

(54) AUTOMATIC RAMAN GAIN AND TILT CONTROL FOR ULTRA-LONG-DISTANCE DENSE WDM OPTICAL COMMUNICATION SYSTEM

(75) Inventors: Roberta Castagnetti, Monza (IT); Fabrizio Di Pasquale, Milan (IT); Giorgio Grasso, Monza (IT); Fausto Meli, Piancenza (IT); Giovanni Sacchi, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 09/717,036

(22) Filed: Nov. 22, 2000

(51) Int. Cl.$^7$ .......................... H04J 14/02; H04B 10/00
(52) U.S. Cl. .......................... 398/92; 398/81; 398/157; 398/160
(58) Field of Search .............................. 398/30, 32, 33, 398/79, 92, 94, 157

(56) References Cited

U.S. PATENT DOCUMENTS

| | | | |
|---|---|---|---|
| 5,117,196 A | 5/1992 | Epworth et al. | 359/333 |
| 5,245,690 A | 9/1993 | Aida et al. | 385/142 |
| 5,268,786 A | 12/1993 | Matsushita et al. | 359/341 |
| 5,311,347 A | 5/1994 | Kubo et al. | 359/176 |
| 5,463,487 A | 10/1995 | Epworth | 359/124 |
| 5,497,264 A | 3/1996 | Bayart et al. | 359/337 |
| 5,506,724 A | 4/1996 | Shimizu et al. | 359/341 |
| 5,510,926 A | 4/1996 | Bayart et al. | 359/179 |
| 5,636,054 A | 6/1997 | Artigaud et al. | 359/341 |
| 5,644,423 A | 7/1997 | Iwano | 359/337 |
| 5,675,432 A | 10/1997 | Kosaka | 359/341 |
| 5,701,194 A | 12/1997 | Meli et al. | 359/341 |
| 5,850,302 A | 12/1998 | Strasser et al. | 398/93 |
| 5,852,510 A | 12/1998 | Meli et al. | 359/341 |
| 5,903,385 A | 5/1999 | Sugaya et al. | 359/341.42 |
| 6,025,954 A | 2/2000 | Meli et al. | 359/341 |
| 6,049,413 A | 4/2000 | Taylor et al. | 359/337 |
| 6,091,539 A | 7/2000 | Kosaka et al. | 359/341.41 |
| 6,215,583 B1 | 4/2001 | Lagerstrom et al. | 359/341.1 |
| 6,219,176 B1 | 4/2001 | Terahara | 359/341.1 |
| 6,233,091 B1 | 5/2001 | Kosaka et al. | 359/341.1 |
| 6,259,542 B1 | 7/2001 | Saunders | 398/28 |
| 6,259,555 B1 | 7/2001 | Meli et al. | 359/337 |
| 6,275,330 B1 | 8/2001 | Izumi | 359/341.42 |
| 6,323,994 B1 | 11/2001 | Li et al. | 359/341.1 |
| 6,347,169 B1 | 2/2002 | Kang et al. | 385/24 |
| 6,388,801 B1 | 5/2002 | Sugaya et al. | 359/334 |
| 6,433,903 B1 * | 8/2002 | Barry et al. | 398/79 |

FOREIGN PATENT DOCUMENTS

| | | |
|---|---|---|
| EP | 0 395 277 | 10/1990 |
| EP | 0 734 129 | 9/1996 |
| EP | 0 782 289 | 7/1997 |
| GB | 2294170 | 4/1996 |

* cited by examiner

Primary Examiner—Jason Chan
Assistant Examiner—Dzung Tran
(74) Attorney, Agent, or Firm—Ritter, Lang & Kaplan LLP

(57) ABSTRACT

An approach for automatic Raman gain and tilt control for a WDM (Wavelength Division Multiplexing) optical communication systems is disclosed. An optical fiber carries a plurality of optical signals, in which at least one of the optical signals are reference signals. An optical gain unit (e.g., Raman pump unit) couples to the optical fiber and adjusts the reference signals to compensate, in part, for losses associated with the optical fiber and gain tilt accumulation. Upon detecting and analyzing the reference signals, a controller controls the optical gain unit and outputs a control signal to the optical gain unit based upon the analyzed reference signals. An optical amplifier is connected to the optical fiber and amplifies the optical signals. The optical gain unit provides a nearly constant power per channel at an input of the optical amplifier. Under this approach, a Raman gain control mechanism, combined with the use of gain controlled EDFA (Erbium Doped Fiber Amplifier), allows high transmission capacity over ultra-long distances without optical regeneration and with high flexibility.

57 Claims, 52 Drawing Sheets

Fig. 24: Gain versus input signal power Channel 1592 nm

Fig. 26: Gain Equalising Filter (every three spans) with counter-propagant Raman pumping Fig. 27: Output spectrum (NZDS Fiber 25x23 dB) without refernce channels Fig. 28: OSNR (25x23 dB, NZDS Fiber) with 32 channels without reference channels Fig. 37: Spectrum (end of span 1) with tilted TPA and without tilt control Fig. 38: Spectrum (end of span 1) with tilted TPA and tilt control Fig. 39: Gain Equalising Filter (every three spans) with Bidirectional Raman Pumping Fig. 40: Co-propagant Raman gain saturation Fig. 41: Bi-directional raman gain saturation

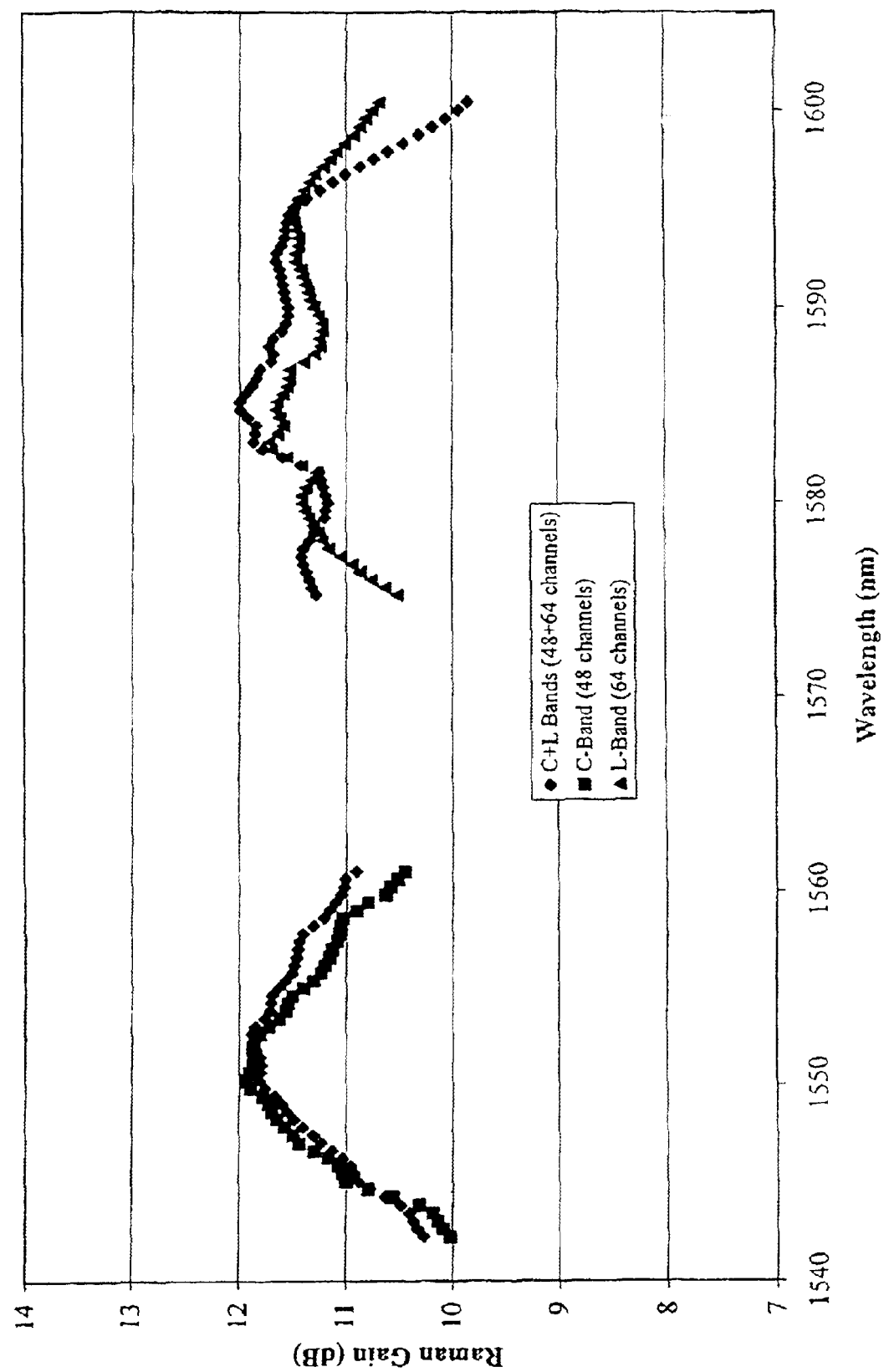
Fig. 50: Raman Gain for dual-band and single band systems

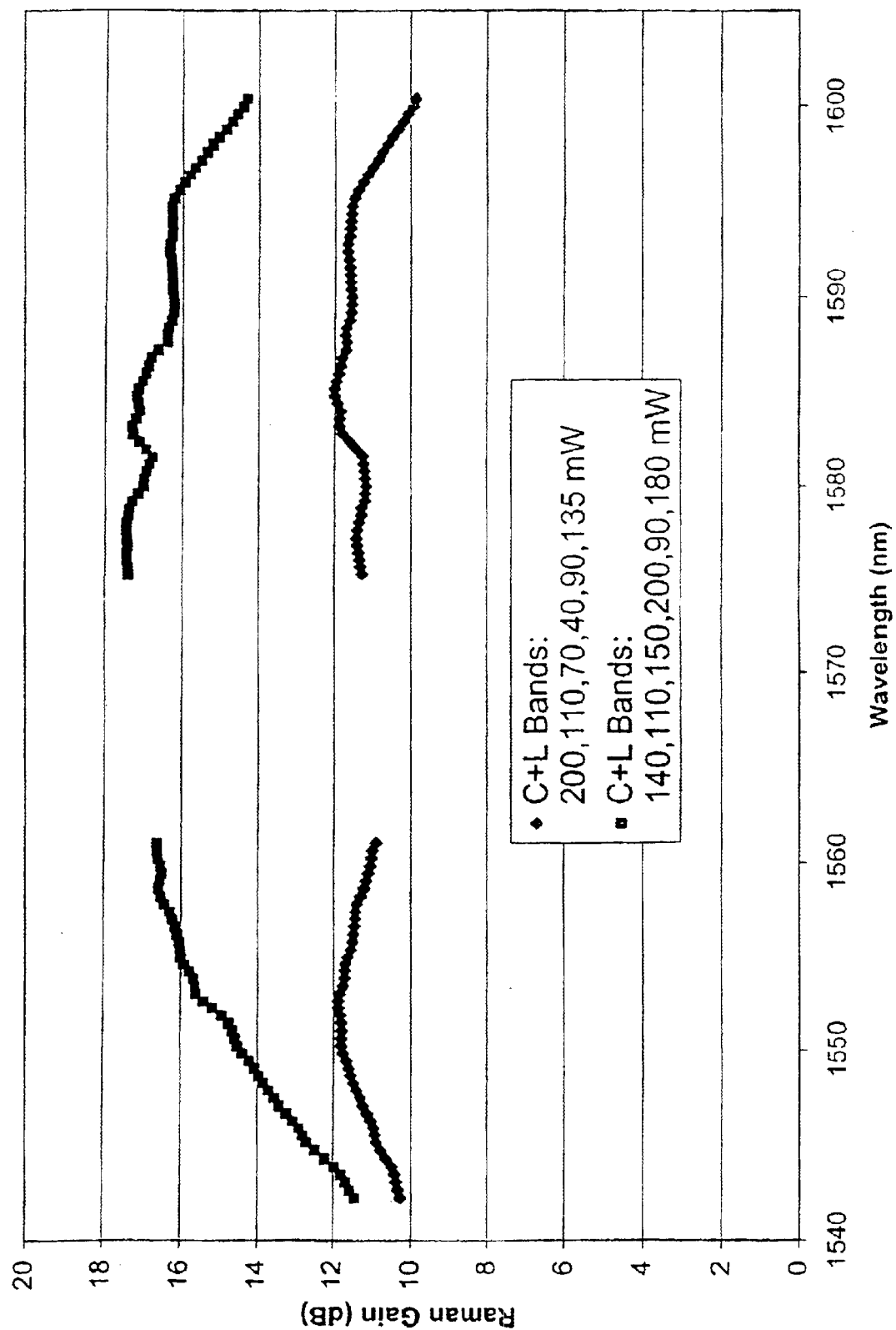

AUTOMATIC RAMAN GAIN AND TILT CONTROL FOR ULTRA-LONG-DISTANCE DENSE WDM OPTICAL COMMUNICATION SYSTEM

BACKGROUND OF THE INVENTION

Field of the Invention

The present invention relates to optical communication systems, and is more particularly related to providing automatic gain and tilt control for WDM (wavelength division multiplexing) optical communication systems.

Discussion of the Background

The explosion of communication services, ranging from video teleconferencing to electronic commerce, has spawn a new era of personal and business interactions. As evident in the enormous growth of Internet traffic, consumers have begun to embrace information technology, viewing it, in some cases, as much a necessity as the telephone. However, this new mindset poses many challenges to the telecommunication industry to develop technology that will greatly expand the bandwidth limitations of existing communication systems. Optical communications holds great promise to meet the continual demands for greater and greater bandwidth.

Wavelength Division Multiplexing (WDM) technology, in particular Dense WDM (DWDM), permits the concurrent transmission of multiple channels over a common optical fiber. The advent of Erbium Doped Fiber Amplifiers (EDFA) has accelerated the development of WDM systems by providing a cost-effective optical amplifier that is transparent to data rate and format. EDFAs amplify all the wavelengths simultaneously, enabling the composite optical signals to travel large distances (e.g., 600 km) without regeneration. Further, many advances in EDFA components and performance are underway to increase the bandwidth of EDFAs even more.

Not surprisingly, Internet services over WDM systems have garnered tremendous attention in the telecommunications industry. Notably, the industry has focused on the design of ultra-long systems (e.g., 1500–3000 km) that are capable of transporting high number of channels without optical regeneration.

In addition to EDFAs, Distributed Raman amplification (DRA) provides very high gain across a wide range of wavelengths. DRA, thus, increases the distance between optical regeneration, while allowing closer channel spacing. The operation of DRA involves transmitting high-power laser lights in counter-propagating or bi-directional configurations with respect to the propagation direction of the WDM signals. These high-power laser lights amplify the WDM signals. There has been some research in deploying EDFAs in conjunction with DRAs.

However, there exists technical obstacles in the successful implementation of these two amplifiers with each other. Specifically, the behavior of distributed Raman amplifiers cannot be precisely predicted because of the dependency of these amplifiers on the particular transmission fiber characteristics. A conventional ultra-long WDM system utilizes numerous cascaded amplifiers and varying types of optical fibers. Such WDM systems are plagued with span losses, not to mention losses arising from add/drop operation and channel upgrades. Thus, gain tilt and gain variation present substantial barriers to achieving a practical implementation of an ultra-long WDM system.

Even a small gain tilt or gain variation, which is locally introduced by the EDFA and/or DRA, can accumulate over very long distances, resulting in detrimental effects to the WDM system, such as increased bit-errors. To mitigate some of the non-linear effects of the transmission fibers and EDFA and OSNR (optical Signal-to-Noise Ratio) degradations, gain equalizing filters are typically employed periodically along the fiber link. However, accumulated gain tilt and gain variation pose difficulty in the design of these filters.

Although a variety of gain control mechanisms have been developed for the EDFA, little work has been done for DRAs. Traditional control mechanisms lack the flexibility to adapt to the operational conditions of the WDM system, as mentioned above. A precise gain control mechanism that ensures acceptable OSNR performances is required to make these WDM systems practical.

Based on the foregoing, there is a clear need for providing a mechanism to automatically adapt to varying transmission and operational environments of an optical communication system.

There is also a need to extend transmission distance of a fiber transmission system.

There is also a need to minimize the non-linear effects of the transmission fibers.

There is also a need to provide a robust system that is tolerant of channel upgrades, add/drop operation, variable span losses, and varying fiber types.

There is a further need to increase signal-to-noise ratio performance.

Based on the need to improve the performance of an optical communication system, an approach for providing automatic gain and tilt control is highly desirable.

SUMMARY OF THE INVENTION

According to one aspect of the invention, a method for providing automatic gain and tilt control in a WDM (wavelength division multiplexing) optical communication system is disclosed. The method includes receiving at least one reference signal over an optical fiber span. The method also includes detecting the reference signals and analyzing the reference signals to determine, in part, power variation of the reference signals. The method further encompasses outputting a control signal to adjust the reference signals to compensate, in part, for signal power variations and gain tilt accumulation. The method also includes controlling an optical gain unit in response to the control signal. Under this approach, transmission distance of a fiber transmission system is extended.

According to another aspect of the invention, a system for providing automatic gain and tilt control comprises an optical fiber that carries a plurality of optical signals, in which at least one of the optical signals is a reference signal. An optical gain unit is coupled to the optical fiber and is configured to output lights to compensate, in part, for losses associated with the optical fiber and gain tilt accumulation. A controller is configured to control the optical gain unit; the controller detects and analyzes the reference signals. The controller outputs a control signal to the optical gain unit based upon the analyzed reference signals to determine, in part, power variation of the reference signals. An optical Erbium doped fiber amplifier is coupled to the optical fiber and is configured to amplify the optical signals; the Raman optical gain unit provides nearly constant power per channel at an input of the optical amplifier. The above arrangement advantageously minimizes the non-linear effects of the transmission fibers.

According to yet another aspect of the invention, an optical device for providing automatic gain and tilt control in a WDM comprises an input that is coupled to an optical fiber. The input receives a plurality of reference signals. A plurality of photodiodes are configured to convert the reference signals to corresponding electrical signals. A controller is coupled to the photodiodes and is configured to output a control signal to at least one of a Raman pump unit or a variable optical attenuator for adjusting the reference signals to compensate, in part, for gain tilt and gain variation based upon the reference signals. The above arrangement advantageously increases signal-to-noise ratio performance.

According to yet another aspect of the invention, a WDM (wavelength division multiplexing) optical communication system for providing automatic gain and tilt control comprises an optical fiber that carries a plurality of optical signals, in which at least one of the optical signals is a reference signal. A light emitting means is coupled to the optical fiber for outputting lights to compensate, in part, for losses associated with the optical fiber and gain tilt accumulation. A controlling means controls the light emitting means; the controlling means detects and analyzes the reference signal to determine, in part, power variation of the reference signal. The controlling means outputs a control signal to the optical gain unit based upon the analyzed reference signal. An amplifying means is coupled to the optical fiber for amplifying the optical signals, wherein the light emitting means provides a constant power per channel at an input of the amplifying means. Under this approach, the non-linear effects of the optical communication system are minimized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 50 is a graph of the Raman gain for dual-band and single-band WDM systems; and FIG. 51 is a graph of a comparison of Raman gain for dual-band WDM systems.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides compensation for gain tilt accumulation in a WDM optical communication system. In particular, the gain and flatness of the distributed Raman amplifiers are controlled using two reference signals. This feature, combined with a suitable gain control scheme for the EDFA, allows the WDM system to be automatically adapted to different signals are positioned at the two boundaries of each sub-band. The reference signals can also coincide with transmitted signals within the system band. These reference signals are locally detected at each amplification site (e.g., line site and receiving terminal) of the system and are electronically processed. Signal processing is performed on these two reference signals, in which their relative power difference and average power are computed to control the counter-propagating Raman pump units and consequently the Raman gain characteristics.

Although the present invention is discussed with respect to ultra-long-haul dense WDM systems, the automatic gain and tilt control system has application to other types of WDM optical communication systems.

Figure 1:
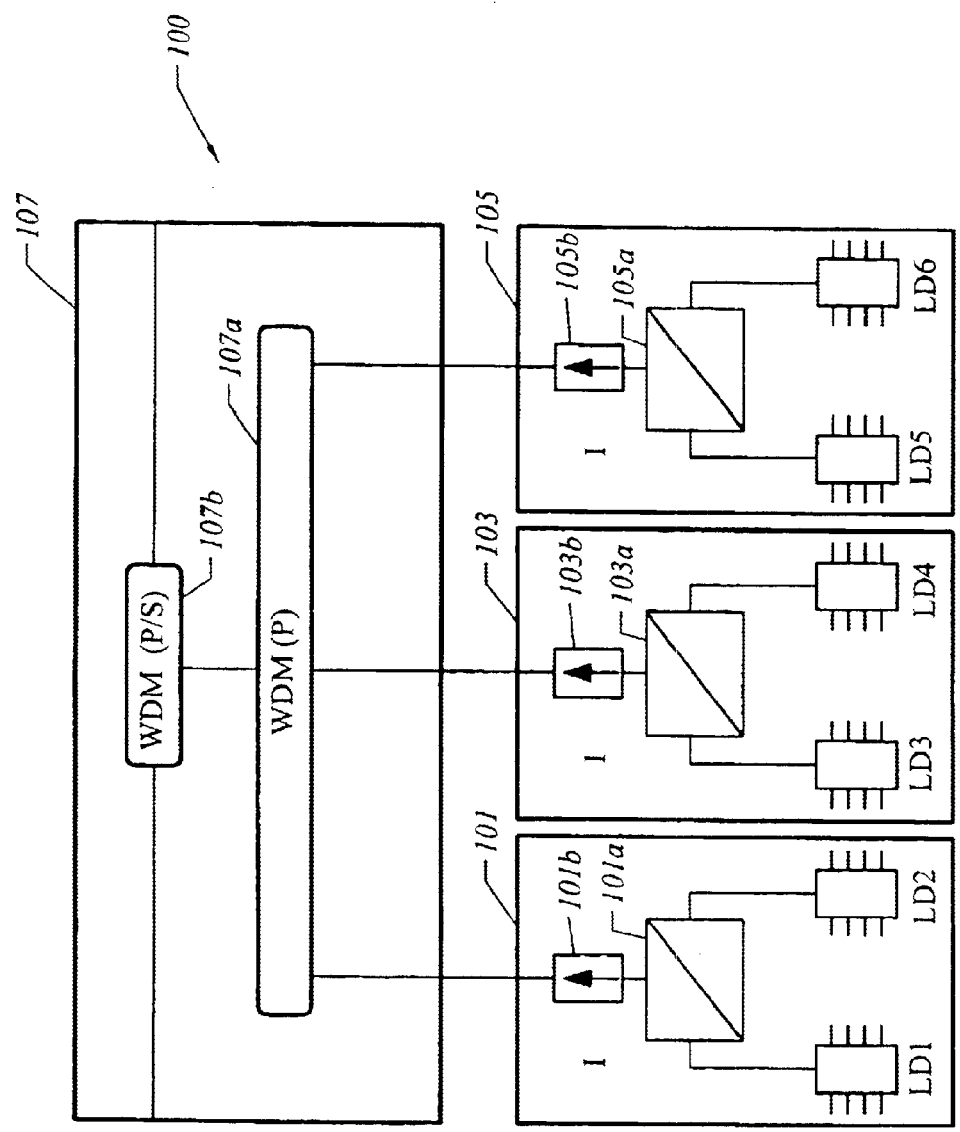
FIG. 1 is a block diagram of Raman pump unit (RPU) that is based on polarization and wavelength multiplexing, in accordance with an embodiment of the present invention.

FIG. 1 shows a Raman pump unit (RPU) employing polarization and wavelength multiplexing, in accordance with an embodiment of the present invention. Stimulated Raman scattering (SRS) is a nonlinear process, which can be exploited to provide gain in transmission optical fibers. Incident light at a given frequency acts as a pump for generating new light components at lower frequencies. This effect can be used to amplify optical signals by injecting co-propagant and/or counter-propagant pump light into the transmission fiber; for silica fibers, the gain has a large bandwidth ($\cong$40 THz) with a peak, which is positioned at frequencies that are downshifted by about 13 THz.

For a given signal-to-noise ratio (SNR) that is required at the system output, stimulated Raman scattering permits reduction of the fiber input power per channel, and consequently minimizes the fiber nonlinear effects. Moreover, as DRAs are less noisy than EDFAs, their use not only reduces nonlinear effects, but also improves the SNR performance.

As seen in FIG. 1, the Raman pump unit (RPU) 100 includes multiple pump lasers 101, respective Fabry-Perot laser diodes (LD1–LD6). Specifically, pump laser 101 contains two Fabry-Perot laser diodes LD1 and LD2, which are fed into a pump-polarization-multiplexer (P-P-MUX) 101a. The P-P-MUX 101a is coupled to an optical isolator 101b. Similarly, pump laser 103 utilizes a P-P-MUX 103a that connects to two laser diodes LD3 and LD4. The P-P-MUX 103a is connected to an optical isolator 103b. Pump laser 105 also has the same arrangement of components as pump lasers 101 and 103; these components include two Fabry- Perot laser diodes LD5 and LD6, a P-P-MUX 105a, and an optical isolator 105b. For each module 101, 103, 105 the two Fabry-Perot laser diodes are centered at the same wavelength. The three modules 101, 103, 105 provide three polarization multiplexed laser lights at three different wavelengths. It is recognized by one of ordinary skill in the art that any other types of laser diodes can be employed, in addition to the Fabry-Perot laser diodes.

The outputs of the pump modules 101, 103, and 105 are sent to an optical circuit 107 of the RPU 100. The optical circuit 107, which includes a WM(P (Pump)) 107a performs wavelength multiplexing of the optical laser lights from pump module 101, 103 and 105. The WDM (P/S (Pump/Signal) 107b), performs wavelength multiplexing of the WDM signals and WDM pump lights. It should be noted that polarization-multiplexing eliminates the polarization dependence of the Raman gain; on the other hand, wavelength-multiplexing yields large Raman gain bandwidths.

Figure 2A:
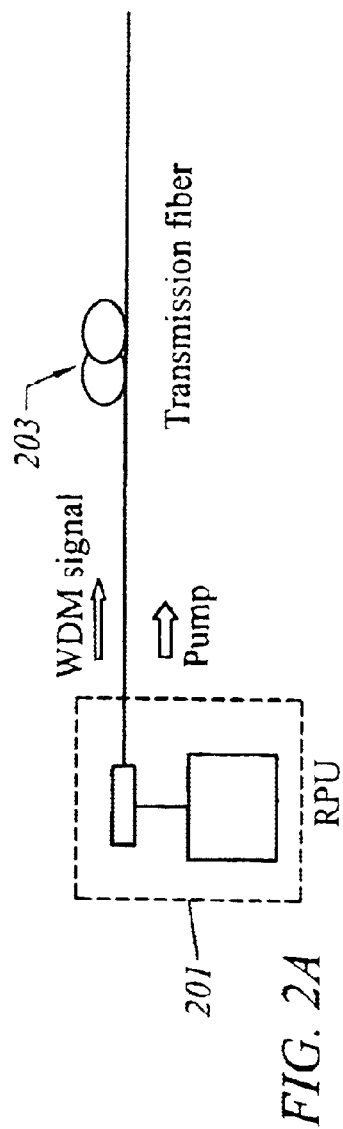
FIGS. 2A–2C are block diagrams of co-propagant, counter-propagant and bi-directional Raman pumping configurations, respectively, in accordance with embodiments of the present invention.
Figure 2B:
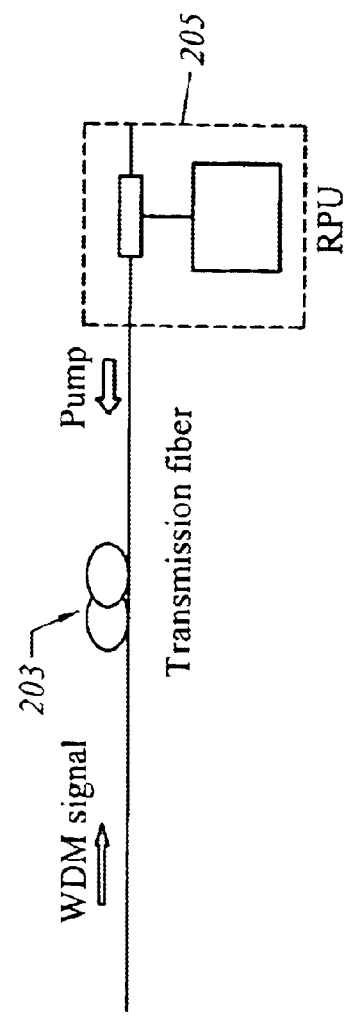
Figure 2C:
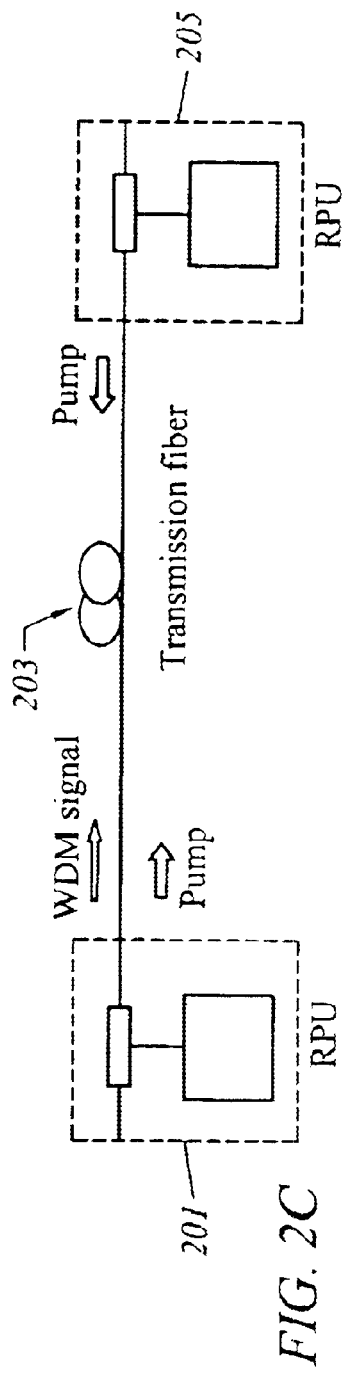

The Raman pump unit 100 can provide up to 600 mW into a transmission fiber and can be used in both co-propagant and counter-propagant configurations as shown in FIGS. 2A–2C.

FIGS. 2A–2C show block diagrams of co-propagant, counter-propagant and bi-directional Raman pumping configurations, respectively, in accordance with various embodiments of the present invention. As more fully discussed below, the gain of distributed Raman amplifiers can be controlled to adapt the WDM system to different span losses, wherein concurrently controlling their spectral gain shape can compensate for gain tilt accumulation along the fiber link that is particularly detrimental for the performance of ultra-long distance WDM systems. In FIG. 2A, the RPU 201 is arranged in a co-propagant configuration. The RPU 201 is coupled to an optical transmission fiber 203, which carries a WDM signal in a given direction. The co-propagant RPU 201 pumps light into the fiber 203 in the same direction as the WDM signal. By contrast, FIG. 2B shows a RPU configuration in which the RPU 205 pumps the transmission fiber 203 in the opposite direction from that of the WDM signal. In another configuration, two RPUs 201 and 205 simultaneously pump the fiber 203 in two different directions. The output of RPU 201 is in the same direction as the WDM signal.

Automatic Raman gain and tilt control, according to various embodiments of the present invention, can be applied to WDM optical communication systems using both counter-propagant and bi-directional Raman pumping schemes. However, in both cases, it should be noted that the gain control is applied with respect only to the counter-propagant Raman pump unit.

Figure 3:
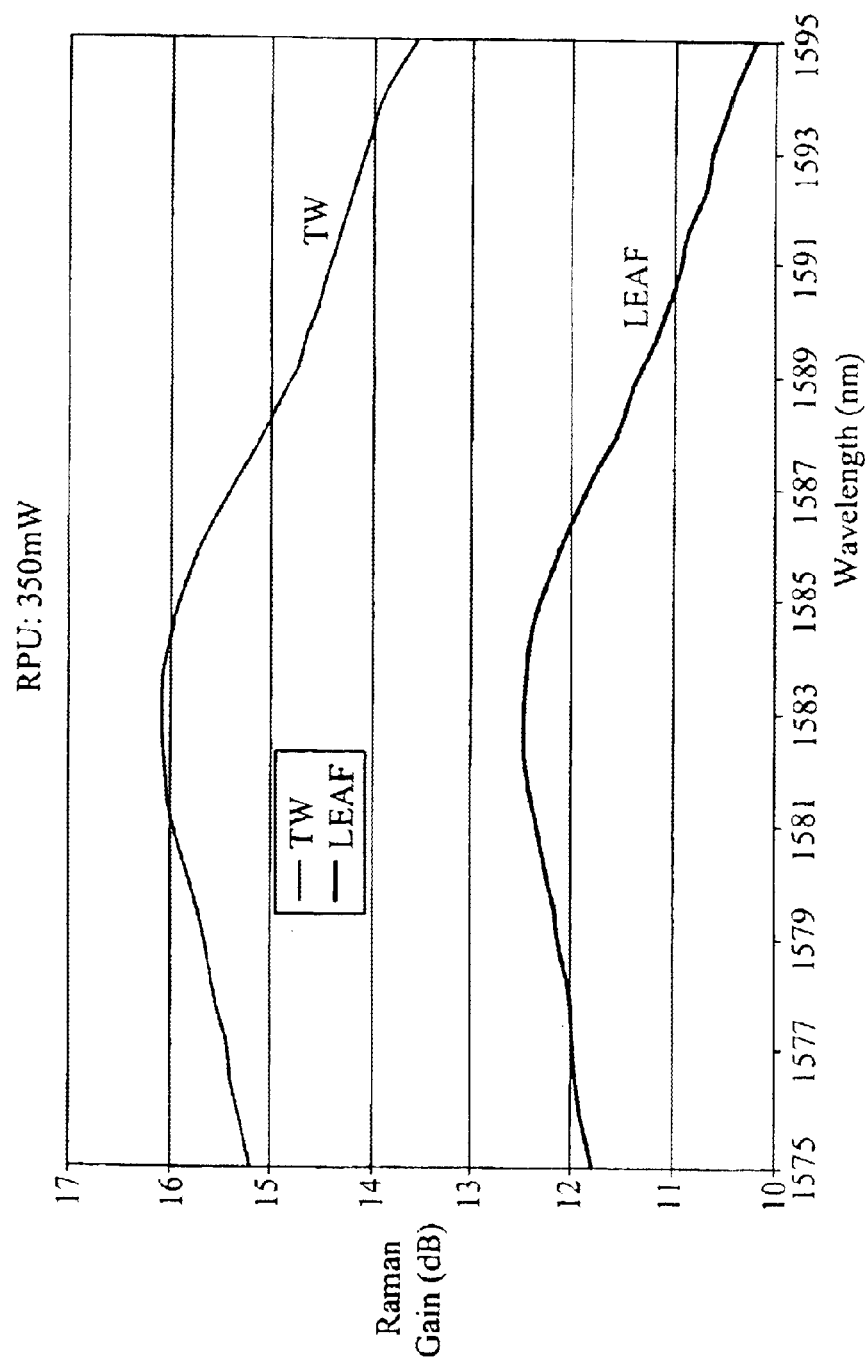
FIG. 3 is a graph of a comparison of Raman gain spectra for two non-zero dispersion-shifted (NZDS) fibers (e.g., LEAF® and TRUE-WAVE®)

FIG. 3 is a graph of a comparison of Raman gain spectra for two non-zero dispersion-shifted (NZDS) fibers. With fixed pump power and wavelength, the Raman gain depends on the transmission fiber characteristics, as seen in FIG. 3, which compares the linear Raman gain of two exemplary fibers in a counter-propagant direction with 350 mW pump power. In this example, the NZDS fibers are a TRUE-WAVE® fiber, which is produced by Lucent Technologies Inc. and LEAF®(Large-Effective-Area Fiber) fiber, which is manufactured by Corning, Inc. Both TRUE-WAVE® and LEAF® fibers exhibit similar spectral gain characteristics over the same wavelength range. However, the TRUE-WAVE® fibers exhibit about a 3.50 dB higher Raman Gain over the LEAF® fibers.

Figure 4:
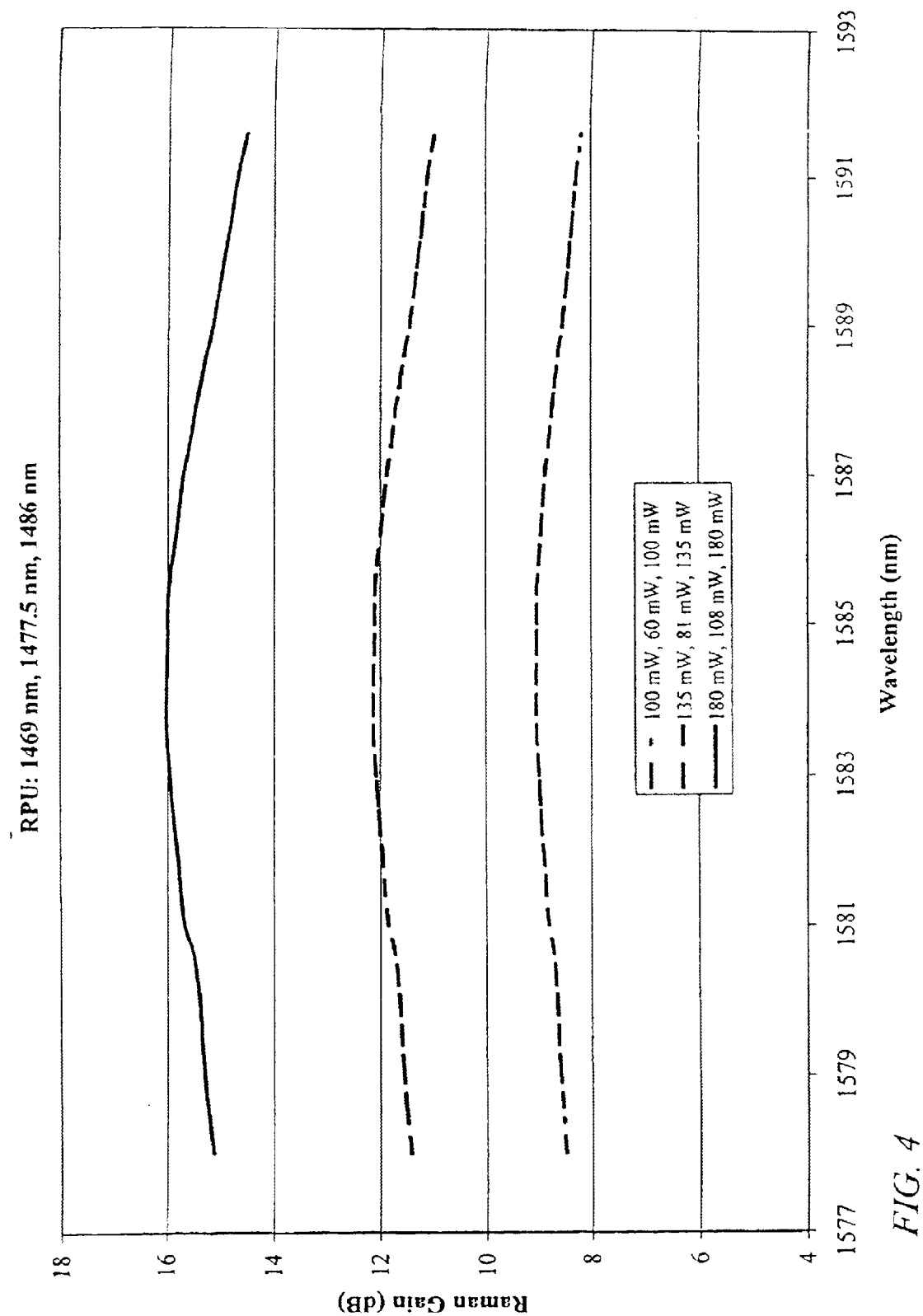
FIG. 4 is a graph showing Raman gain saturation for a non-zero dispersion-shifted fiber.

FIG. 4 is a graph showing Raman gain saturation for a non-zero dispersion-shifted fiber. It should be noted that the Raman gain, with a given fixed pump power and fiber characteristics, depends on the input signal power. FIG. 4 specifically shows the Raman gain for a non-zero dispersion-shifted fiber in a co-propagant direction at different input signal powers. In an exemplary embodiment, the NZDS LEAF® fiber exhibits minimal dispersion across the 1550 nm operating window and an effective area of 72 $\mu$m (e.g., the LEAF® fiber by Corning). It is observed that the saturation does not substantially change the gain spectral shape around its peak. For a given fiber, the Raman gain and associated spectral shape strongly depend on the pump power and wavelength of the multiplexed Fabry-Perot lasers LD1–LD6 (FIG. 1). Accordingly, it is possible to control the value and flatness of the Raman gain by controlling these laser diodes LD1–LD6.

Figure 5:
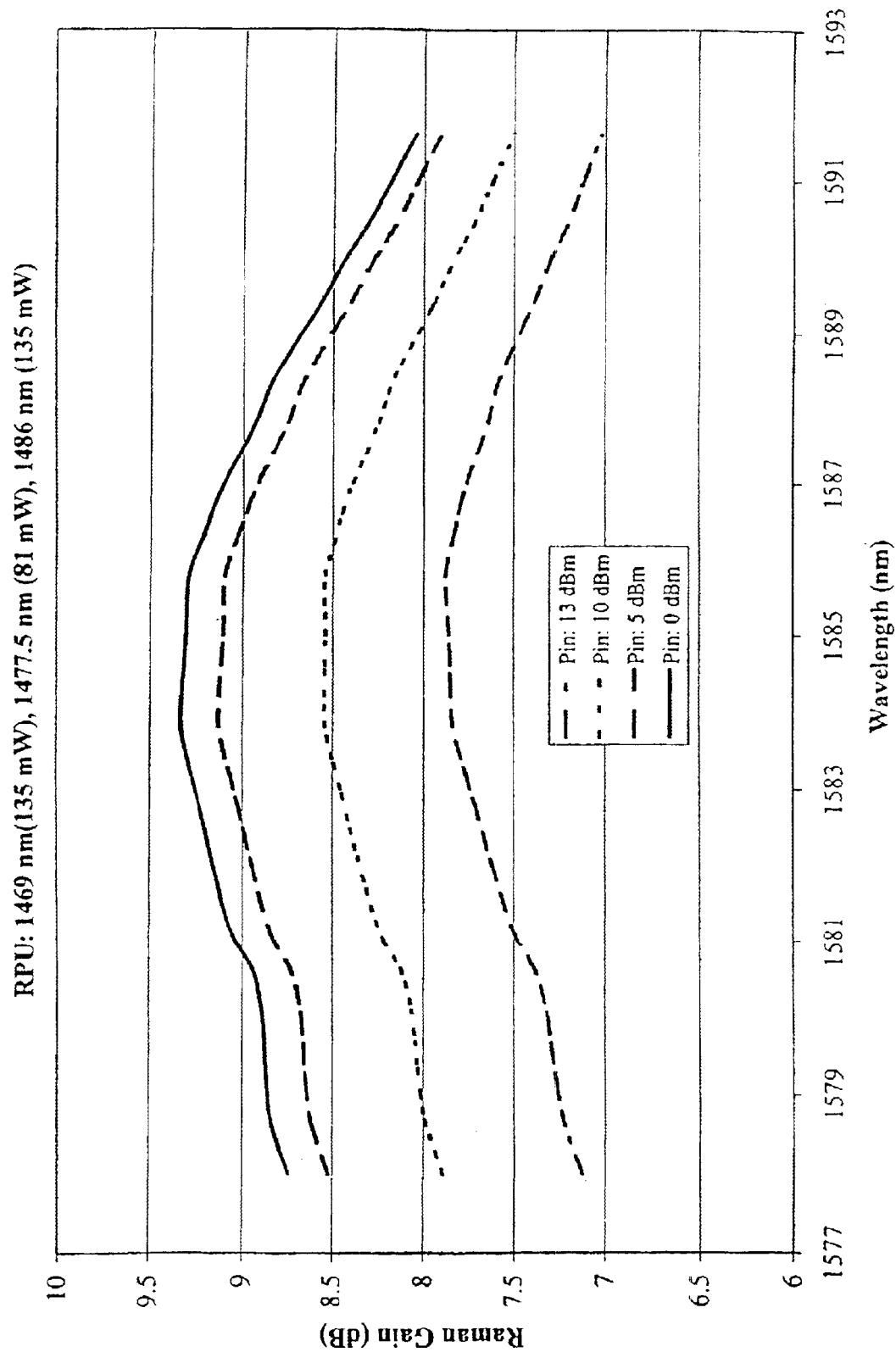
FIG. 5 is a graph showing Raman gain for a non-zero dispersion shifted fiber at different total pump power levels.

FIG. 5 shows the gain of a non-zero dispersion-shifted fiber with counter-propagant pumping at different total pump powers. The profile of the NZDS fiber resembles that of FIG. 4. The graph reveals that by attenuating the total pump power, or by proportionally reducing the driving current of each laser diode (e.g., LD1–LD6 ) of the Raman pump unit (e.g., 100), reduction of the Raman gain can be achieved without affecting the spectral gain. This feature can be exploited in a WDM optical communication system to adapt the Raman gain to different span losses.

Figure 6:
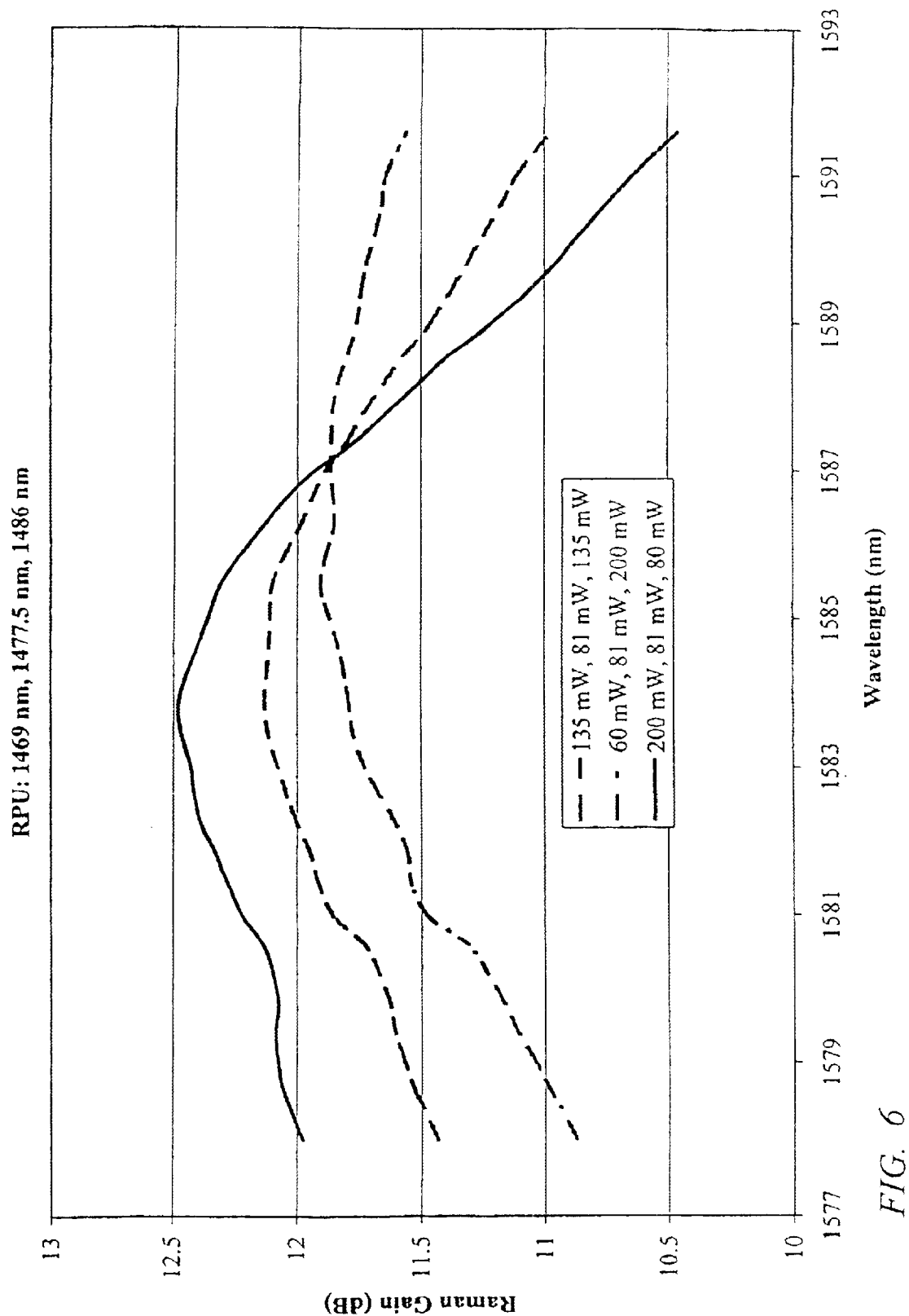
FIG. 6 is a graph showing Raman gain for a non-zero dispersion-shifted fiber at different pump power spectral distributions.

FIG. 6 is a graph showing Raman gain for a non-zero dispersion-shifted fiber at different pump power spectral distributions. The spectral shape of the Raman gain can be changed by manipulating the various laser diodes (e.g., LD1–LD6 ) of the pump unit 100. In particular, FIG. 6 shows the gain variation of a non-zero dispersion-shifted fiber (e.g., LEAF® fiber) with counter propagant pumping by considering different pumping conditions, in which only the pump power of the laser diodes LD1–LD6 at the extreme wavelengths are changed. The graph suggests that in a WDM optical communication system, tilt accumulation among the WDM channels can be compensated by controlling the Raman pump unit 100.

Figure 7A:
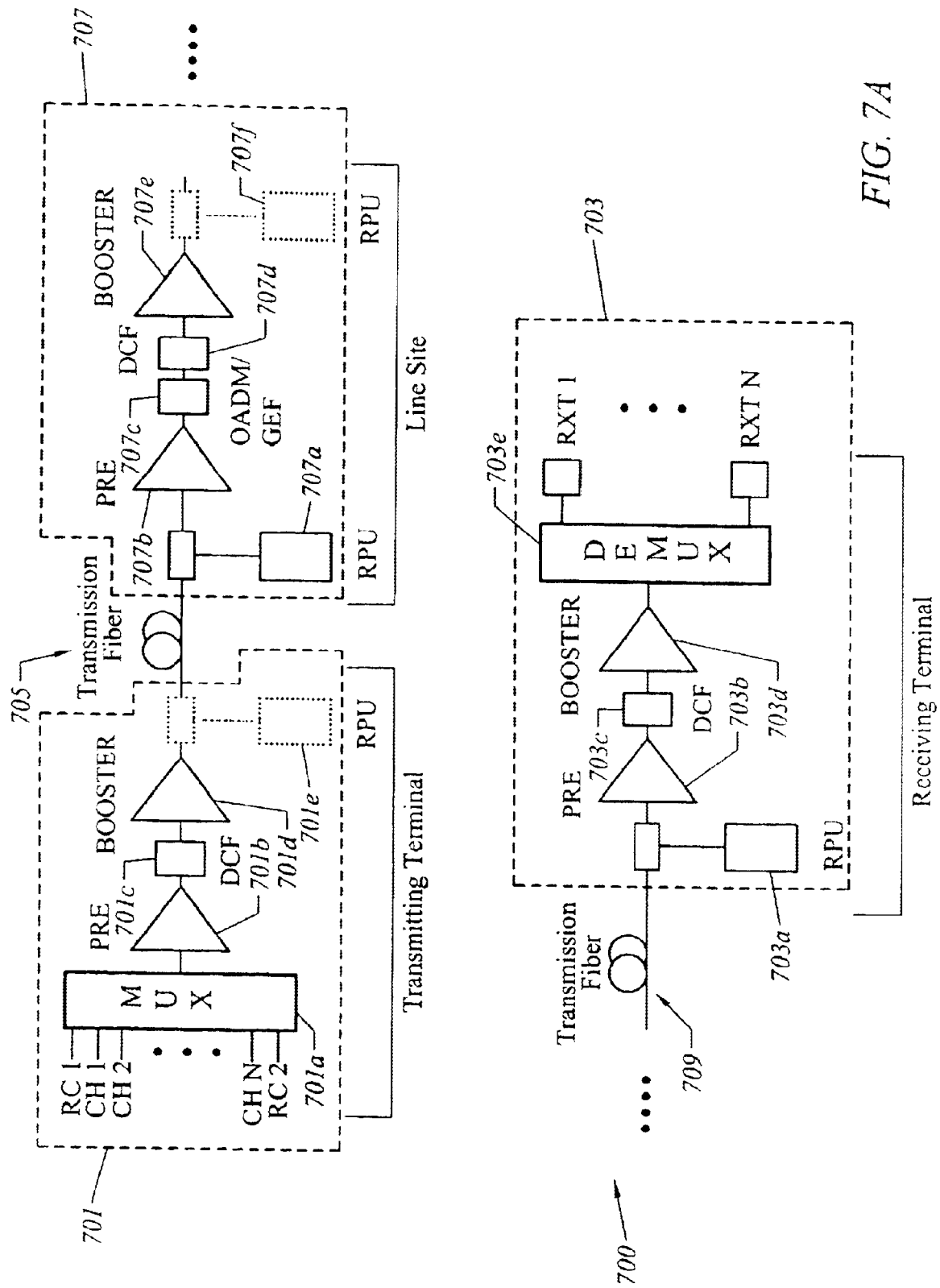
FIGS. 7a and 7b are diagrams of ultra-long-haul WDM optical communication systems based on distributed Raman amplifiers (DRAs) and EDFAs utilizing a single band and a dual-band, respectively, according to embodiments of the present invention.
Figure 7B:
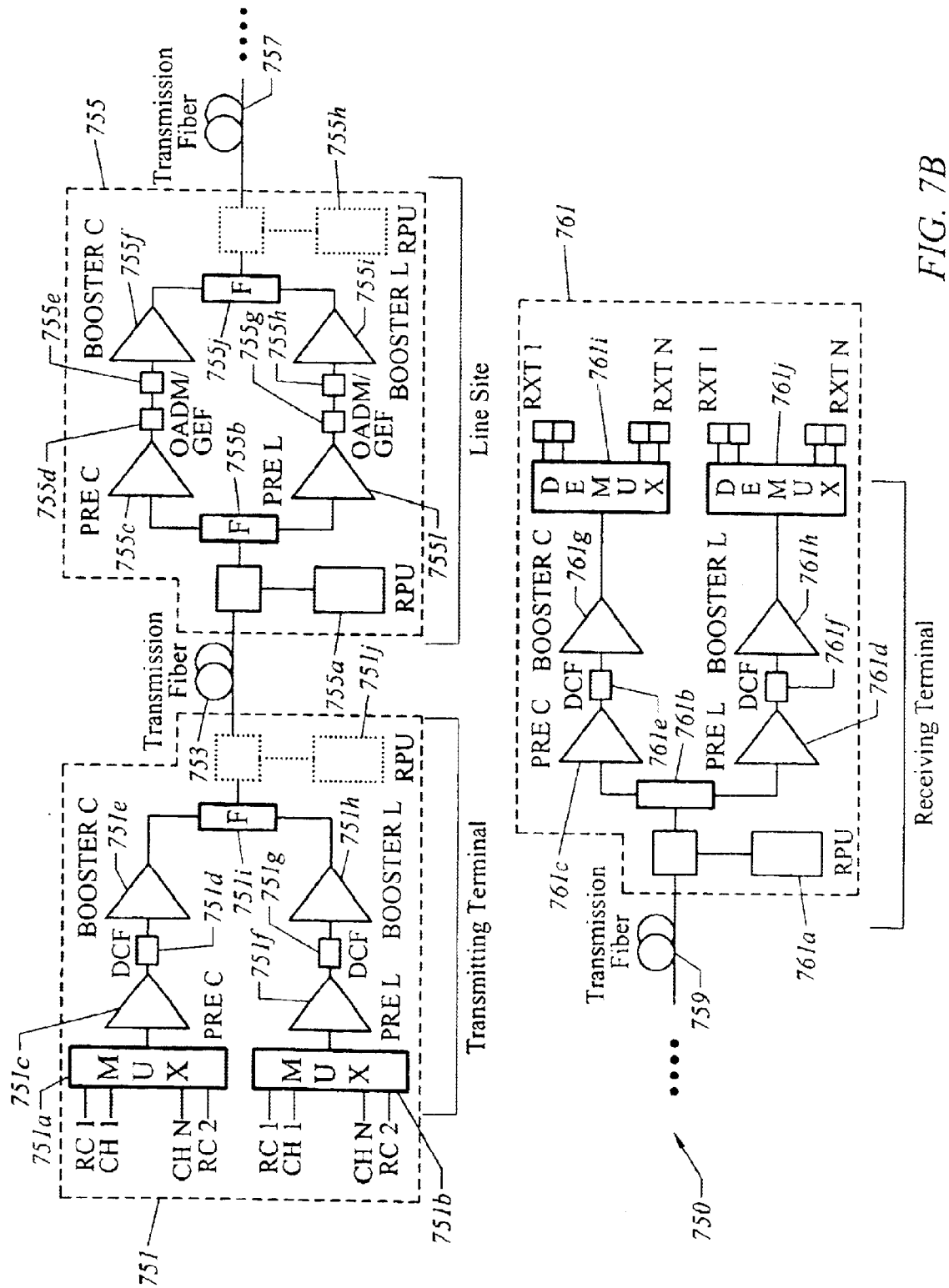

FIGS. 7a and 7b show diagrams of an ultra-long-haul WDM optical communication systems based on distributed Raman amplifiers and EDFAs utilizing a single band and a dual band, respectively, according to embodiments of the present invention. For explanatory purposes, the ultra-long-haul WDM optical communication systems 700 and 750 of FIGS. 7a and 7b, respectively, support unidirectional transmission. FIG. 7a shows a schematic structure of an ultra-long-haul single-band WDM optical communication system. Within the single-band WDM system 700, a transmitting terminal 701 sends optical signals to a receiving terminal 703 unidirectionally. The transmitting terminal 701 connects to a transmission fiber 705, which terminates at a line site 707. The line site 707 passes the optical signals to another transmission fiber 709. Fiber 709 is terminated at the receiving terminal 703. The transmission fibers 705 and 709 may be made up of many different spans; further these fibers 705 and 709 can be of any number of types (e.g., SMR, NZD, and NZDS fibers).

The transmitting terminal 701 of the single-band WDM system 700 includes a multiplexing section (MUX) 701a, a transmitter pre-amplifier (PRE) 701b, a dispersion compensating fiber (DCF) 701c, a transmitting booster amplifier (BOOSTER) 701d, and a co-propagating Raman pump unit (RPU) 701e. The MUX 701a has multiple input channels (CH 1–CH N), which include two reference channels (RC) RC1 and RC2 at the boundaries; assuming the channels are mapped sequentially to the transmission band.

The receiving termninal 703 has the following components: a counter propagating Raman pump unit 703a, a receiver PRE 703b, a DCF 703c, a BOOSTER 703d, and a DEMUX 703e. The receiving terminal 703 receives an optical signal and demultiplexes the received optical signal via DEMUX 703e into the respective individual channel signals, RXT 1–RXT N.

The line site 707 has a Raman counter-propagating pump unit (RPU) 707a, a line pre-amplifier (PRE) 707b, optical add/drop module (OADM) or gain equalizing filter (GEF) 707 c, a DCF 707d, a booster amplifier (BOOSTER) 707e, and a co-propagating Raman pump unit (RPU) 707f. With the above approach, the system 700 advantageously compensates for gain tilt accumulation along the fiber link, thereby simplifying the design of gain equalizing filters.

The operation of system 700 involves the use of two reference signals RC1 and RC2, which are positioned at the two boundaries of the operating sub-band. The reference signals RC1 and RC2 are locally detected in each amplification site (e.g., line site 707 and receiving terminal 703) of the system 700 and electronically processed. Within line site 707 and receiving terminal 703, the two reference signals RC1 and RC2 are processed, whereby the relative power difference and average power are computed. These values are used by a remote electronic control circuit (not shown) to control the counter-propagating Raman pump units 707a and 703a (i.e., the Raman gain characteristics). That is, each RPU 707a and 703a has a control circuit (not shown) which sets the pump light to adjust the light level of the two reference channels RC1 and RC2 at the input of each EDFA. In particular, the DRA that amplifies the multi-wavelength light in counter-propagant direction is controlled to reduce the power level deviation of the two reference channels of each sub-band and control their absolute power levels. The gain control mechanism within the transmission fiber (e.g., 705 and 709 ) can be combined with a suitable gain control scheme for the EDFA to ensure the robustness of the WDM system 700 during channels up-grade and optical add/drop operations.

For a given maximum number of channels and input power per channel, each EDFA provides a maximum gain variation typically less than 0.5 dB, corresponding to large variation of the number of channels that are actually transmitted along the system. For an effective EDFA gain control, a constant power per channel at the amplifier input is required. In the presence of distributed Raman amplification, a gain control mechanism is required within the transmission fiber.

Figure 10:
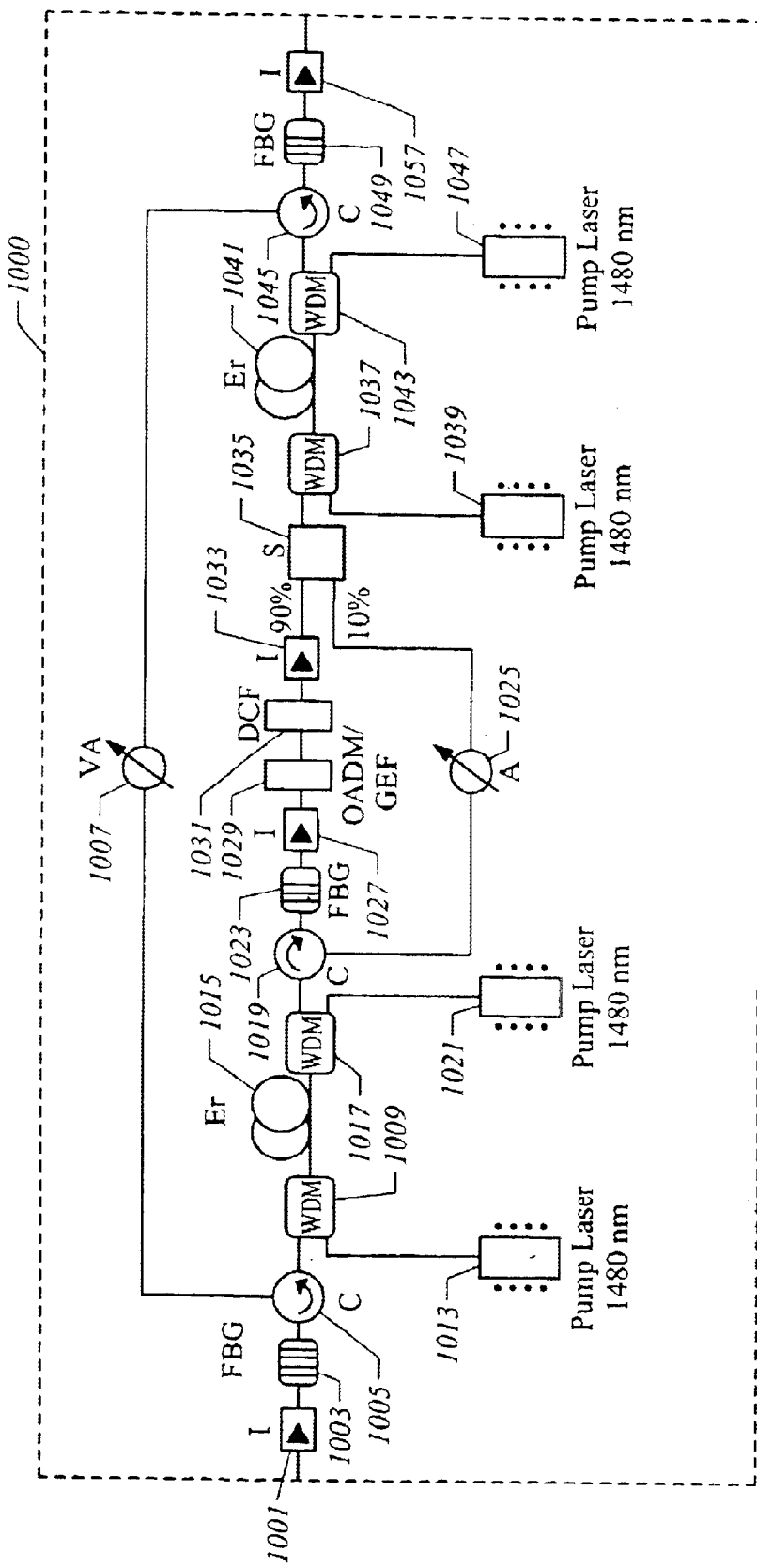
FIG. 10 is a diagram of an EDFA (Erbium Doped Fiber Amplifier) with OAGC (Optical Automatic Gain Controller), in accordance with an embodiment of the present invention.

Alternatively, for short span loss systems, the control on the span losses can be achieved without distributed Raman amplification in the WDM system 700 by introducing a variable attenuator at the input of each EDFA (FIG. 10).

The pump light of RPUs 707a and 703a may be obtained by polarization- and wavelength-multiplexing Fabry-Perot laser diodes (not shown). The RPUs 707a and 703a have at least two wavelength lights for each system sub-band. The driving currents of each Fabry-Perot laser diodes are controlled to output lights in such a way as to equalize the two reference signals RC1 and RC2 and to fix their powers to a predefined value at the input of the EDFA-which is used as optical line amplifier (OLA).

The system 700, through the processing of the two reference signals RC1 and RC2 to control the counter-propagating Raman pump units 707a and 703a at each line site 707 and receiving terminal 703, provides a number of desirable characteristics. For example, the Raman gain can be readily adapted to different span losses by changing the laser driving currents of the RPUs 707a and 703a or acting on variable attenuators inserted after each pump module. In addition, the spectral shape of the Raman gain can be fixed to compensate for gain tilt accumulation due to both EDFA and distributed Raman amplifiers; this is accomplished, for example, by properly setting the driving currents of the laser diodes in the RPUs 707a and 703a Further, the design of filter masks of the gain equalizing filters 707c, which may be used periodically along the link, is greatly simplified . By controlling the power per channel at the input of each OLA, the Raman gain control mechanism allows an effective gain control of the EDFA to ensure robustness in terms of channel upgrading and during OADM operation. In case of bi-directional Raman pumping, manipulation of the counter-propagating RPUs 707a and 703a permits compensation for the gain saturation that is introduced by the co-propagant and counter-propagant Raman pump units 701e and 707f.

The system 700 may also include co-propagant optical Raman amplification units positioned within the transmitting terminal 701 and within each line site 707. This approach can also be applied to WDM optical communication systems based only on EDFAs (i.e., without DRA). In this case, the counter-propagant Raman pump unit is substituted by a variable optical attenuator. A control circuit, which detects one or more reference channels, sets the attenuation value to adjust for the span loss and to ensure a constant input power per channel at each EDFA input.

The use of the above Raman gain and tilt control mechanism can also be applied to multi-band WDM optical communication systems. In case of multi-band WDM systems, the processing of two reference channels RC1 and RC2 for each sub-band (such as C-band and L-Band) permits compensation for inter-band Raman induced penalties and pump interactions. The multiwavelength light of each sub-band includes two reference channels that are positioned near the respective frequency boundaries of the sub-bands.

FIG. 7b shows the structure of a dual-band WDM system, according to an embodiment of the present invention. A transmitting terminal 751 in the dual-band system 750 unidirectionally transmits optical signals over a transmission fiber 753 to a line site 755. According to one embodiment of the present invention, the system 750 utilizes the C-band and L-band. As shown in FIG. 7b, the line site 755 connects to transmission fiber 757, which may be any type of fiber (e.g., SMR, NZD, NZDS fibers). Ultimately, the transmitted optical signal arrives at transmission fiber 759, which terminates at receiving terminal 761. The components of the transmitting terminal 751, line site 755, and receiving terminal 761 are similar to those of the single-band WDM system 700.

Unlike the transmitting terminal 701 of the single-band system 700, the transmitting terminal 751 has multiple multiplexing sections (MUXs) 751a and 751b, corresponding to the sub-bands C and L. Each of the MUXs 751a and 751b has multiple input channels (CH 1–CH N), along with two reference channels RC1 and RC2. MUX 751a is coupled to a transmitter pre-amplifier (PRE) 751c, which provides pre-amplification for the C band signals. In an exemplary embodiment, the two sub-bands C and L are amplified separately by dedicated EDFAs in each line site 755, receiving terminal 761, and transmitting terminal 751. PRE 751c is connected to a dispersion compensating fiber (DCF) 751d. The DCF 751d is attached to a transmitting booster amplifier (BOOSTER) 751e. Similarly, MUX 751b is attached to a transmitter pre-amplifier (PRE) 751f that outputs signals to a DCF 751g. A transmitting BOOSTER 751h amplifies signals from the DCF 751d. The outputs of the BOOSTER 751h and the BOOSTER 751e are combined at an optical filter 751i is attached to copropagating Raman pump unit (RPU) 751j.

The line site 755 has a Raman counter-propagating pump unit (RPU) 755a that is connected to an optical filter 755b. The optical filter 755b couples to two line pre-amplifiers (PRE) 755c and 755l, which are designated for each of the C and L sub-bands, respectively. PRE 755c is connected to an optional optical add/drop module (OADM)/gain equalizing filter (GEF) 755d, which output to a DCF 755e. The DCF 755e connects to a BOOSTER 755f.

The L sub-band has a similar arrangement of components within the line site 755. PRE 755l connects to an OADM or GFE 755g, which in turn couples to a DCF 755h. DCF 755h connects to a BOOSTER 755i. The output of BOOSTER 755i feeds into another optical filter 755j; optical filter 755j also receives the output of BOOSTER 755f of the C-band. The optical filter 755j is connected to a co-propagating RPU 755k.

The receiving terminal 761 includes a counter-propagating Raman pump unit 761a an optical filter 761b. The optical filter 761b splits the sub-bands C and L to identical sets of components: PREs 761c and 761d, DCFs 761e and 761f, BOOSTERs 761g and 761h, and DEMUXs 761i and 761j. DEMUXs 761i and 761j output into the respective individual channel signals, RXT 1–RXT N, within the sub-bands C and L.

Figure 8:
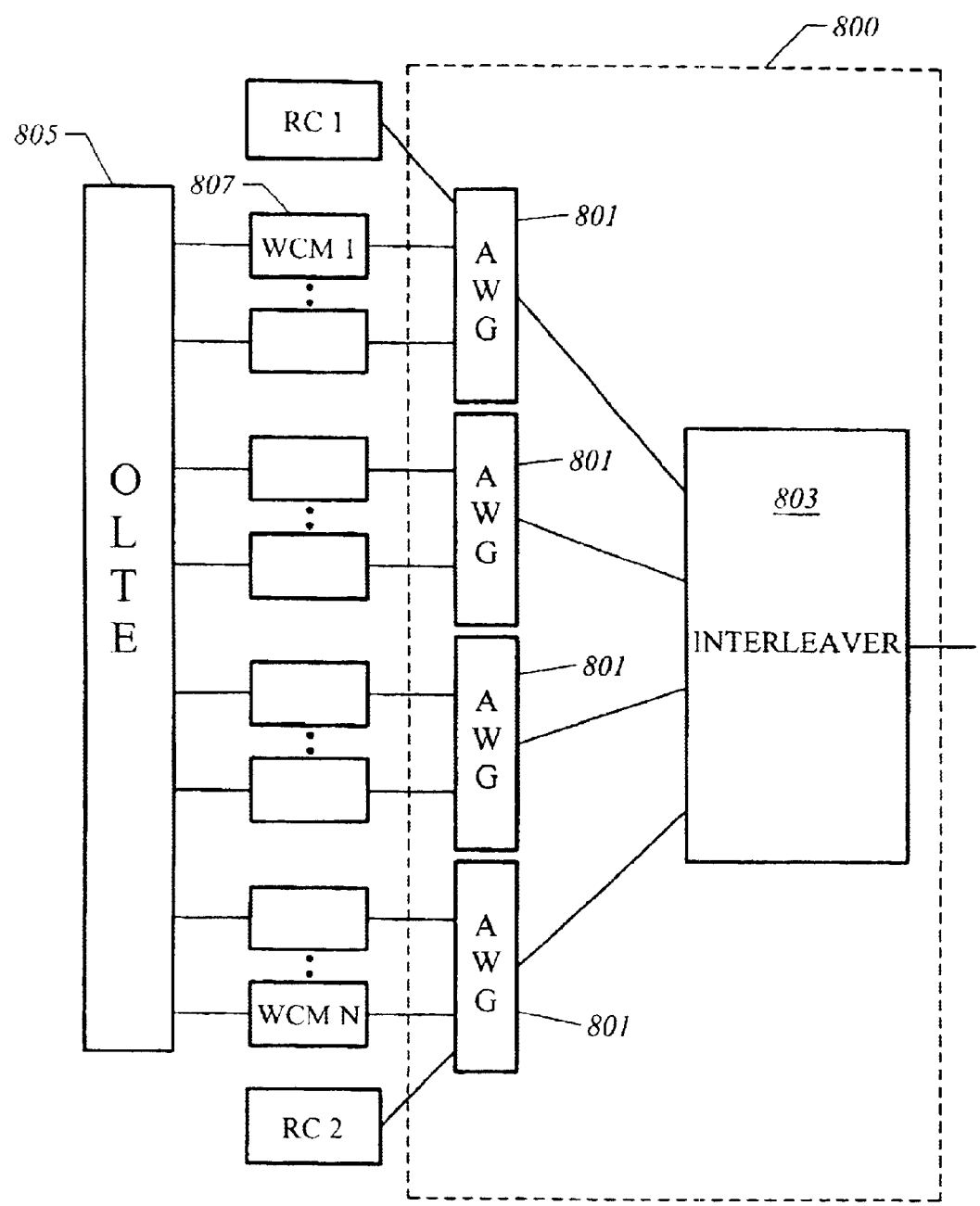
FIG. 8 is a diagram of multiplexer used in the systems of FIGS. 7a and 7b.

FIG. 8 is a diagram of an exemplary multiplexer used in the systems of FIGS. 7a and 7b. According to one embodiment of the present invention, the multiplexing section 800 includes multiple Arrayed Waveguide Gratings (AWGs) 801 and an interleaver 803. An Optical Line Terminating Equipment (OLTE) 805 terminates N input channels from various signal sources and outputs these signals into N wavelength converter modules (WCM) 807. The outputs from the N WCMs 807, along with reference channels RC1 and RC2, are fed into four AWGs 801. Thereafter, the interleaver 803 combines the interleaved grid channels into a single output signal Multiplexer section 800 multiplexes (or groups) input channels into two sub-bands, (e.g., C and L); however, it is recognized that any number of sub-bands can be utilized, depending on the system capacity requirements. The multiplexing section 800, the OTLE 805, and the WCMs 807 are components within the transmitting terminal 751 (FIGS. 7a and 7b). At the receiving terminal 703 (FIGS. 7a and 7b), the signals are demultiplexed.

Figure 9:
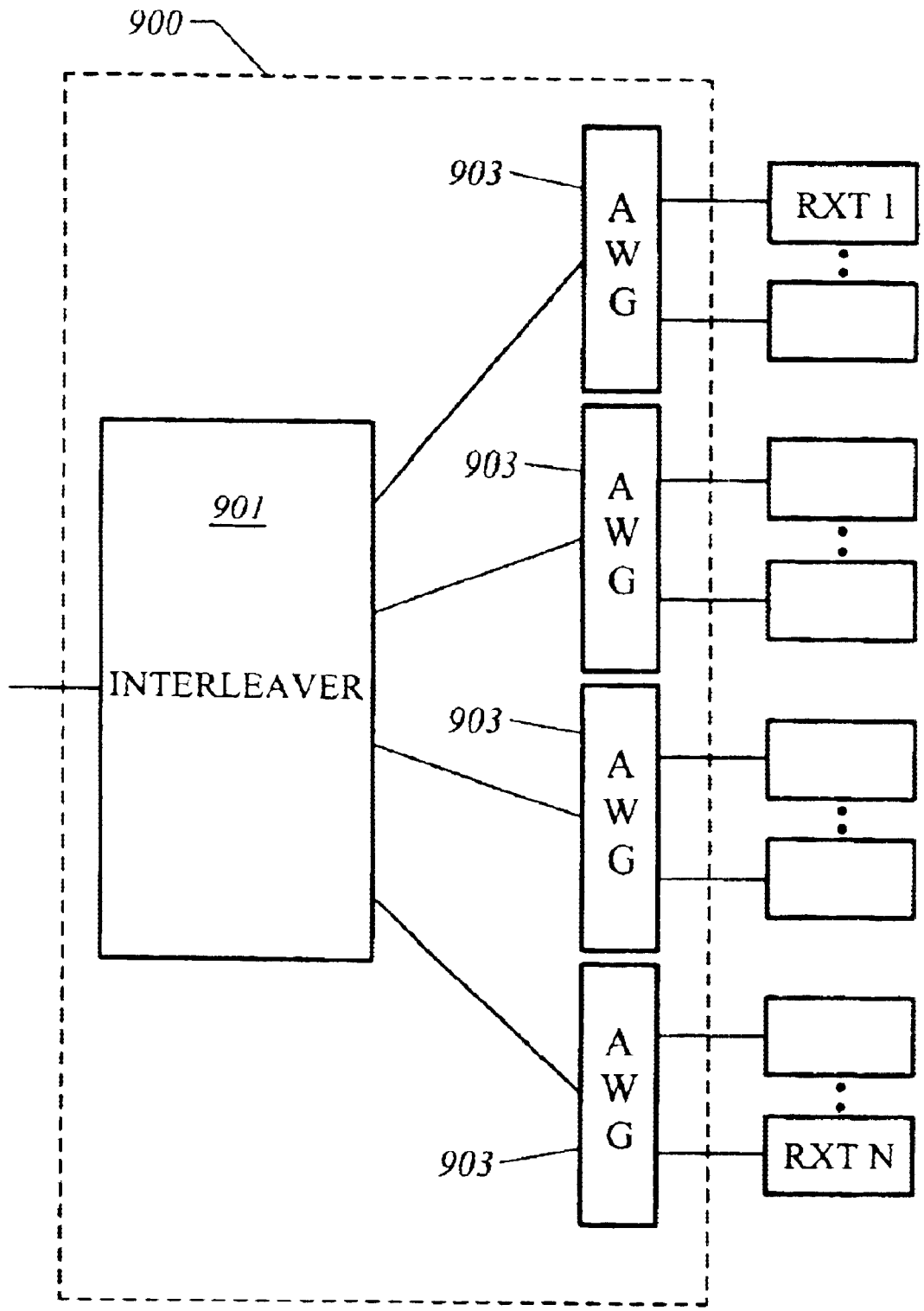
FIG. 9 is a diagram of demultiplexer used in the systems of FIGS. 7a and 7b.

FIG. 9 is a diagram of an exemplary demultiplexer used in the systems of FIGS. 7a and 7b. Demultiplexing section 900 receives the multiplexed signals and separates them into two or more interleaved sub-bands, splitting the sub-bands into the individual wavelength of output channels. The demultiplexing section 900 includes an interleaver 901 and four AWGs 903 to output N channels. In other words, the multiplexed signals are separated into four interleaved sub-bands and then split into the individual wavelengths, as well as the two reference channels. It should be noted that the number of input channels and output channels may differ because some channels can be dropped and/or added/reinserted within the line site 707, 755 (FIGS. 7a and 7b).

FIG. 10 is a diagram of an amplification module utilizing EDFA (Erbrium Doped Fiber Amplifier) AOGC (All Optical Gain Control), in accordance with an embodiment of the present invention The EDFA 1000 ensures that the required gain control and flatness for a total input power is within a suitable range, which depends on the maximum number of channels and input power per channel. An amplification section based on EDFA 1000 can be implemented in the transmitting terminals 701 and 751, line sites 707 and 755, and receiving terminals 703 and 761 of the systems of FIGS. 7a and 7b. Amplification section 1000 includes an optical isolator 1001 that is connected to a fiber Bragg grating (FBG) 1003; in an exemplary embodiment, the wavelength of FBG 1003 is 1565nm. A tree-port optical circulator 1005 receives the output of output of the FBG 1003 at one port; a second port of the circulator 1005 is connected to a variable attenuator (VA) 1007.

The third port of the optical circulator 1005 is input to a WDM module 1009. WDM 1009 also receives an input from a pump laser 1013, and outputs to an Erbium doped (ER) fiber 1015. Another WDM module 1017 couples to an end of the fiber 1015; the WDM 1017 is connected to a three-port optical circulator 1019 and a pump laser 1021. The optical circulator 1019 is coupled to an FBG 1023 and a variable attenuator 1025. An optical isolator 1027 receives input from FBG 1023, and outputs to an optional OADM/GEF unit 1029, which is connected to a DCF 1031.

Within amplification section 1000, an optical isolator 1033 is situated between the DCF 1031 and a splitter (90/10) 1035. One input of the splitter, namely the 10% input, receives signals from the variable attenuator 1025. The splitter 1035 outputs to a WDM module 1037, which couples to a pump laser 1039. Similar to the WDM module 1009, WDM 1037 is connected to an Erbium doped fiber 1041. A WDM module 1043 outputs to an optical circulator 1045 and is also coupled to a pump laser 1047. The optical circulator 1045 is connected to the VA 1007 and a FBG 1049. Signals from the FBG 1049 are fed to an optical isolator 1051. This arrangement advantageously provides robustness of the amplifier to add/drop and channel upgrade.

Figure 11:
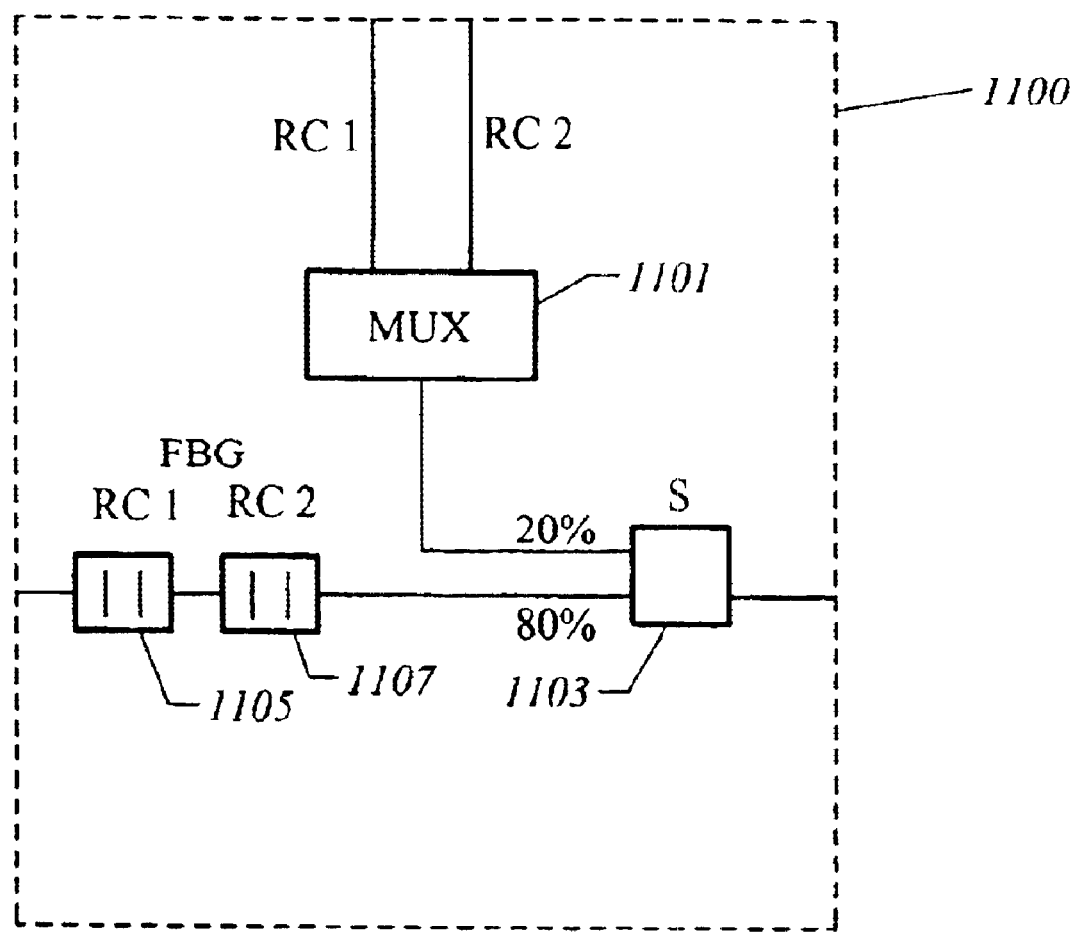
FIG. 11 is a diagram of an optical circuit for periodic extraction and regeneration of the reference channels, in accordance with an embodiment of the present invention.

Under this embodiment of the present invention, a single reference channel may be utilized, instead of two. In this case, a single reference channel would be sufficient to obtain the power of the reference channel using, for example, a photodiode (not shown); the variable attenuator 1007 can be adjusted to ensure a constant power of the reference channel at the EDFA input. It should be noted that under this single reference signal approach, adjustment of the variable attenuator 1007 cannot correct for gain tilt accumulation, but only adapt the system at different span losses to ensure a constant power per channel at each EDFA input. Performing this control on a single reference channel cannot correct for gain tilt accumulated along the system due to, for example, imperfect gain filtering; however, this control avoids gain tilt accumulation along the link due to the presence of variable span losses which, without control on the single reference channel, would change the power per channel at the input of the EDFAs. FIG. 11 is a diagram of an optical circuit for periodic extraction and regeneration of the reference channels, in accordance with an embodiment of the present invention. Within the line sites with regeneration of the reference channels RC1 and RC2, the pre-amplifier is preceded by an optical circuit 1100, which extracts the references and inserts new reference channels RC1 and RC2 at the appropriate power levels. The optical circuit 1100 includes a MUX 1101, which inputs the two reference signals, RC1 and RC2, and outputs a composite signal to a splitter (20/80) 1103. Optical circuit 1100 also includes two FBGs 1105 and 1107 to filter the reference signals RC1 and RC2, respectively. The reference channels RC1 and RC2 are inserted at the amplifier input to control gain non-uniformity eventually introduced by the EDFA. If the reference channels RC1 and RC2 coincide with two transmitted channels, they are not regenerated along the transmission system.

Figure 12:
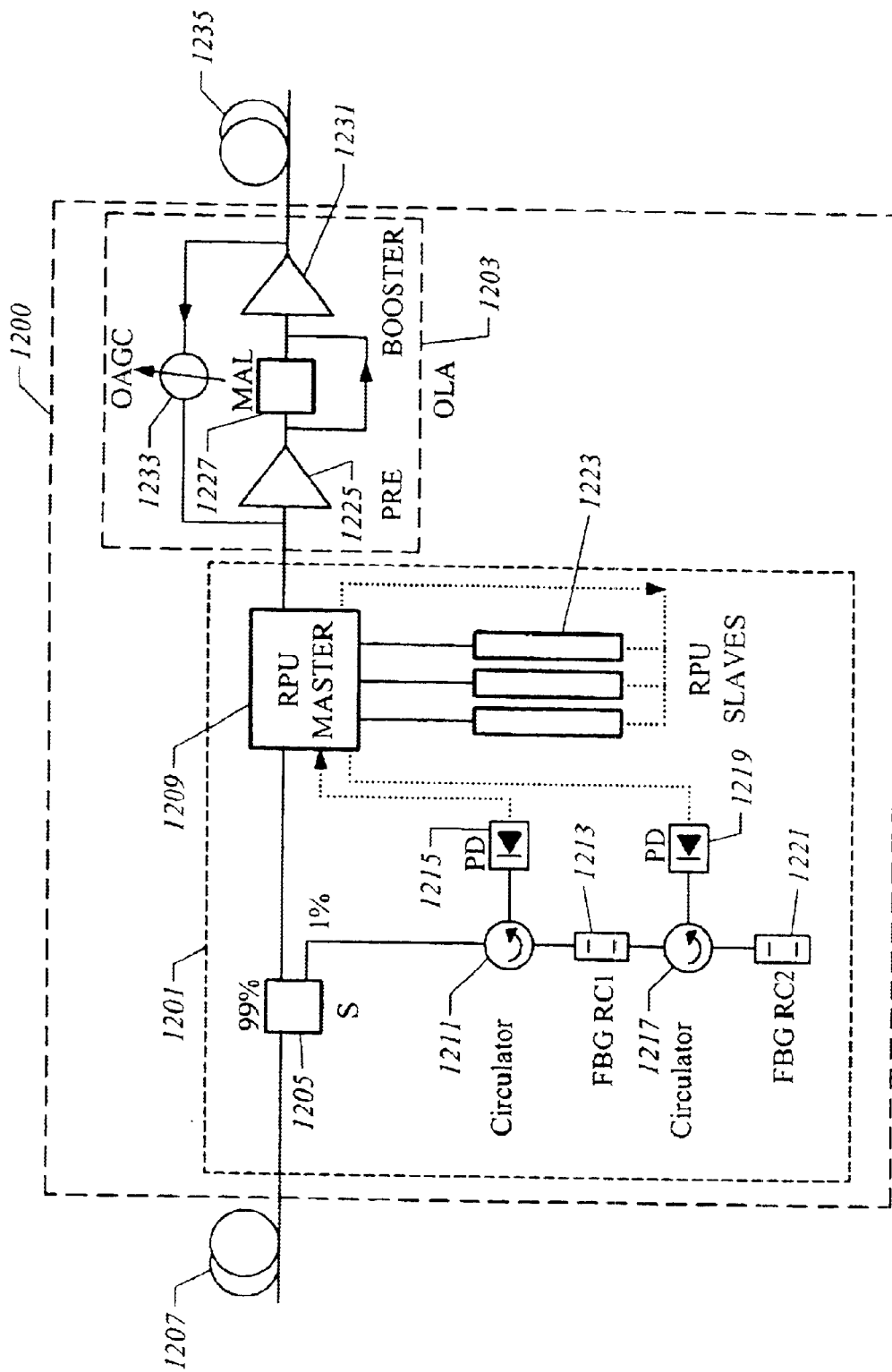
FIG. 12 is a diagram of a line site with counter-propagant Raman pump unit without extraction and regeneration of the reference channels, in accordance with an embodiment of the present invention.

FIG. 12 is a diagram of a line site with counter-propagant Raman pump unit without extraction and regeneration of the reference channels, in accordance with an embodiment of the present invention. As shown, line site 1200 includes a counter-propagant RPU 1201 and an optical line amplifier (OAL) 1203. The counter-propagant RPU 1201 includes a splitter 1205 that receives optical signals from the fiber transmission 1207 and splits the receive signals to a RPU master 1209 and an optical circulator 1211. The circulator 1211 is connected to an FBG 1213, which filters the first reference signal RC1. Further, the optical circulator 1211 outputs to a photodiode 1215. The photodiode 1215 converts the optical signals from optical circulator 1211 and outputs an electrical equivalent of RC1 to RPU master 1209.

FBG 1213 is coupled to an optical circulator 1217. A FBG 1221 is coupled to the optical circulator 1217 for filtering the second reference signal, RC2. A photodiode 1219 receives optical input signals from the optical circulator 1217, and in response, outputs an equivalent electrical signal to the RPU master 1209.

The RPU master 1209 multiplexes the Raman pump signals with the data signal and regulates the power level of each RPU unit 1223, which function as slaves with respect to the RPU master 1209. Essentially, the RPU master 1209 receives signals that indicate the strength of the reference channels RC1 and RC2 from photodiodes 1215 and 1219, respectively; based upon the received RC1 and RC2 signals, the RPU master 1209 adjusts the power of the slave RPUs 1223 to achieve a flat gain. The output of the RPU master 1209 is sent to OLA 1203.

The OLA 1203 includes a pre-amplifier (PRE) 1225, which is connected to a middle access loss (MAL) 1227 (e.g., a DCF, OADM, and/or GEF) 1227. The MAL 1227 outputs to a booster amplifier 1231. The output of the booster 1231 is fed back to the input of the PRE 1225 via an optical automatic gain controller (OAGC) 1233. In addition, the output of booster amplifier 1231 is transmitted over transmission fiber 1235.

Figure 13:
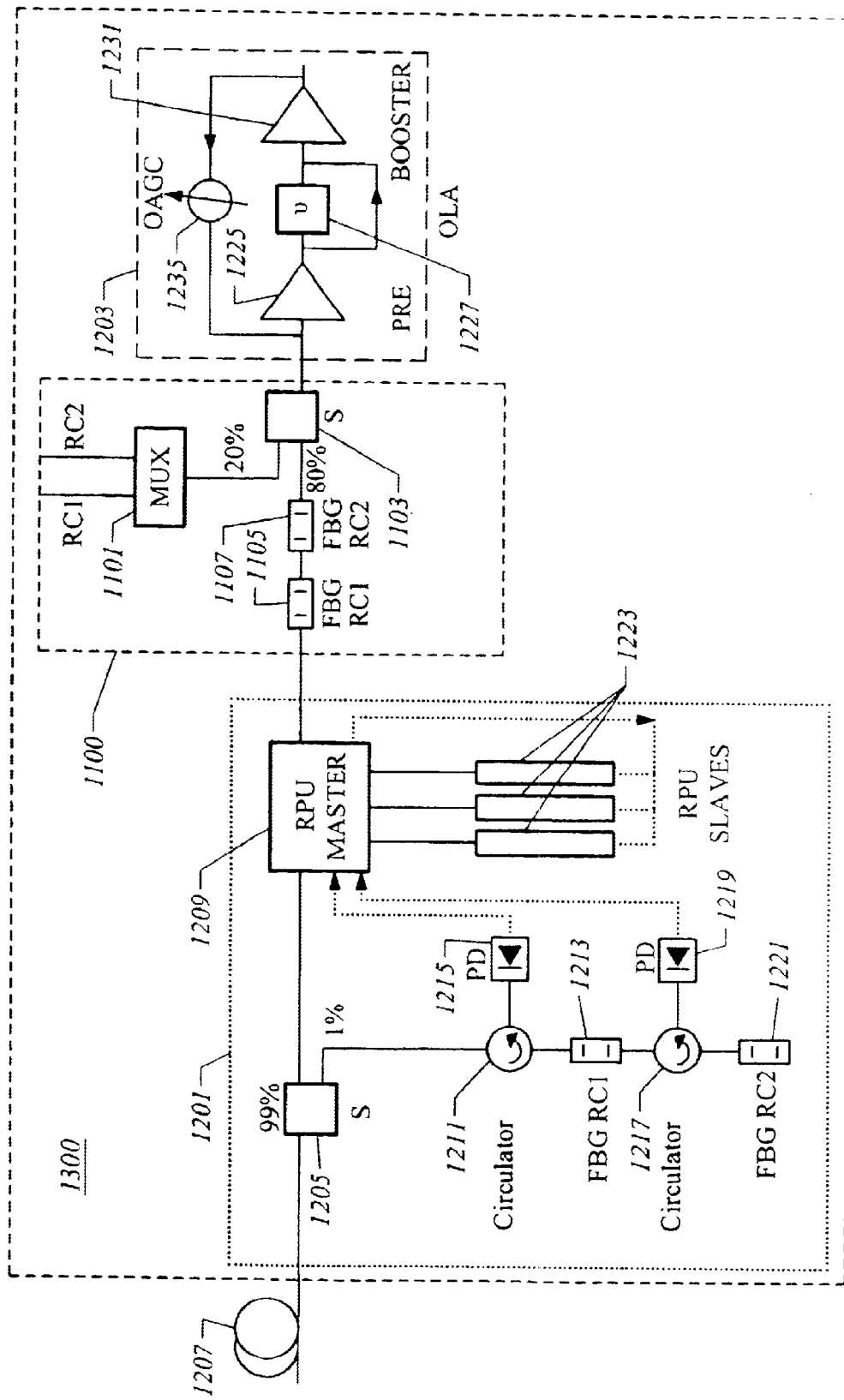
FIG. 13 is a diagram of a line site with counter-propagant Raman pump unit with periodic extraction and regeneration of the reference channels, in accordance with an embodiment of the present invention.
Figure 14:
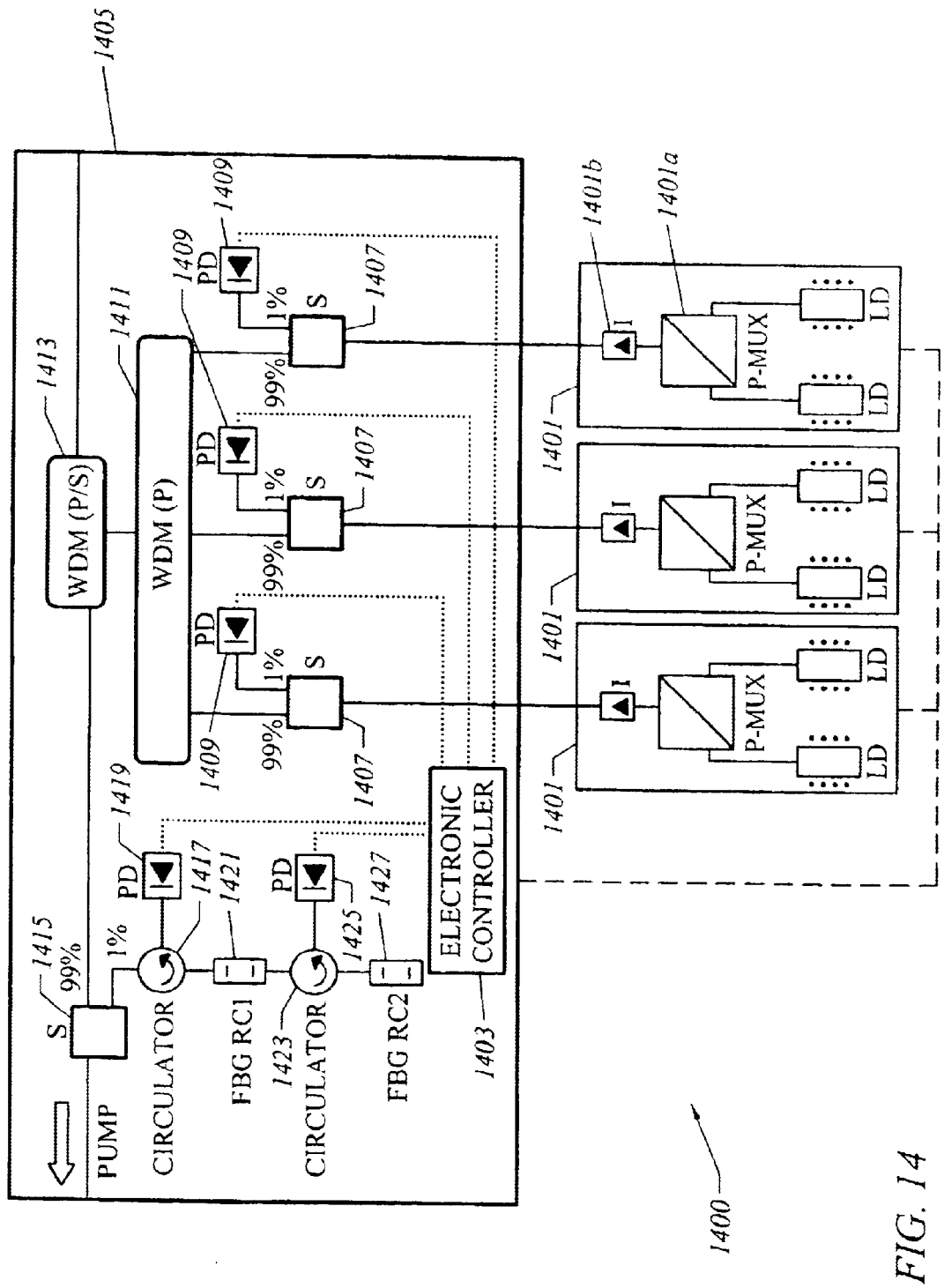
FIG. 14 is a diagram of a counter-propagant Raman pump unit with periodic extraction and regeneration of the reference channels, in accordance with an embodiment of the present invention.

FIG. 13 is a diagram of a line site with counter-propagant Raman pump unit with periodic extraction and regeneration of the reference channels, in accordance with an embodiment of the present invention. Line site 1300 resembles the line site 1200 of FIG. 12, with the addition of an extraction and regeneration circuit of FIG. 11. Specifically, the extraction and regeneration of the reference channels RC1 and RC2, is performed by optical circuit 1100, which receives an output from the counter-propagant RPU 1201, outputting to an OLA 1203. As seen in FIG. 13, the reference channels RC1 and RC2 are filtered out and the remaining wavelengths are fed into splitter 1103. The other input of splitter 1103 is provided by MUX 1101. Splitter 1103 outputs to the OLA 1203. Alternatively, a line site with similar functionality can be implemented using a different architecture, as shown in FIG. 14. Alternatively, the components 1415, 1417, 1419, 1421, 1423, 1425, 1427 for reading the reference channels in FIG. 14 can also be positioned after the WDM(P/S) 1413.

FIG. 14 is a diagram of a counter-propagant Raman pump unit without regeneration of the reference channels, in accordance with an embodiment of the present invention. Similar to the Raman pump unit of FIG. 1, the counter-propagant RPU 1400 utilizes three pump modules 1401, which operate in the same manner as the pump lasers 101, 103, and 105. Accordingly, the components of pump modules 1401 include laser diodes (LD), P-P-MUX 1401a, and an optical isolator 1401b. Pump modules 1401 output to splitters 1407, which are coupled to the respective photodiodes 1409. In addition, the splitters 1407 are connected to a WDM (P) module 1411. The WDM (P) module 1411 is connected to a WDM (P/S) module 1413.

The WDM (P/S) module 1413 is connected to spliuer 1415, which is also coupled to an optical circulator 1417. The three port optical circulator 1417 has a port that is connected to a photodiode 1419 as well as another port that is connected to a FBG 1421 that filters out the first reference channel, RC1. A second optical circulator 1423 has ports that connected to photodiode 1425 and FBG 1427. The photodiodes 1419 and 1425 output electrical signals to the electronic controller 1403.

The 1% branch of the splitter 1415, which is positioned at the RPU input, is followed by three port optical circulators 1417 and 1423 and fiber gratings 1421 and 1427, which send a fraction of the two reference channels to two photodiodes 1419 and 1425. The corresponding electric signals are processed by the electronic controller 1403 and provide all the information needed to control the pump modules 1401 and for the safety of the RPU unit 1400.

In particular, the electronic controller 1403 computes the average voltage of the two reference signals, and compares the computed average voltage with a reference voltage (which corresponds to the power per channel that should be ensured at the EDFA input). The electronic controller 1403 adjusts the current of each of the pump modules 1401 to minimize the difference between the computed average voltage and the reference voltage. This ensures the adaptation of the Raman gain to the span loss and also compensates for the Raman gain saturation that is introduced by the co-propagant Raman pump unit 1400. The controller 1403 computes the relative difference of the two reference channels and acts on the pump laser driving current to minimize this difference. This mechanism equalizes the two reference channels, thereby reducing the tilt among all channels. This operation can be performed during installation or channel upgrading.

Furthermore, the controller 1403 computes the voltages associated with each reference channel and compares them with a threshold voltage to check whether or not the corresponding reference is degraded. In case there is a degradation of one reference, the controller 1403 provides an alarm to, for example, a network management system (not shown).

Figure 15:
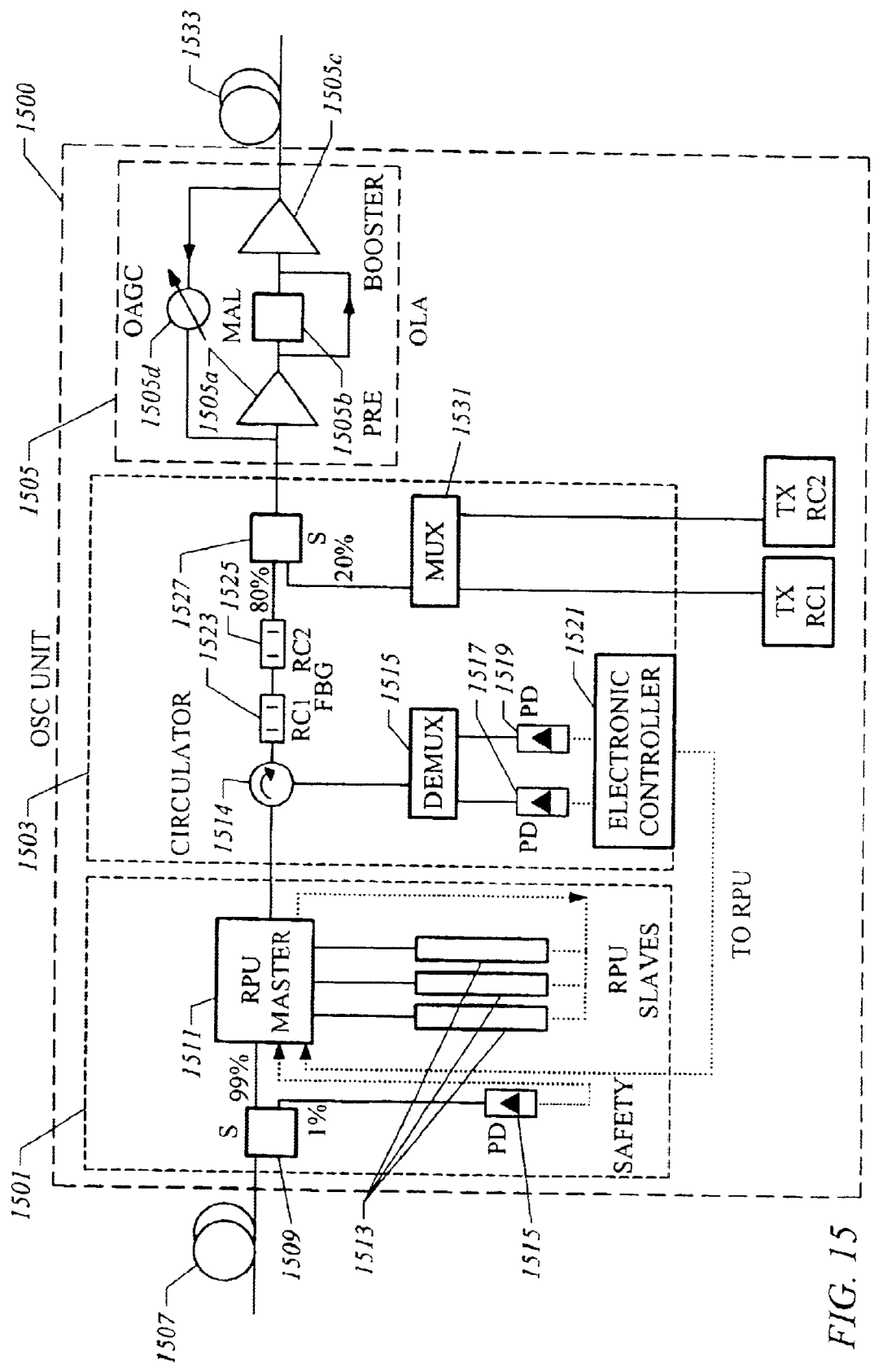
FIG. 15 is a diagram of a line site with counter propagant Raman pump unit and extraction and regeneration of the reference channels at an Optical Service Channel (OSC) unit, in accordance with an embodiment of the present invention.

FIG. 15 shows the structure of a line site in which extraction and regeneration is performed at an optical service channel (OSC) unit, according to an embodiment of the present invention. The two reference channels, which can be used as redundant optical service channels, are extracted and inserted at each line site. In other words, the reference signals can also be used as safety channels for the RPU 501, and eventually as OSCs. OSCs are more fully described in U.S. Pat. No. 5,113,459 to Grasso et al., which incorporated herein in its entirety. Because the reference signals RC1 and RC2 degrade as they porpagate along the fiber link, they are periodically regenerated. For example, the reference signals RC1 and RC2 can be regenerated where the gain equalizing filters are introduced or, in general, every N span (with N≧1) depending on the requirements of the optical communication system.

Line site 1500 has an RPU 1501 that is connected to an OSC (optical service channel) unit 1503, which in turn outputs to an optical line amplifier 1505. The input of line site 1500 is connected to transmission fiber 1507 via the RPU unit 1501. In particular, the RPU unit 1501 has a splitter 1509 (99/1). Splitter 1509 outputs to a RPU master 1511, which controls RPU slaves 1513. The splitter 1509 splits 1% of the energy of the received optical signal from transmission fiber 1507 to a photodiode 1515. The photodiode 1515 outputs an electrical signal to the RPU master 1511.

The OSC unit 1503 receives signals from the RPU master 1511 via an optical circulator 1514. The optical circulator 1514 outputs to a DEMUX 1515, which is coupled to two photodiodes 1517 and 1519, respectively. The demultiplexes optical signals are converted by the photodiodes 1517 and 1519 and sent to an electronic controller 1521. The electronic controller 1521 outputs an electrical signal to the RPU master 1511 to control the RPU slaves 1513 in response to the RC1 and RC2 signals. The OSC unit 1503 also includes two FBGs 1523 and 1525, which filter out RC1 and RC2. The FBG 1525 is coupled to splitter 1527, is connected to a MUX 1531. The MUX 1531 multiplexes a received control signal, RC1 and RC2.

The optical line amplifier (OLA) 1505 has a similar configuration as the OLA 1203 of FIG. 13, in that both OLAs 1203 and 1505 include a pre-amplifier 1505a that is coupled to an MAL 1505b. The MAL 1505b outputs to a booster amplifier 1505c. Thereafter, the output of the BOOSTER 1505c is fed back to the input of PRE 1505a via a variable attenuator 1505d. The reference channels RC1 and RC2 are inserted at the amplifier input to control gain non-uniformity that is introduced by the EDFA.

As shown in FIG. 15, the processing of the two reference channels RC1 and RC2 can be performed within the OSC unit 1503 and the resulting electrical signals sent to the RPUs 1511. As a consequence, the RPU 1511 can be simplified as shown in FIG. 16.

Figure 16:
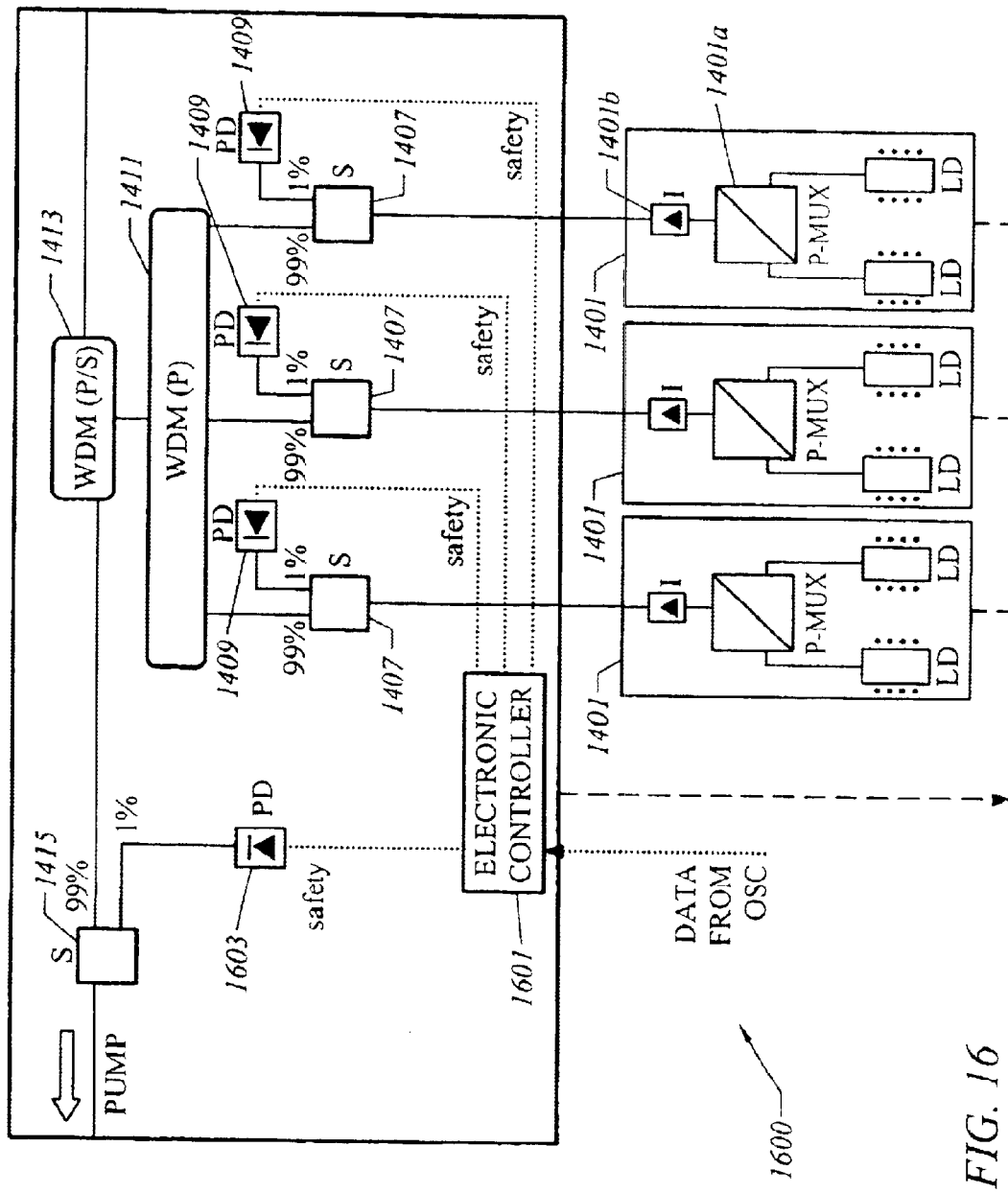
FIG. 16 is a diagram of a counter-propagant Raman pump unit with extraction and regeneration of the reference channels at each site, in accordance with an embodiment of the present invention.

FIG. 16 is a diagram of a counter-propagant Raman pump unit with extraction and regeneration of the reference channels at each site, in accordance with an embodiment of the present invention. The RPU 1600 resembles the counter-propagant RPU 1400 of FIG. 14; however, RPU 1600 includes an electronic controller 1601 that receives input data from an OSC unit (not shown). In addition, the splitter 1415 outputs to a photodiode 1603, which converts the optical signal carrying the safety information into an electrical signal into the electronic controller 1601.

Figure 17:
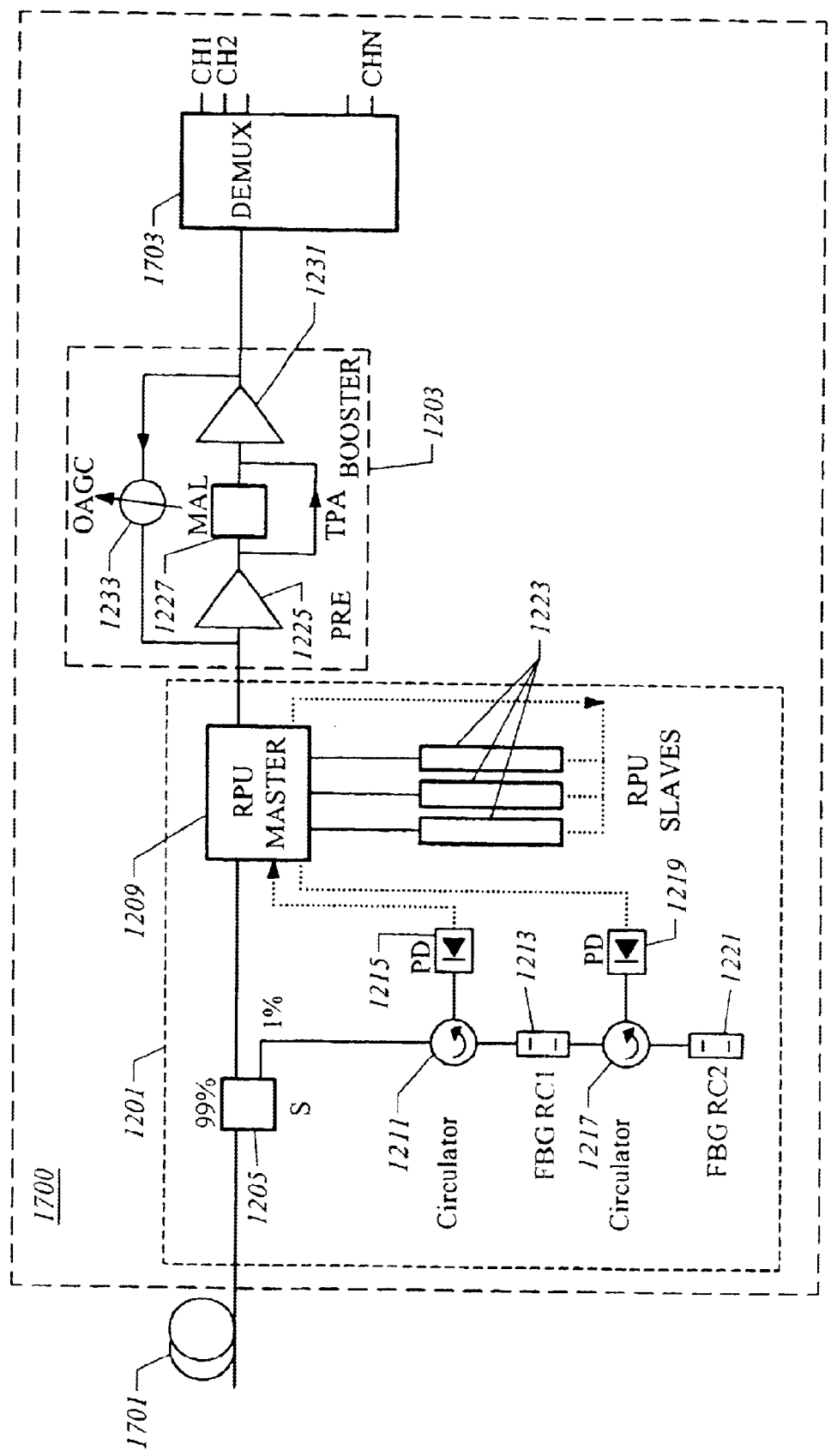
FIG. 17 is a diagram of a receiving terminal with counter-propagant Raman pump unit, in accordance with an embodiment of the present invention.

FIG. 17 is a diagram of a receiving terminal with counter-propagant Raman pump unit, in accordance with an embodiment of the present invention. Receiving terminal 1700 retrieves optical signals from transmission fiber 1701 via a counter-propagant RPU 1201. The operation of RPU 1201 was previously discussed with respect to FIG. 12. The output of the RPU 1201 is sent to an amplifier 1203, which was also discussed in the description of FIG. 12. The output of optical line amplifier 1203 is forwarded to a DEMUX 1703, which demultiplexes the received amplified signal from OLA 1203 into N-channels, CH 1–CH N.

Figure 18:
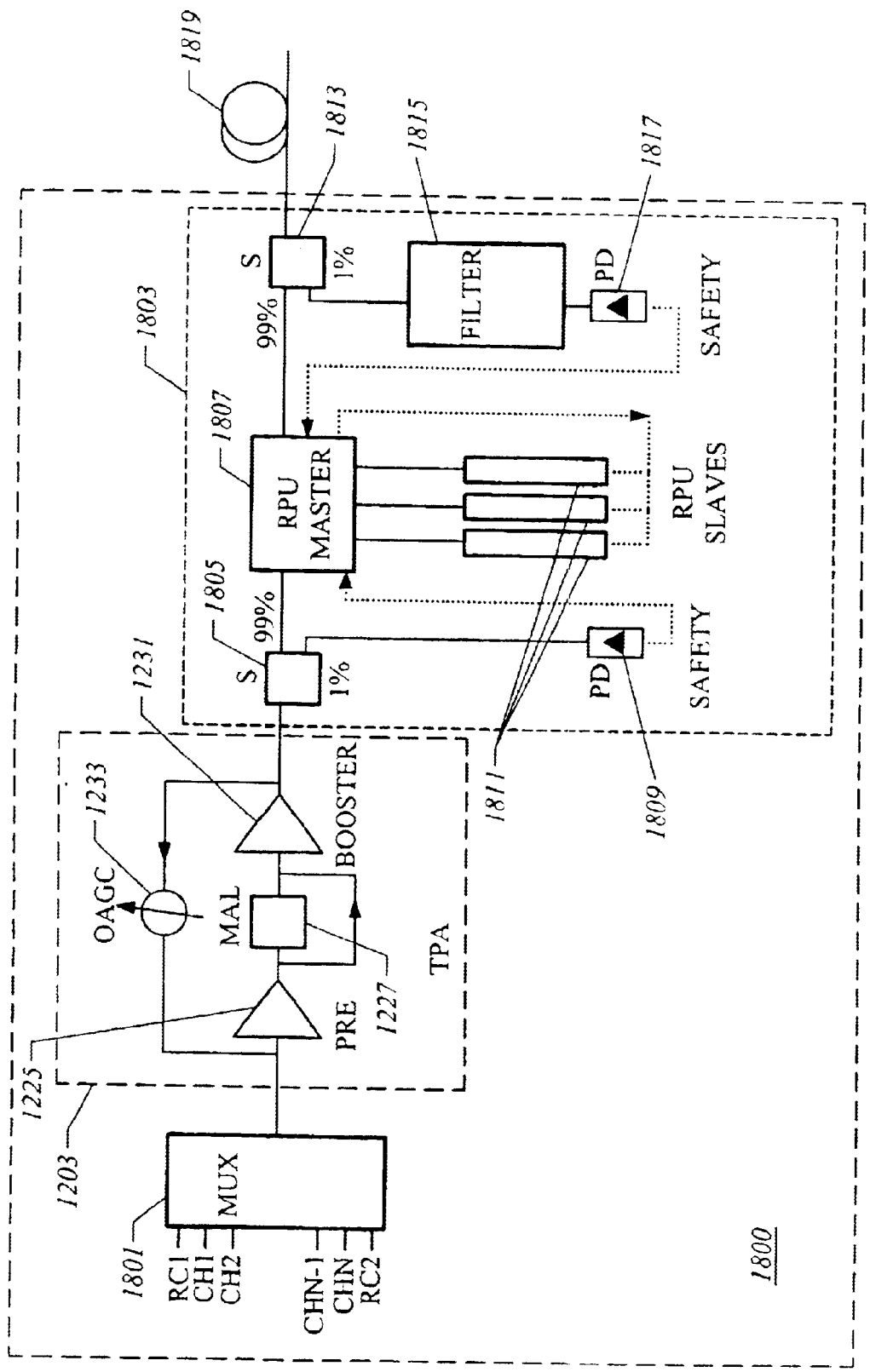
FIG. 18 is a diagram of a transmitting terminal with bi-directional Raman pumping, in accordance with an embodiment of the present invention.

FIG. 18 shows the transmitting terminal in case of co-propagant Raman pumping, according to an embodiment of the present invention. Transmitting terminal 1800 includes a MUX 1801, which multiplexes N-channels (CH 1–CH N) along with reference channels RC1 and RC2 into a composite optical signal that is sent to an optical line amplifier 1203. The output of the optical line amplifier 1203 is forwarded to a co-propagant Raman pumping unit 1803. The RPU 1803 includes a splitter 1805 that outputs to an RPU master 1807 as well as a photodiode 1809. The RPU master 1807 controls multiple RPU slaves 1811. The RPU master 1807 outputs to a splitter 1813, which is connected to an optical filter 1815 that drives a photodiode 1817 to convert the optical signal from splitter 1813 to an electrical signal that is destined for RPU master 1807. The splitter 1813 is connected to a transmission fiber 1819. Optical filter 1815 filters out the residual pump power that is back-scattered by the transmission fiber 1819. To measure the counter-propagant Raman amplified spontaneous emission (ASE) from fiber 1819 (and thus, perform the safety measures), the residual pump power must be filtered out before reaching the photodiode 1817. A more detailed structure of co-propagant Raman pump unit is shown in FIG. 19.

Figure 19:
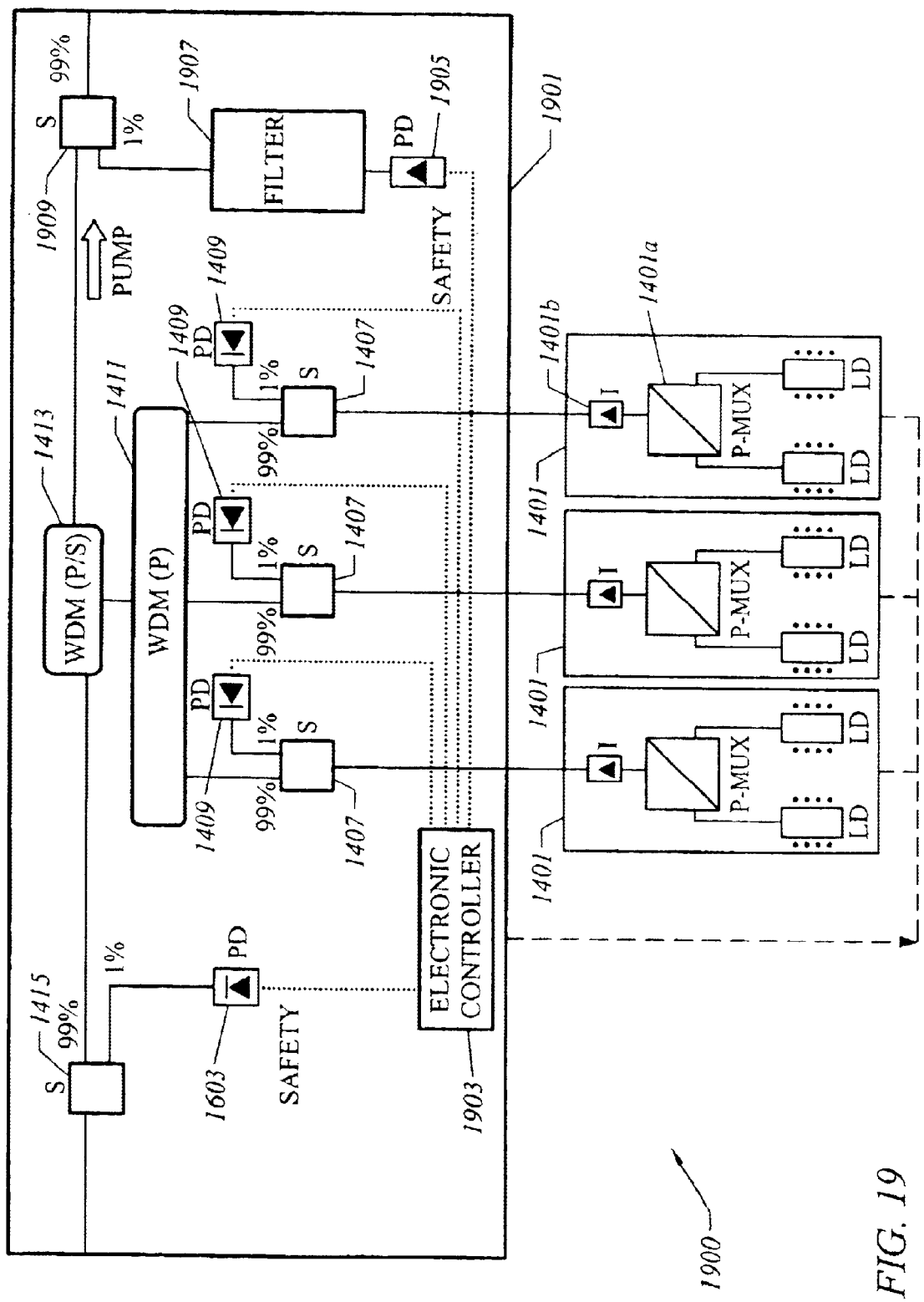
FIG. 19 is a diagram of a co-propagant Raman pump unit, in accordance with an embodiment of the present invention.

FIG. 19 is a diagram of a co-propagant Raman pump unit, in accordance with an embodiment the present invention. Co-propagant RPU 1900 has an optical circuit 1901, which includes electronic controller 1903 for controlling the pump modules 1401. As shown, the co-propagant RPU 1900 contains many common components with that of a counter-propagant RPU 1400 (FIG. 14). Unlike the counter-propagant RPU unit 1400 of FIG. 14, the electronic controller 1903 connects to a photodiode 1905, which is coupled to a filter 1907. The filter is coupled to a splitter 1909 and filters out the residual pump power that is back-scattered by the transmission fiber (not shown). The RPU 1901 is controlled to perform the safety measure of shutting off when no power is received from the preceding EDFA or when no fiber is connected to the 1901.

Figure 20:
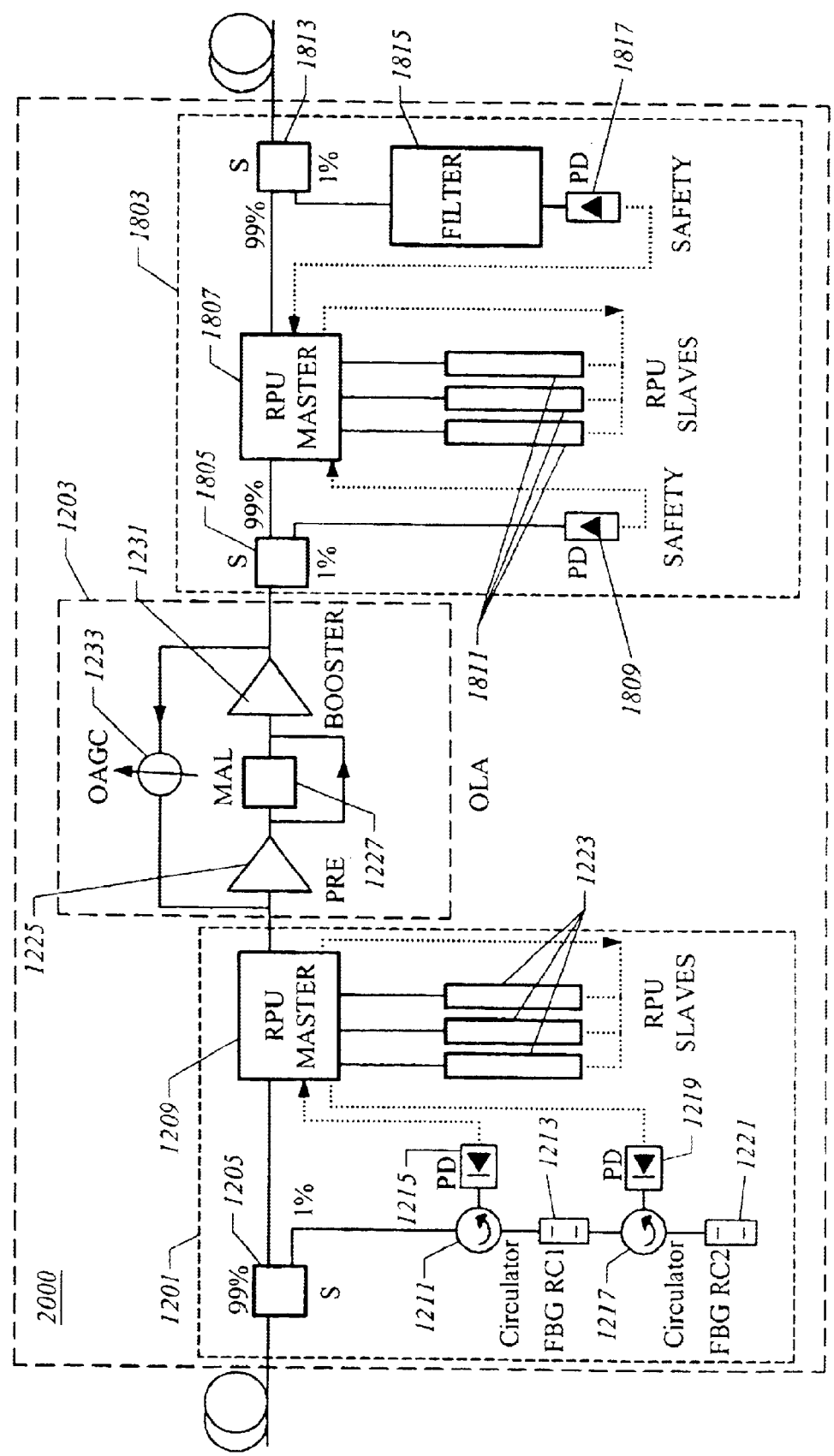
FIG. 20 is a diagram of a line site with bi-directional Raman pumping without extraction and regeneration of the reference channels, in accordance with an embodiment of the present invention.

FIG. 20 is a diagram of a line site with bi-directional Raman pumping without extraction and regeneration of the reference channels, in accordance with an embodiment of the present invention. Line site 2000 includes a counter-propagant RPU 1201 that is connected to an OLA 1203. The line site 2000 also includes a co-propagant RAMAN pumping unit 1803.

Figure 21:
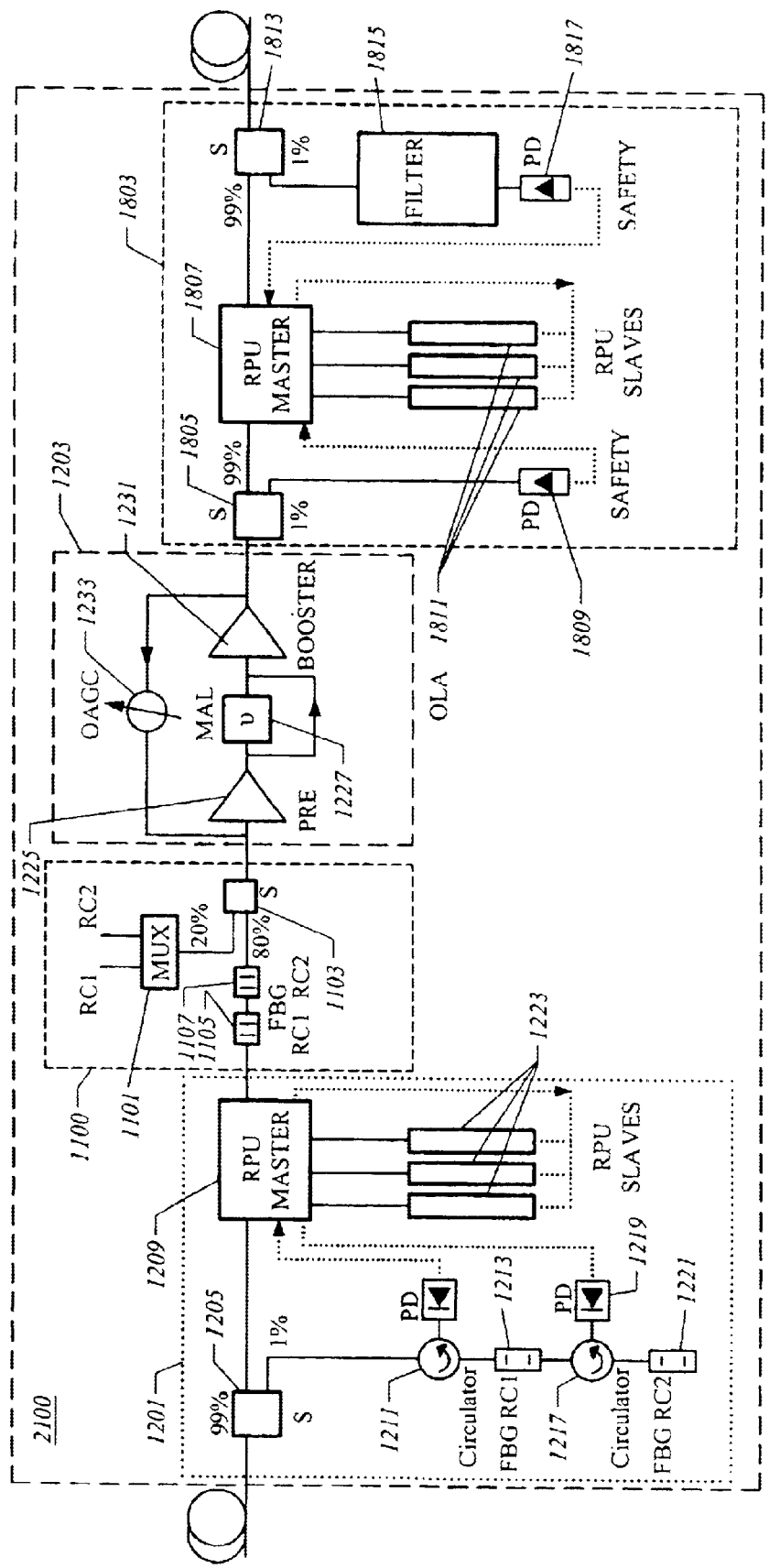
FIG. 21 is a diagram of line site with bi-directional Raman pumping with extraction and regeneration of the reference channels, in accordance with an embodiment of the present invention.

FIG. 21 shows a line site with bi-directional Raman pumping with extraction and regeneration of the reference channels, in accordance with an embodiment of the present invention. Line site 2100 includes RPUs 1201 and 1803. RPU 1201 is connected to an extraction and regeneration circuit 1100. An optical line amplifier 1203 is situated between the extraction and regeneration circuit 1100 and RPU 1803.

Figure 22:
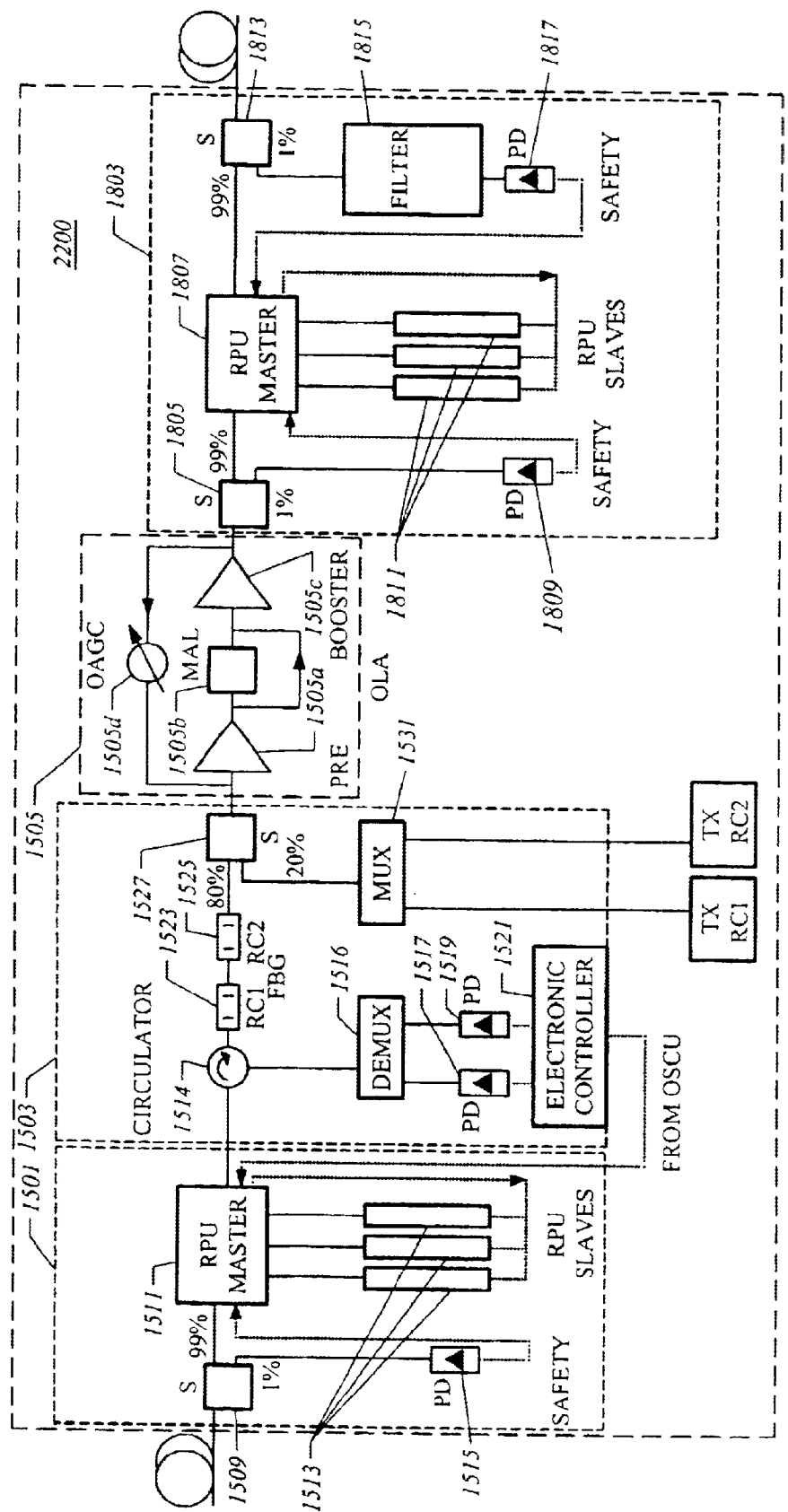
FIG. 22 is a diagram of line site with bi-directional Raman pumping and extraction and regeneration of the reference channels at each OSC unit, in accordance with an embodiment of the present invention.

FIG. 22 is a diagram of line site with bi-directional Raman pumping and extraction and regeneration of the reference channels at each site (OSC unit), in accordance with an embodiment of the present invention. Line site 2200 is similar to the line site 1500 of FIG. 15, in which line site 1500 provides a counter-propagant RPU with extraction and regeneration of the reference channels. Line site 2200 provides an additional component, namely, a co-propagant RPU 1803. RPU 1803 connects to OLA 1505.

Figure 23:
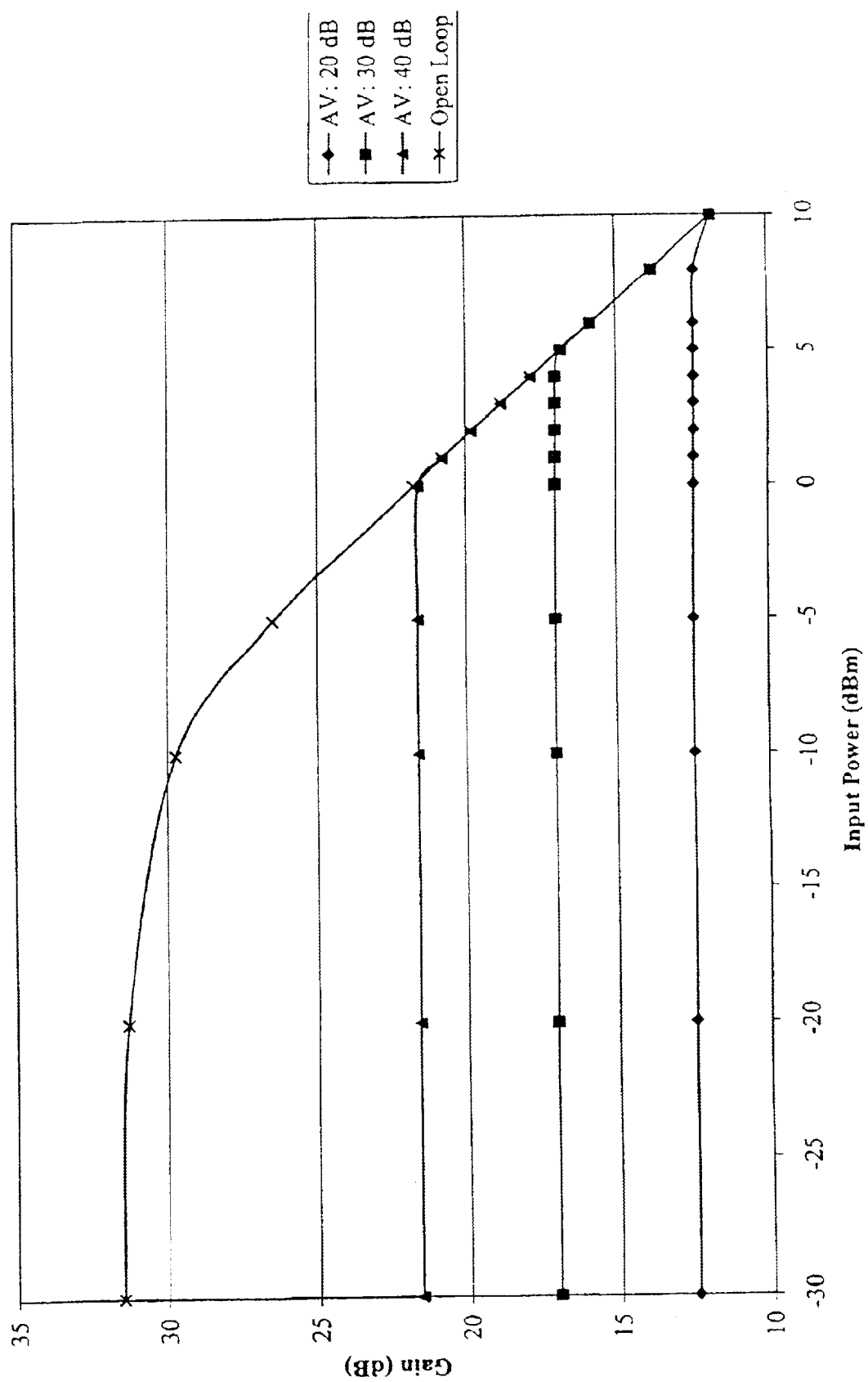
FIG. 23 is a graph of a gain versus input signal power at 1579 nm.
Figure 24:
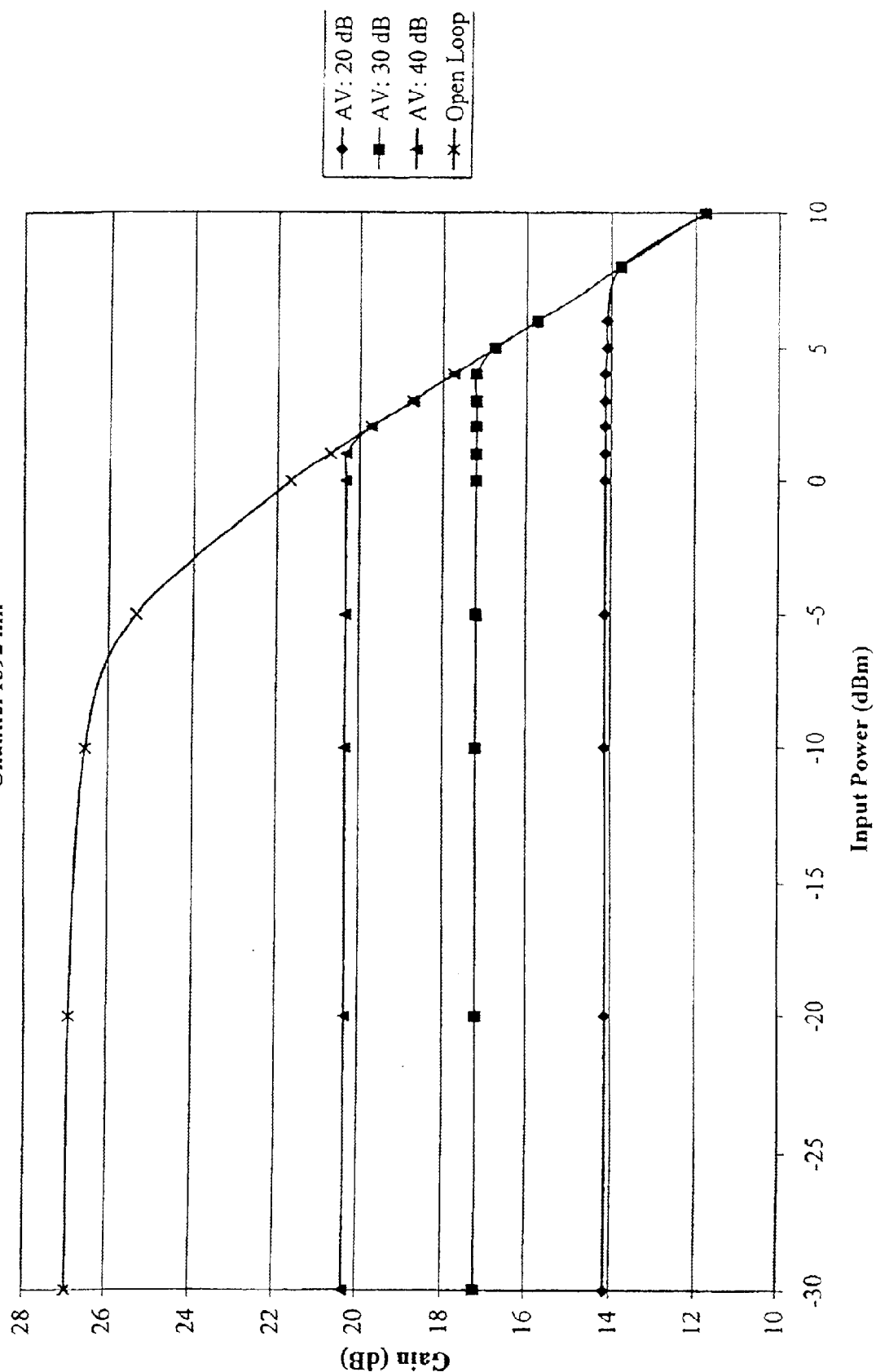
FIG. 24 is a graph of a gain versus input signal power at 1592 nm.

FIGS. 23 and 24 are graphs of a gain versus input signal power for the two channels that are positioned at the boundaries of the sub-band (i.e., 1579 nm–1592 nm). The graphs reveal that the gain control mechanism is effective in controlling the power per channel variation at the EDFA output due to number of channel variation at the EDFA input.

Figure 25:
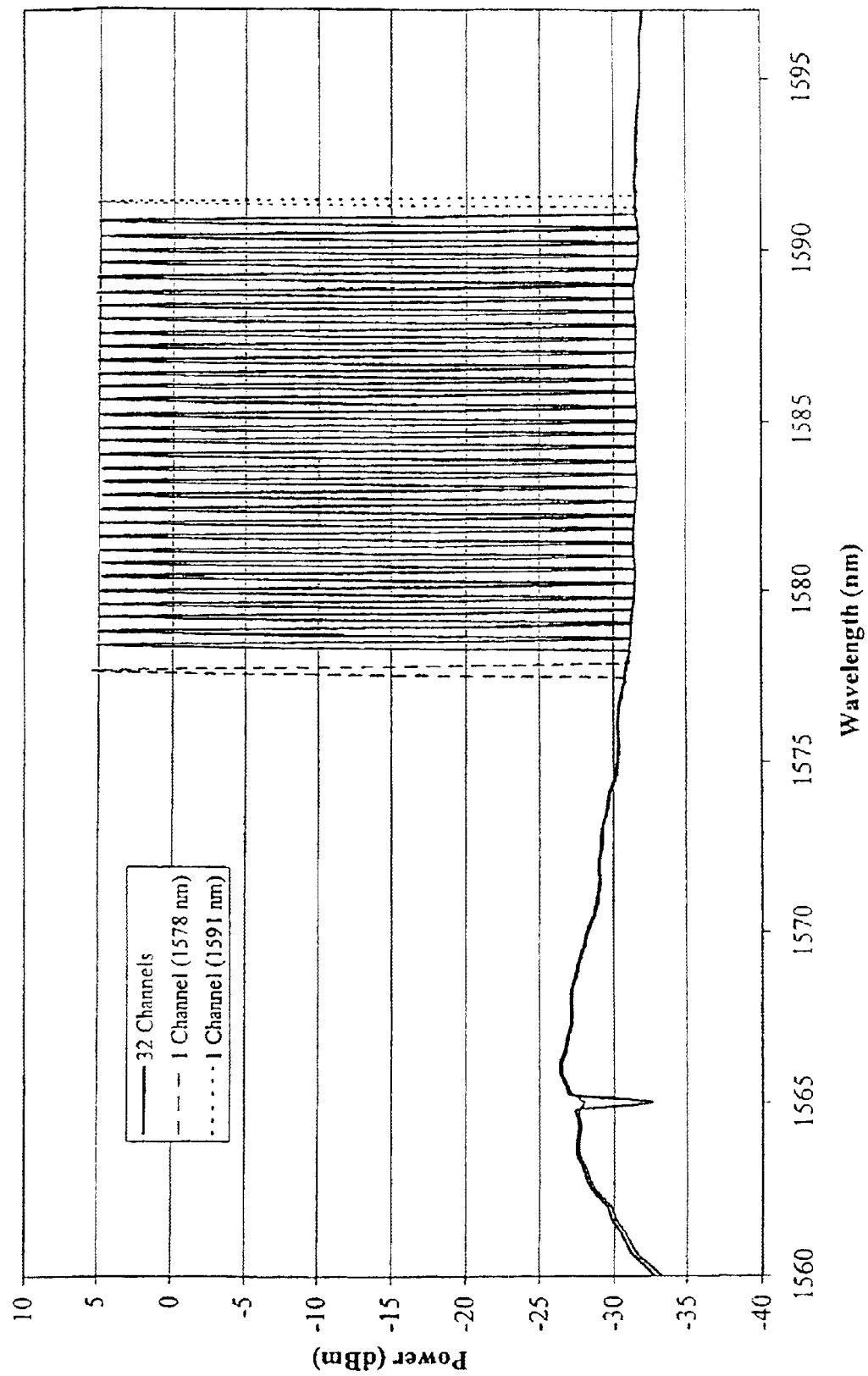
FIG. 25 is a graph of an EDFA output spectra of a WDM system with 32 channels and the reference channels.

FIG. 25 is a graph of an EDFA output spectra with all 32 channels and only one channel. The graphs of FIGS. 23–25 are generated based upon a system with parameters that enumerated in Table 1. The performances of ultra-long-haul WDM systems depend on the distributed Raman pumping configurations. The system provides the transmission of 32 WMD channels, which are spaced 50 GHz a part and are allocated in the L-band, using counter-propagant or bi-directional distributed Raman pumping.

TABLE 1

| | |
|---|---|
| Maximum number of channels: | 32 + 2 reference channels |
| Bit-rate: | 10 Gb/s |
| System bandwidth: | 1579 nm–1592 nm |
| System capacity: | 320 Gb/s |
| Channel spacing: | 50 GHz |
| Span budget: | 25 × 23 dB |
| Raman amplification: | counter-propagant |
| Pump wavelengths: | 1469 nm, 1477.5 nm, 1486 nm |
| Fiber types: | LEAF ®, SMR, NZDF |

For such a system, with 32 WDM channels and signal power per channel at the EDFA input of −12 dBm (as required to ensure acceptable OSNR performance at the system output), the performance of the AOGC scheme (shown in FIG. 10) can be seen in FIGS. 23, 24 and 25. FIGS. 23–24 reveal that by properly setting the variable attenuator 1007, the required gain control and flatness can be attained. As seen in FIG. 25, the output spectra of the amplifier of FIG. 10, with respect to all 32 input channels and only two channels, indicates that an excellent gain control mechanism is achieved.

Figure 26:
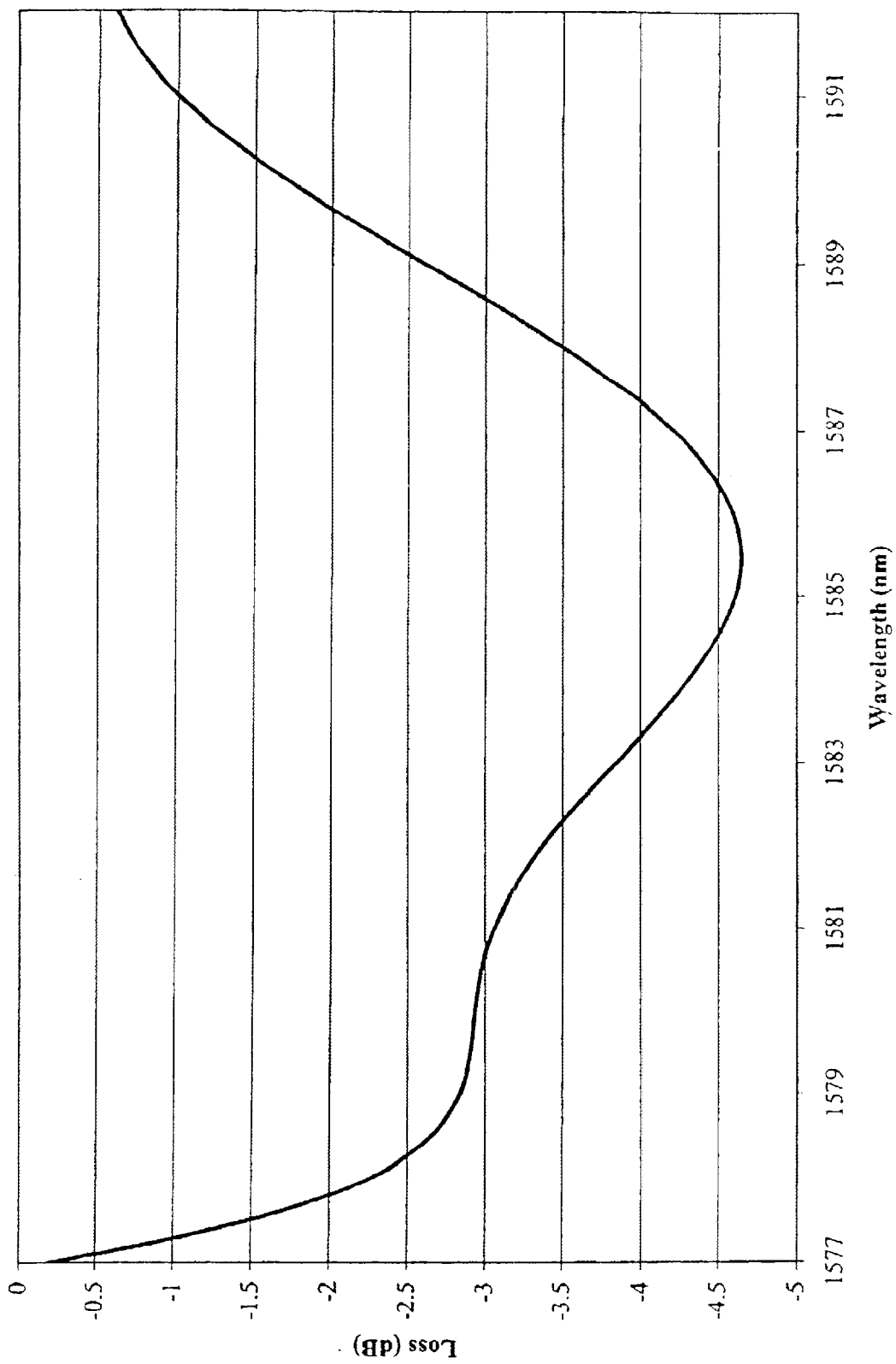
FIG. 26 is a graph of the loss associated with a gain equalizing filter that is introduced every three spans with counter-propagant Raman pumping within a WDM system.

FIG. 26 is a graph of the loss associated with a gain equalizing filter that is introduced every three spans with counter-propagant Raman pumping within a WDM system. Gain equalizing filters are introduced every three spans for a system that employs a sub-band in the range of about 1579 nm–1592 nm. The shape of the filter is shown in FIG. 26, according to an embodiment of the present invention. The filter curve exhibits about a −0.25 dB loss at 1577 nm, with a plateau of a little greater than −3.0 dB between 1579 nm and 1580 nm, and dips below −4.5 dB at about 1585 nm. From 1587 nm–1590 nm, the filter curve is nearly linear.

Figure 27:
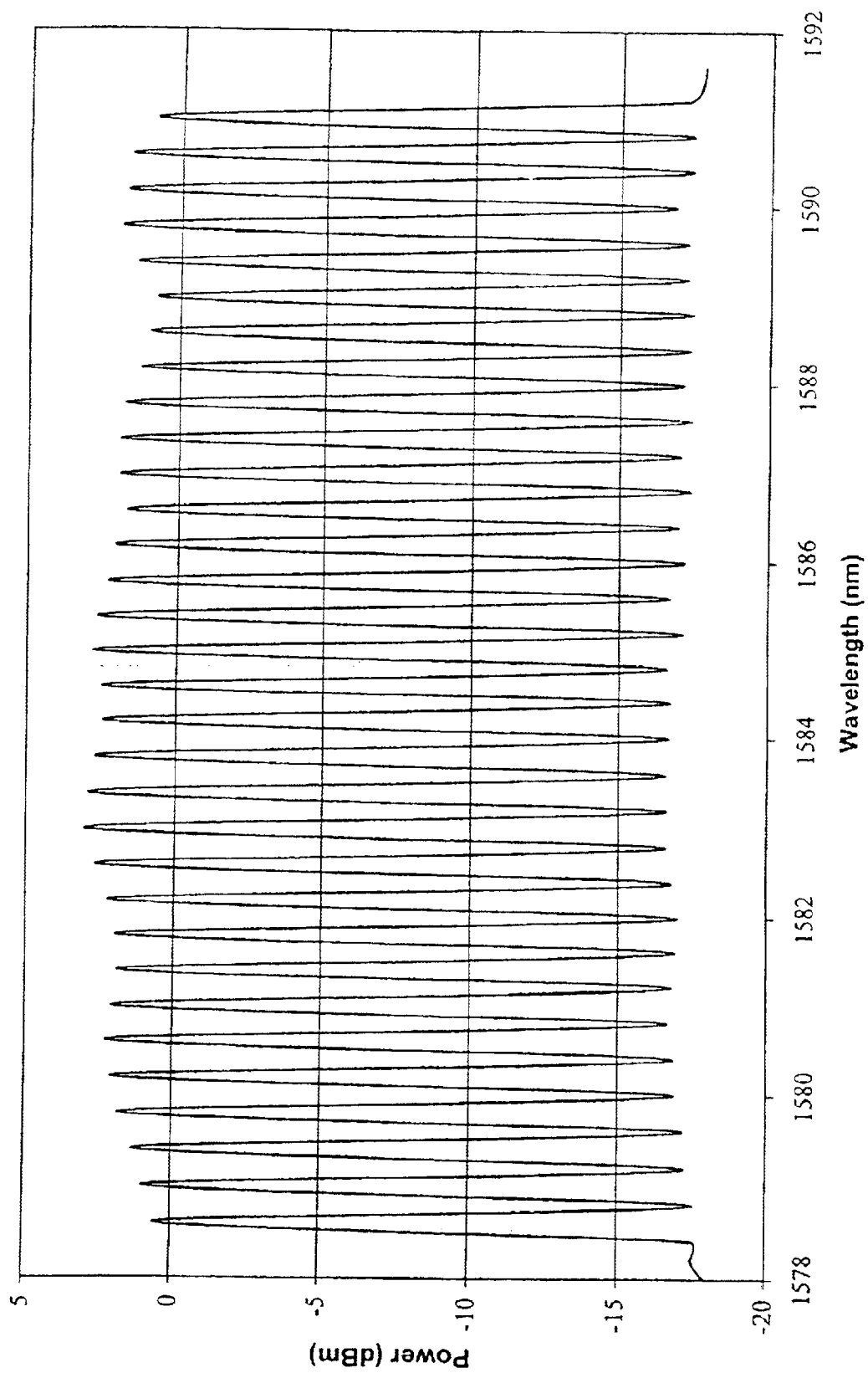
FIG. 27 is a graph of an output spectrum (25×23 dB, non-zero dispersion-shifted fiber) of a WDM system with 32 channels and without Raman gain control.
Figure 28:
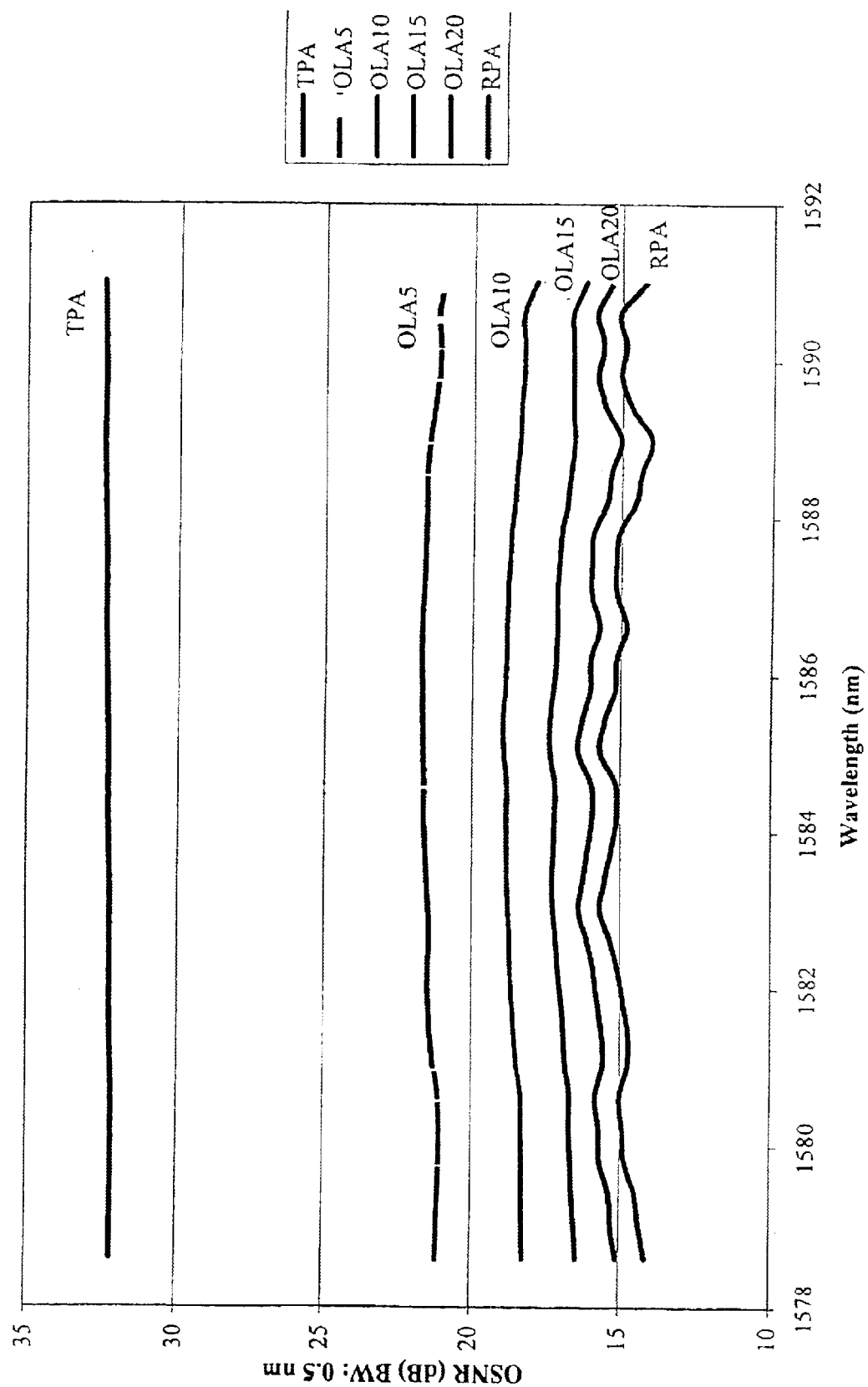
FIG. 28 is a graph of an optical SNR (OSNR) (25×23 dB, non-zero dispersion-shifted fiber) of a WDM system with 32 channels without reference channels.

FIG. 27 is a graph of an output spectrum (25×23 dB, non-zero dispersion-shifted fiber) of a WDM system with 32 channels and without Raman gain control. It should be noted that the graphs of FIGS. 27–36 show the results of a NZDS fiber that provides minimal dispersion within the 1550 nm operating window; in particular the total dispersion is 1.0 to 6.0 ps/(nm km) over 1530 nm to 1585 nm. FIG. 28 is a graph of an optical SNR (OSNR) (25×23 dB, non-zero dispersion-shifted fiber) of a WDM system with 32 channels without reference channels. The OSNR of greater than about 14 dB (0.5 nm ) after 25 spans is observed. Additionally, a maximum power variation among channels of about 3 dB is shown.

Figure 29:
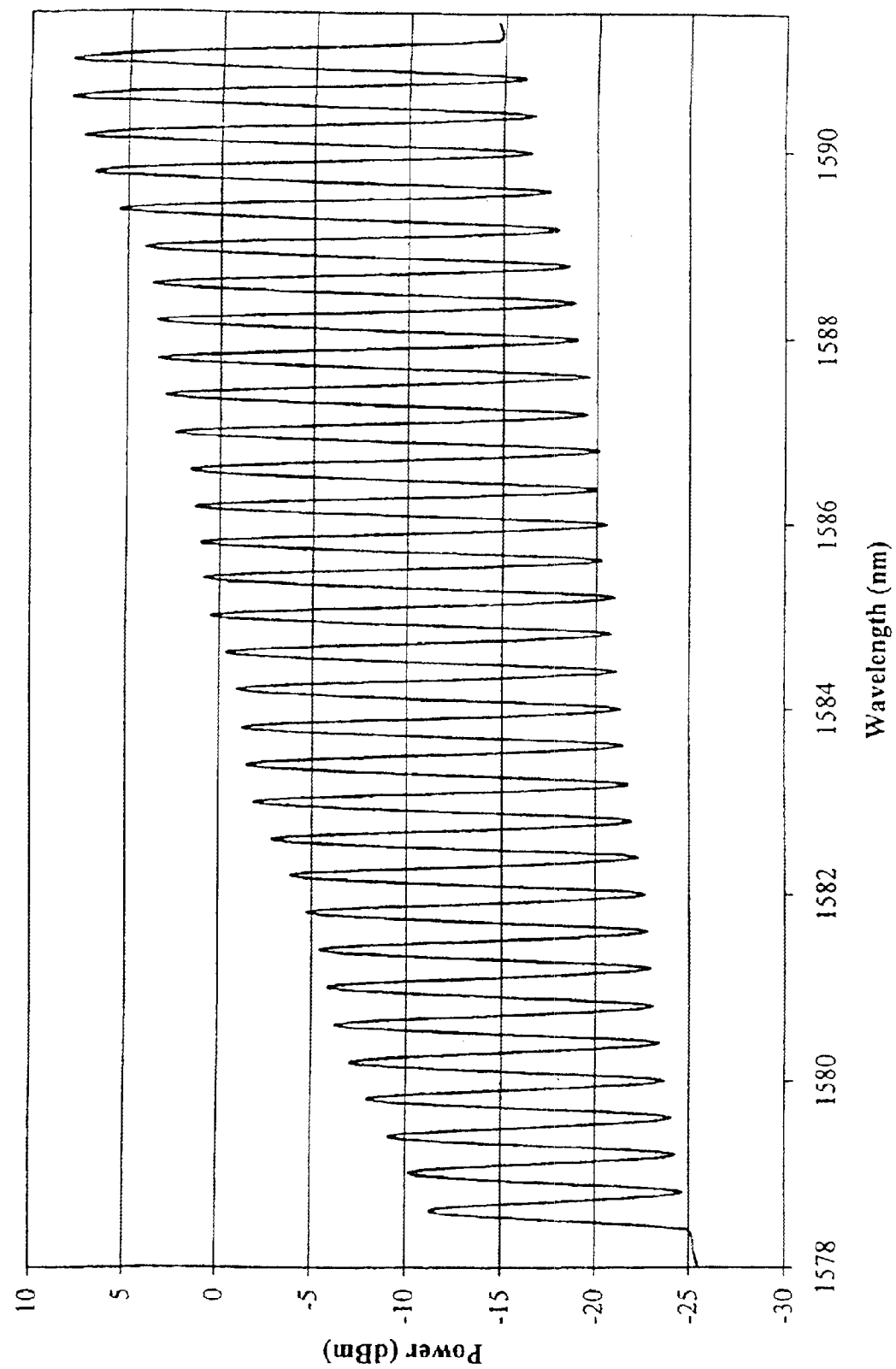
FIG. 29 is a graph of an output spectrum (25×21 dB, non-zero dispersion-shifted fiber) of a WDM system with 32 channels and without Raman gain control.
Figure 30:
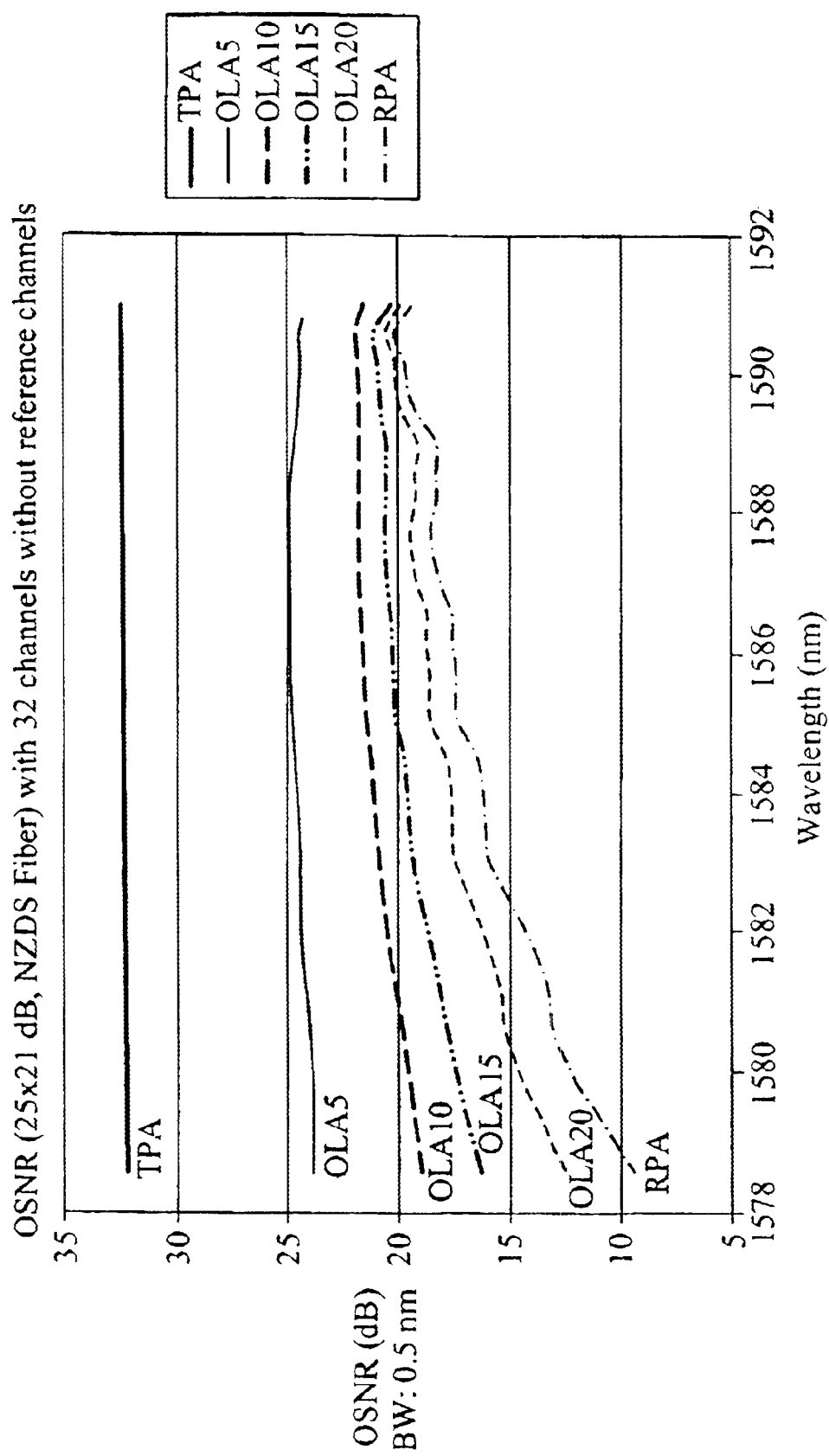
FIG. 30 is a graph of an OSNR (25×21 dB, non-zero dispersion-shifted fiber) of a WDM system with 32 channels and without Raman gain control.

FIG. 29 is a graph of an output spectrum (25×21 dB, non-zero dispersion-shifted fiber) of a WDM system with 32 channels and without Raman gain control. FIG. 30 is a graph of an OSNR (25×21 dB, non-zero dispersion-shifted fiber) of a WDM system with 32 channels and without Raman gain control. As shown in FIG. 29, without reference channels, there is a power increase along the system in the sub-band of interest, thereby degrading the system performance in terms of SNR and nonlinear effects.

Figure 31:
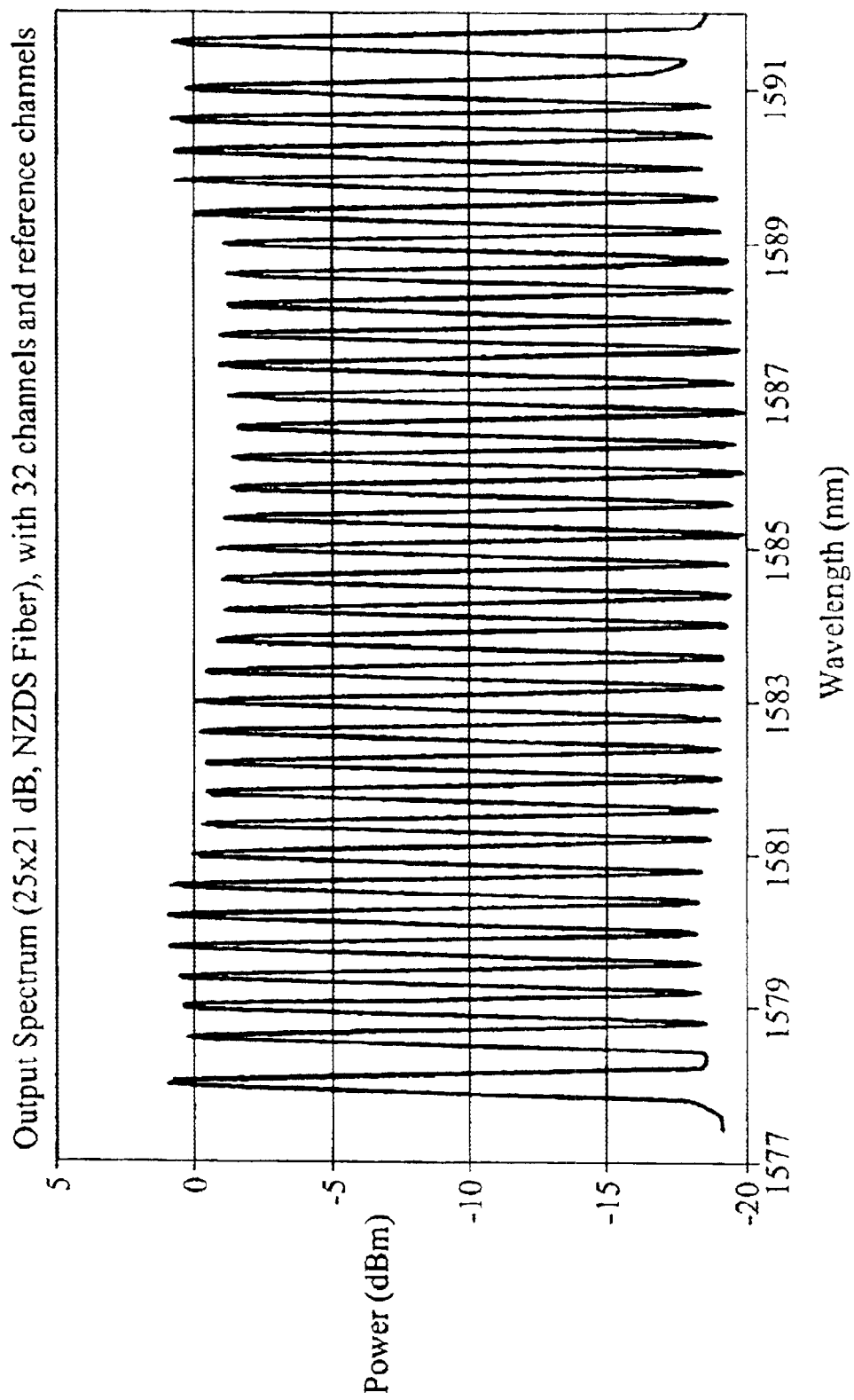
FIG. 31 is a graph of an output spectrum (25×21 dB, non-zero dispersion-shifted fiber) of a WDM system with 32 channels and reference channels regenerated every three spans.
Figure 32:
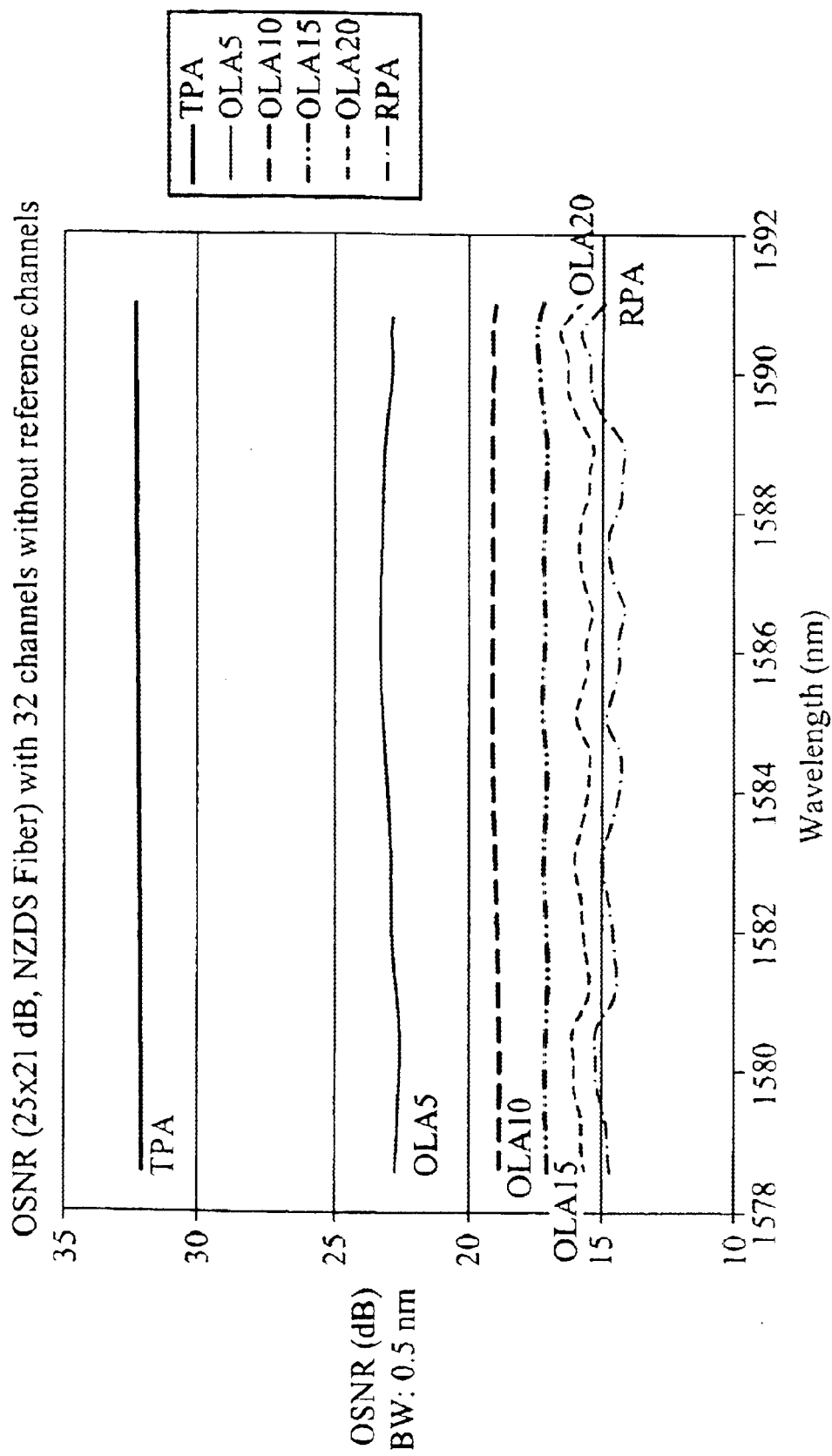
FIG. 32 is a graph of an OSNR (25×21 dB, non-zero dispersion-shifted fiber) of a WDM system with 32 channels and reference channels regenerated every three spans.

FIG. 31 is a graph of an output spectrum (25×21 dB, non-zero dispersion-shifted fiber) of a WDM system with 32 channels and reference channels regenerated every three spans. FIG. 32 is a graph of an OSNR (25×21 dB, non-zero dispersion-shifted fiber) of a WDM system with 32 channels and reference channels regenerated every three spans. Under this scenario, the counter 32 propagant RPU is adapted, span by span, to adjust the input power of the EDFA at the nominal value (about −12 dBm/ch). In particular, the total pump power launched in counter-propagant direction into the transmission fiber has been reduced from 350 mW to 295 mW. This ensures good system performance without tilt accumulation with a minimum OSNR of greater than 14 dB and a maximum power variation among channels of about 3 dB. The gain control mechanism according to the present invention can also be implemented to compensate for the gain variation that is induced by system cable aging and/or cable repairs. To illustrate this point, 0.5 dB of extra loss into each span (25×23.5 dB) is introduced into the analysis, as discussed below with respect to FIGS. 33–36.

Figure 33:
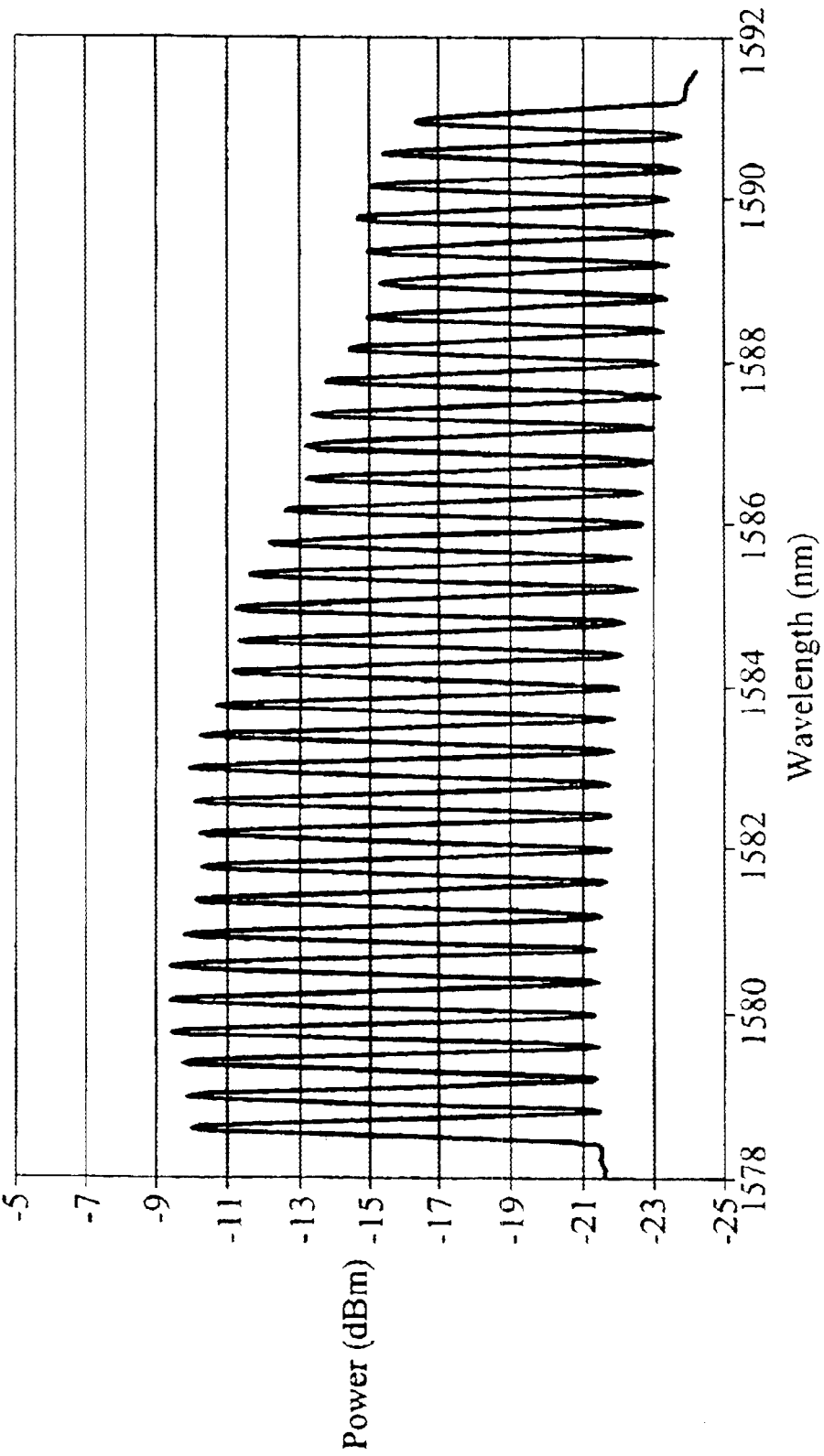
FIG. 33 is a graph of an output spectrum (25×23.5 dB, non-zero dispersion-shifted fiber) of a WDM system with 32 channels and without Raman gain control.
Figure 34:
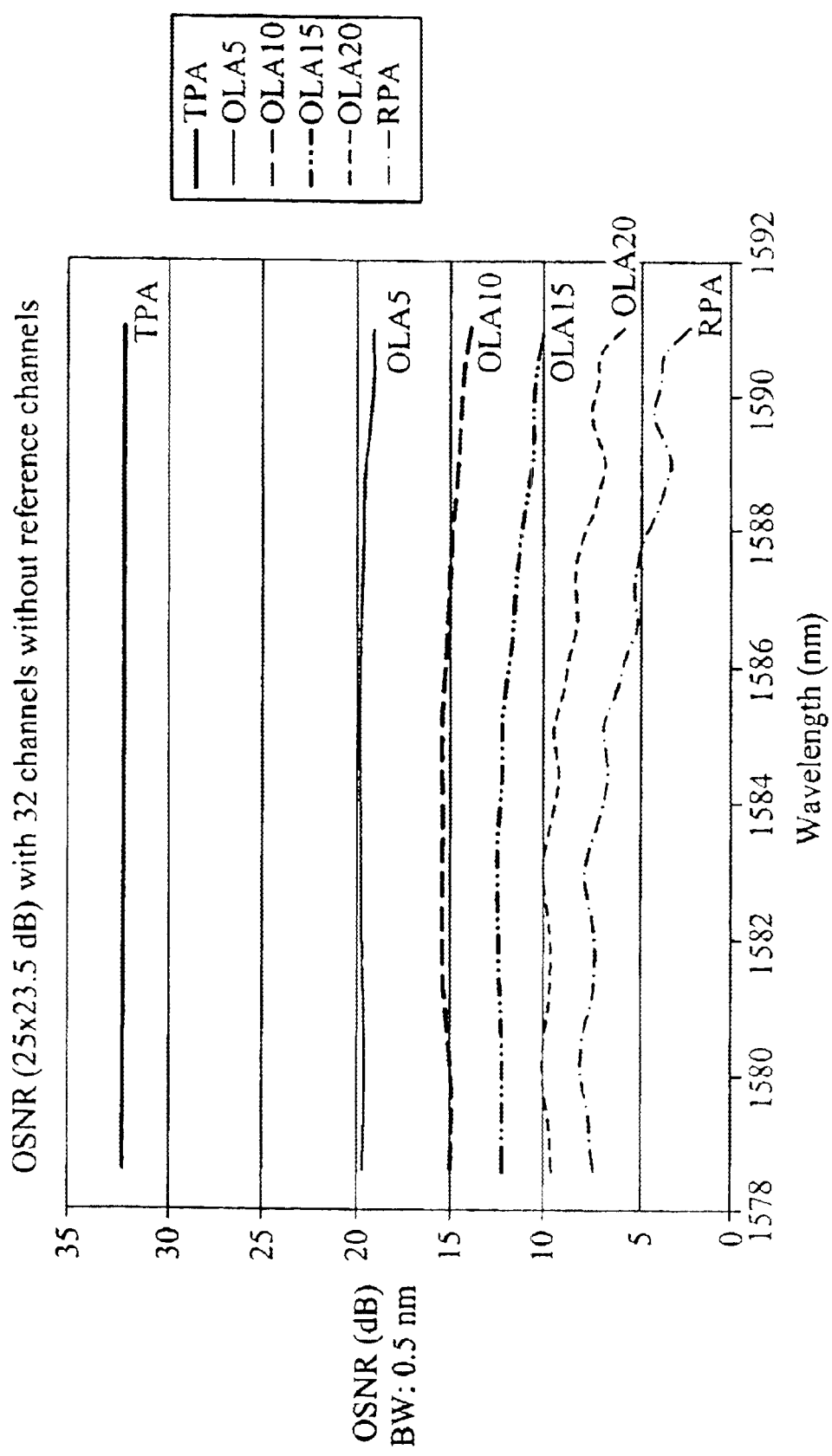
FIG. 34 is a graph of an OSNR (25×23.5 dB, non-zero dispersion-shifted fiber) of a WDM system with 32 channels without Raman gain control.
Figure 35:
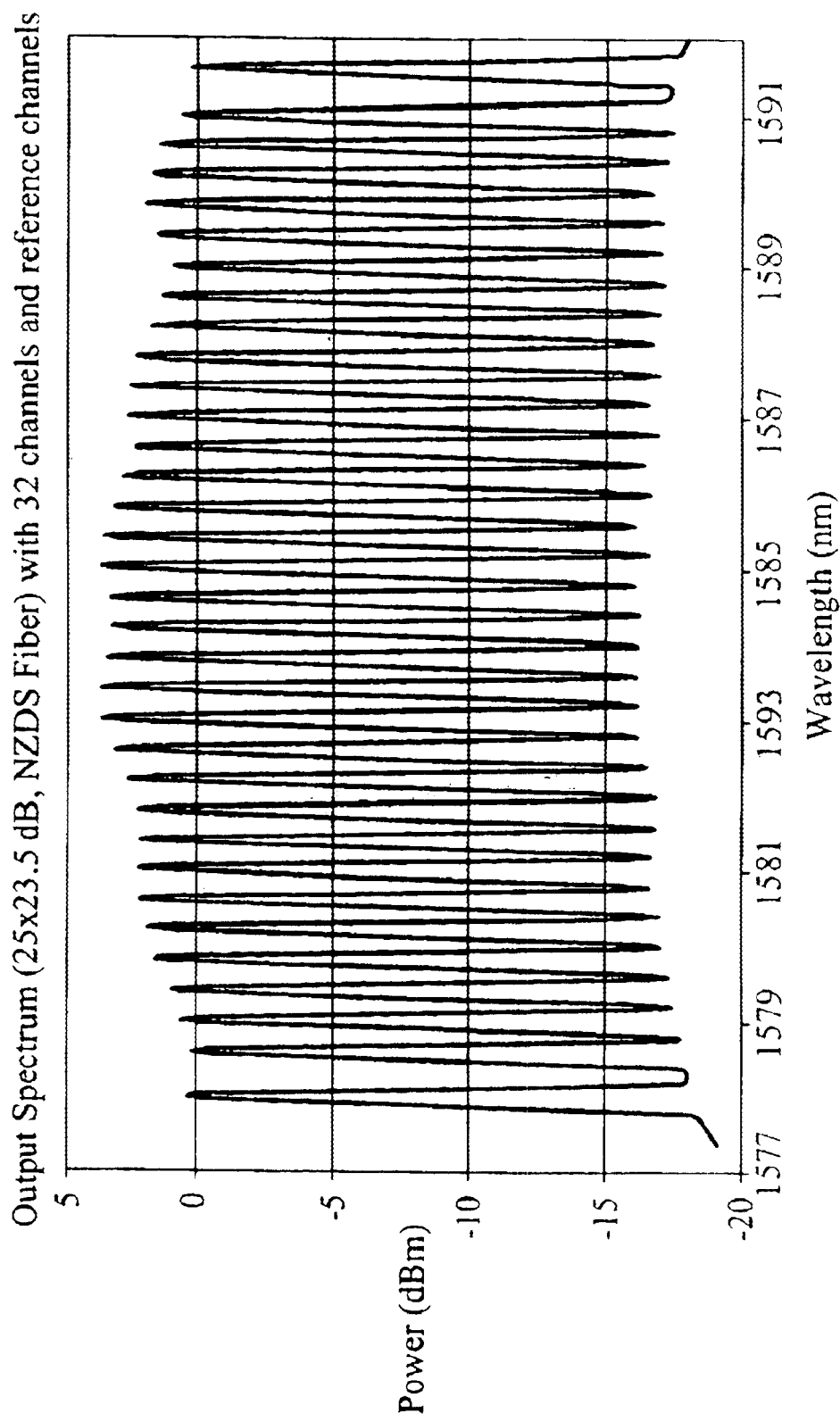
FIG. 35 is a graph of an output spectrum (25×23.5 dB, non-zero dispersion-shifted fiber) of a WDM system with 32 channels and reference channels regenerated every three spans.
Figure 36:
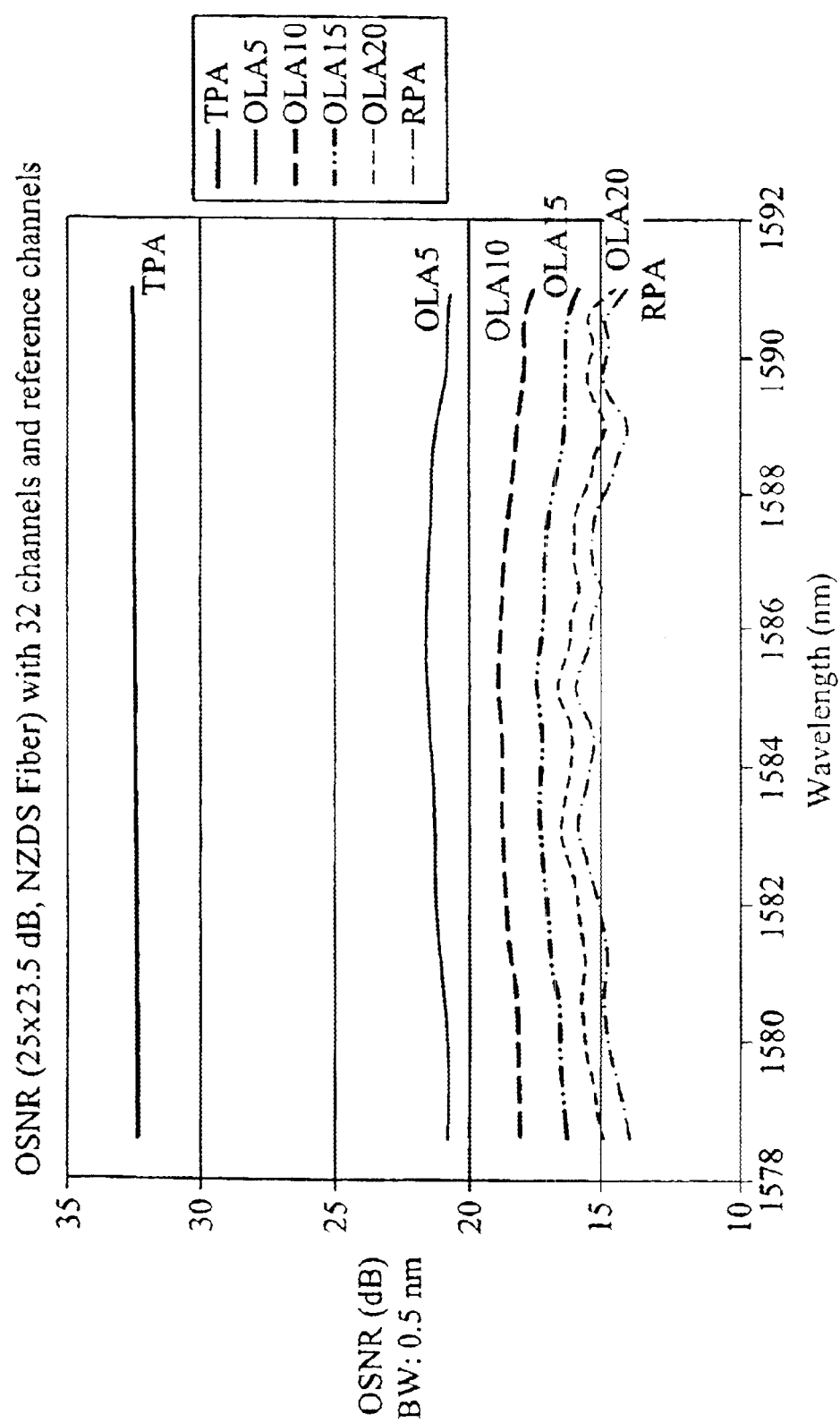
FIG. 36 is a graph of an OSNR (25×23.5 dB, non-zero dispersion-shifted fiber) of a WDM system with 32 channels and reference channels regenerated every three spans.

FIGS. 33 and 34 are graphs of an output spectrum (25×23.5 dB, non-zero dispersion-shifted fiber) and an optical SNR (25×23.5 dB, non-zero dispersion-shifted fiber), respectively, of a WDM system with 32 channels and without Raman gain control. In contrast, FIGS. 35 and 36 are graphs of an output spectrum (25×23.5 dB, non-zero dispersion-shifted fiber) and of an optical SNR (25×23.5 dB, non-zero dispersion-shifted fiber), respectively, with 32 channels and reference channels regenerated every three spans. FIGS. 33, 34, 35 and 36 show the output spectra and SNR performances respectively with and without Raman gain control. Without Raman gain control the minimum OSNR is reduced to about 3 dB with a maximum power variation among the channels that is greater than 6.5 dB. This substantial OSNR penalty can be almost completely avoided by introducing the Raman gain control mechanism. A slight increase in the total pump power launched into each span (from 350 mW to 375 mW) ensures a minimum OSNR of 13 dB with a maximum power variation among channels of about 3 dB.

Figure 37:
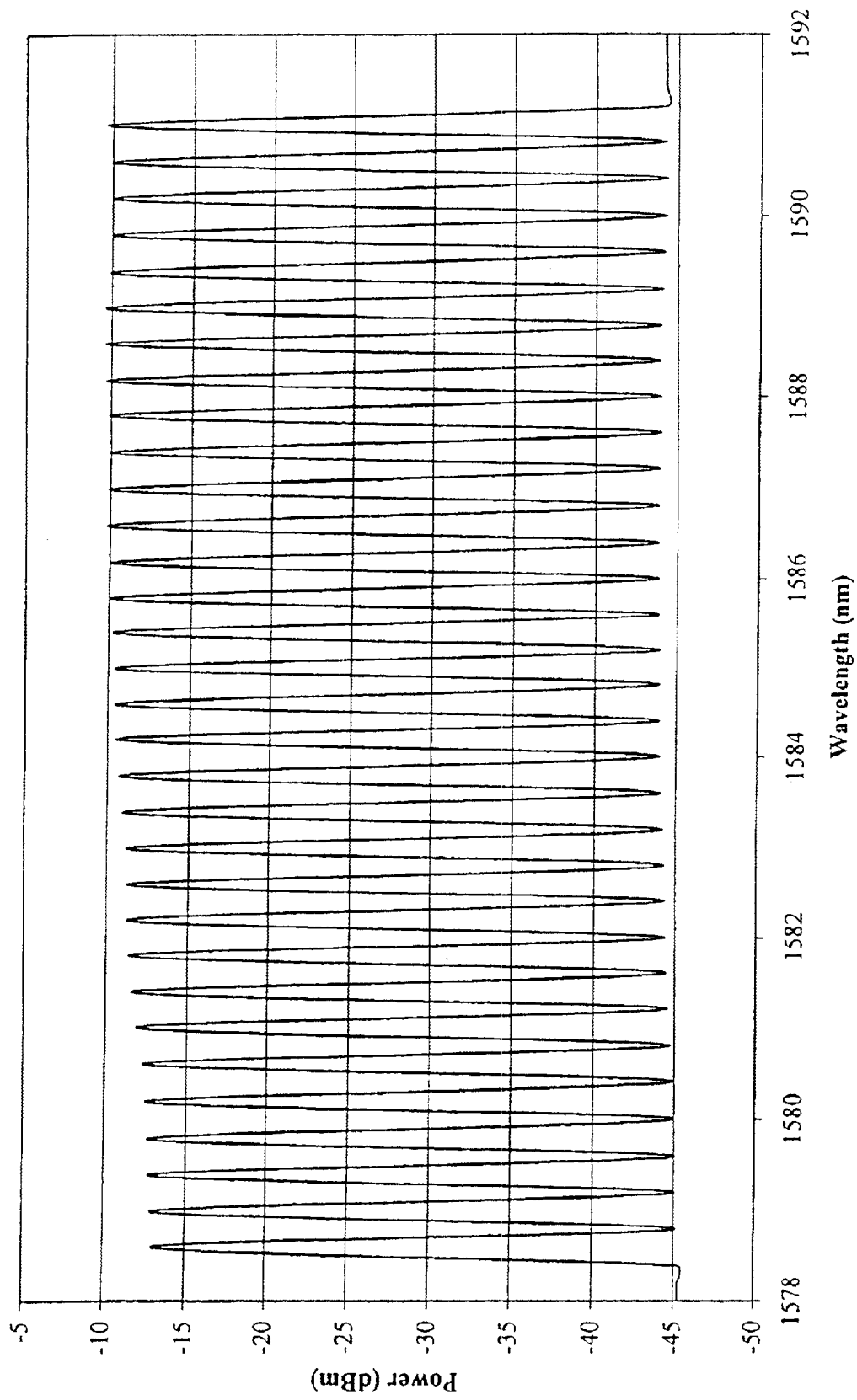
FIG. 37 is a graph of a spectrum of a WDM system at the end of the first span with TPA (Transmit Power Amplifier) tilted by 3.5 dB without Raman gain control.
Figure 38:
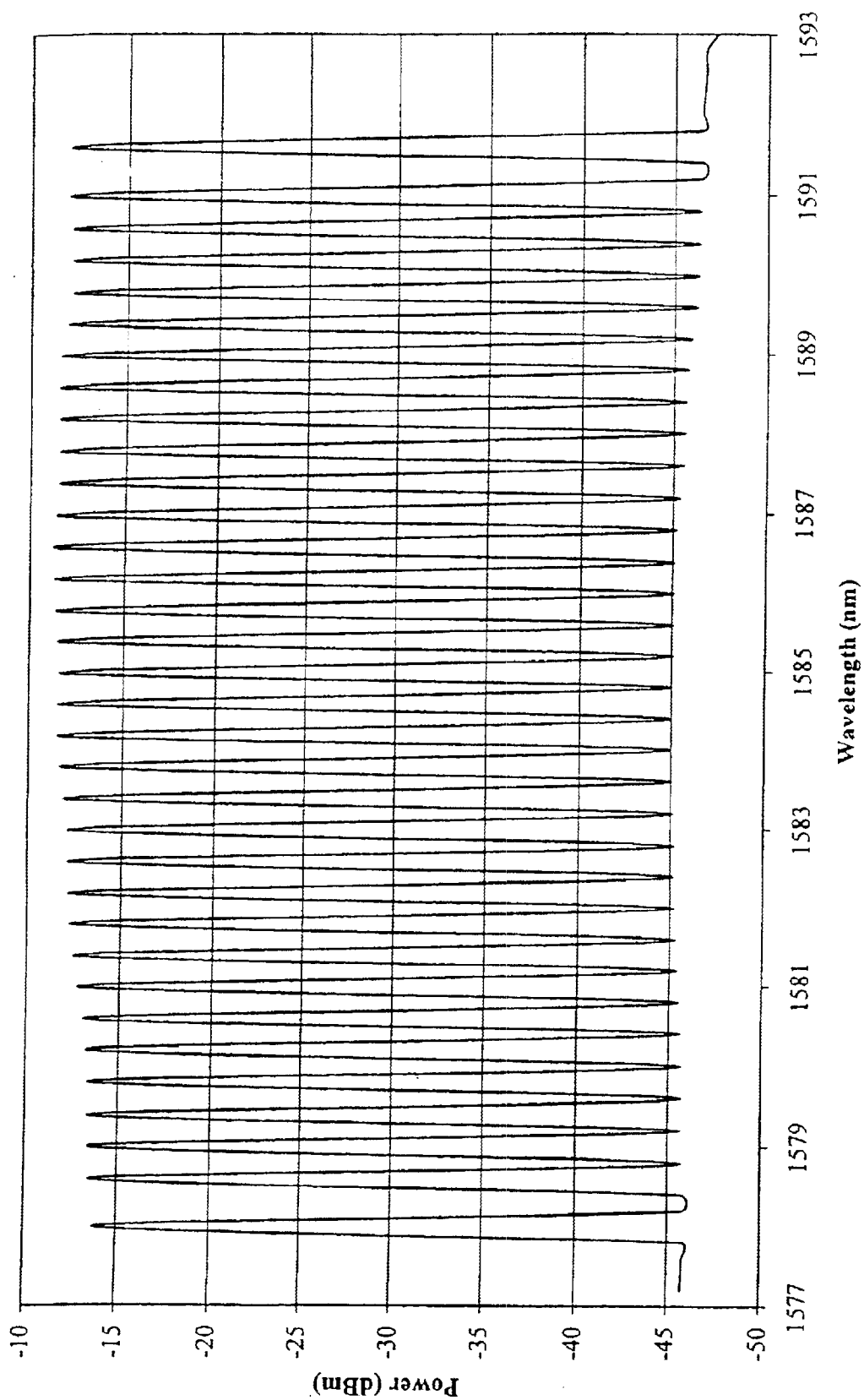
FIG. 38 is a graph of a spectrum of a WDM system at the end of the first span with TPA tilted by 3.5 dB with reference channels.

The Raman tilt control is also effective in controlling tilt variations that are locally induced, for example, by the EDFA. To illustrate this capability, a tilt of 3.5 dB is introduced at the TPA (Transmit Power Amplifier) output, as discussed below in FIGS. 37 and 38. FIG. 37 shows a graph of a spectrum at the end of the first span with TPA tilted by 3.5 dB without Raman gain control. Without control of the two reference channels, there is tilt of about 3.3 dB, with a total power at the first EDFA input of about 4.5 dBm. In contrast, FIG. 38 is a graph of a spectrum at the end of the first span with TPA tilted by 3.5 dB, in which reference channels are employed to provided Raman gain control. With Raman gain control, the tilt is reduced to 1.5 dB, with total power at the amplifier input of about 3.2 dB, this is achieved by changing the three wavelength multiplexed pump power from 135 mW (at 1469 nm), −80 mW (at 1477.5 nm), and −135 mW (at 1486 mn) to 220 mW (at 1469 nm), −80 mW (at 1477.5 nm), and −20 mW (at 1486 nm).

It should be noted that although the tilt that is introduced by the EDFA may not be completely compensated by the Raman tilt control in one single span, the tilt can be further reduced or eliminated with in subsequent spans.

Figure 39:
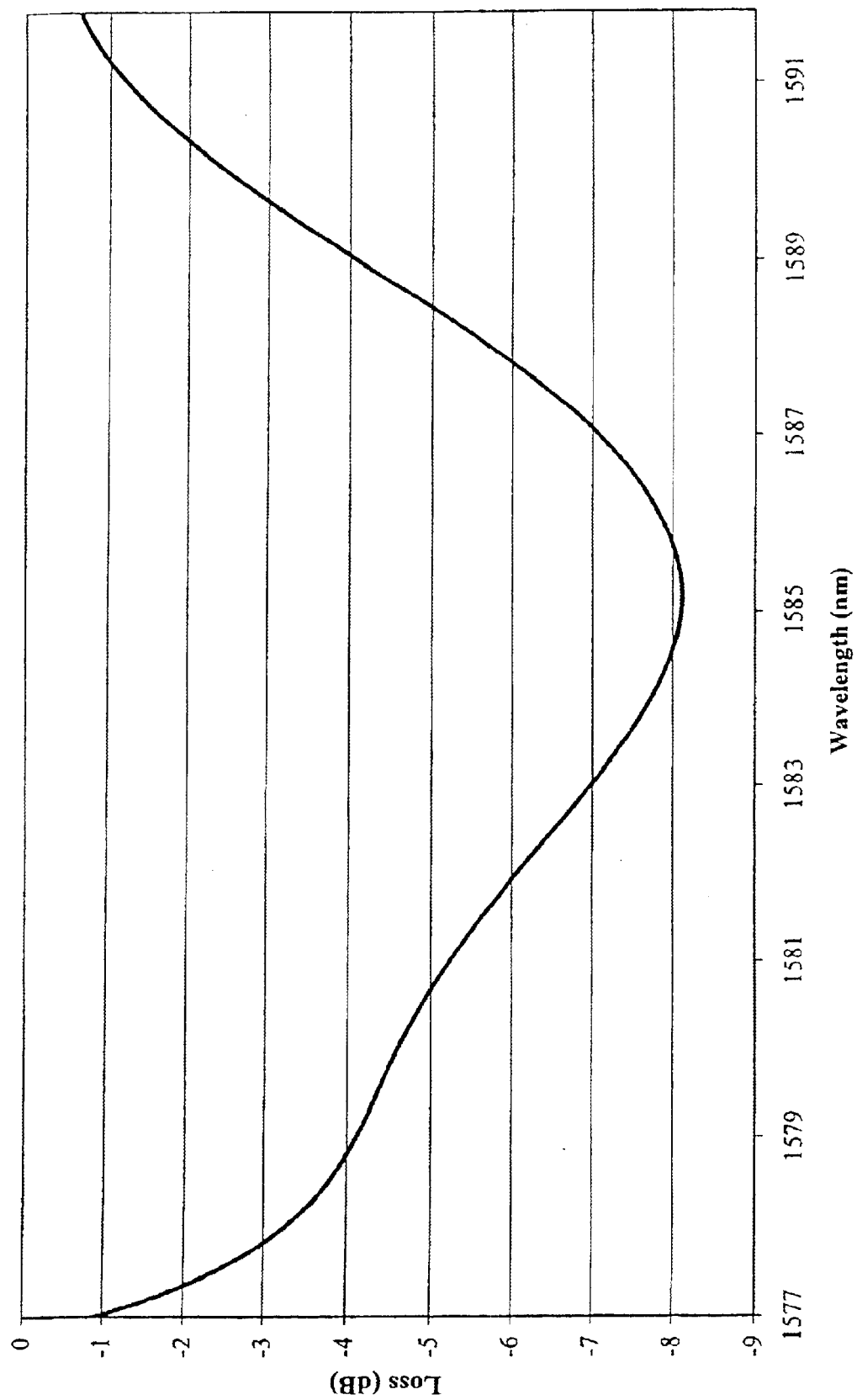
FIG. 39 is a graph of the loss associated with a gain equalizing filter that is deployed every three spans with bidirectional Raman pumping within a WDM system.

FIG. 39 is a graph of the loss associated with a gain equalizing filter that is deployed every three spans with bi-directional Raman pumping within a WDM system. The parameters of the bi-directional Raman pump units are listed in Table 2.

TABLE 2

| | |
|---|---|
| Maximum number of channels: | 32 + 2 reference channels |
| Bit-rate: | 10 Gb/s |
| System bandwidth: | 1579 nm–1592 nm |
| System capacity: | 320 Gb/s |
| Channel spacing: | 50 GHz |
| Span budget: | 25 × 26 dB |
| Raman amplification: | bi-directional |
| Co-propagant pump wavelengths: | 1469 nm, 1477.5 nm, 1486 nm |
| Counter-propagant pump wavelengths: | 1469 nm, 1477.5 nm, 1486 nm |
| Fiber types: | LEAF ®, SMR, NZDF |

As seen in FIG. 39, the filter curve is deeper than in the counter-propagant Raman pumping (FIG. 26) because of the combined gain non-uniformity of the EDFA, co-propagant and counter-propagant DRAs. It should be noted that using co-propagant Raman pump units provides better system performance; however, Raman gain saturation and associated Raman induced cross-talk and fiber nonlinearities should be avoided.

Figure 40:
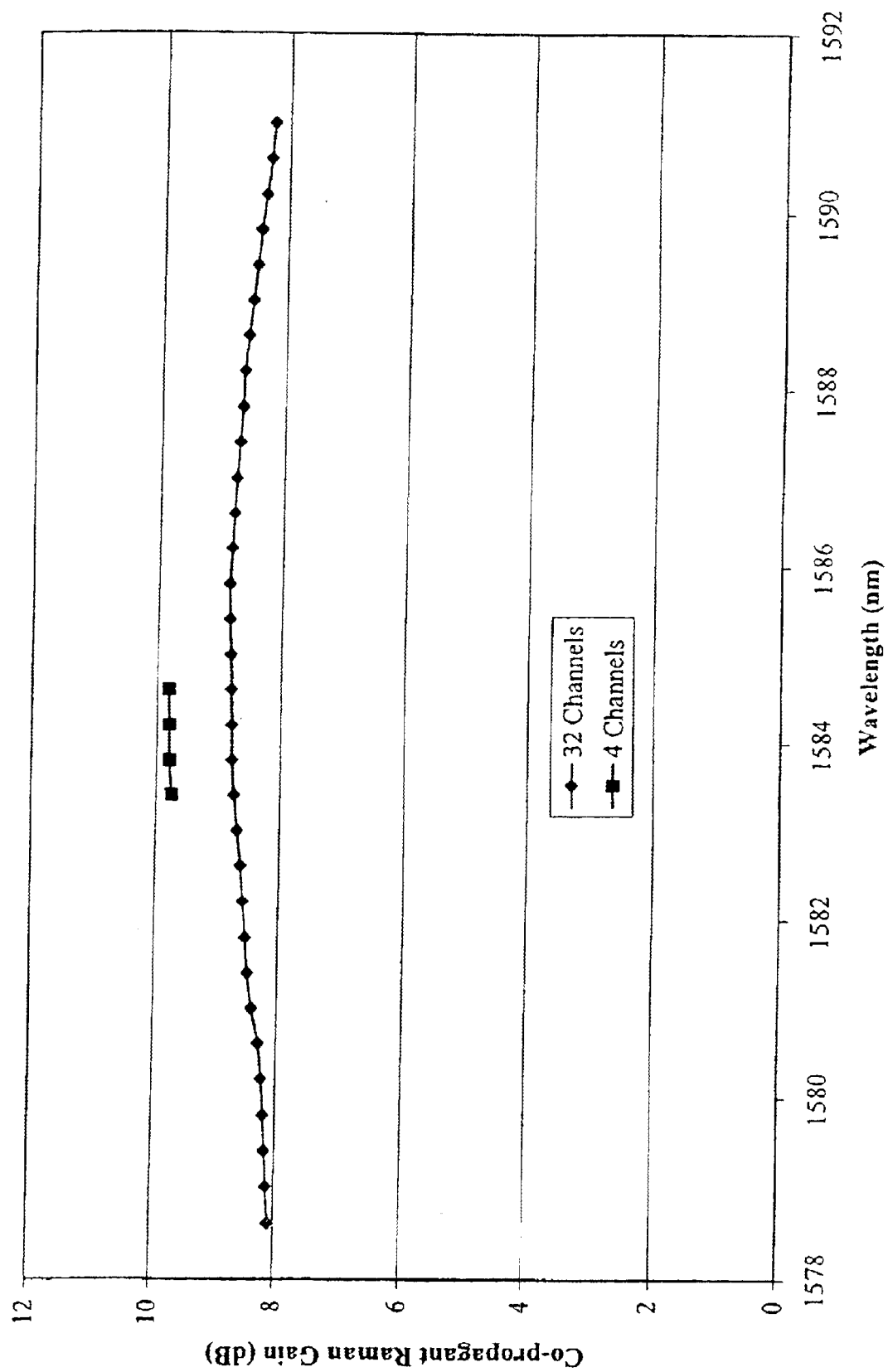
FIG. 40 is a graph showing co-propagant Raman gain saturation of a 32 channel WDM system and a 4 channel WDM system.

FIG. 40 is a graph showing co-propagant Raman gain saturation of a 32 channel WDM system and a 4 channel WDM system. Reducing the number of channels from 32 to 4 causes a co-propagant Raman gain increase of about 1 dB, and a consequent increase of the power per channel along the transmission system. The gain saturation is mainly induced by the co-propagant Raman pumping.

Figure 41:
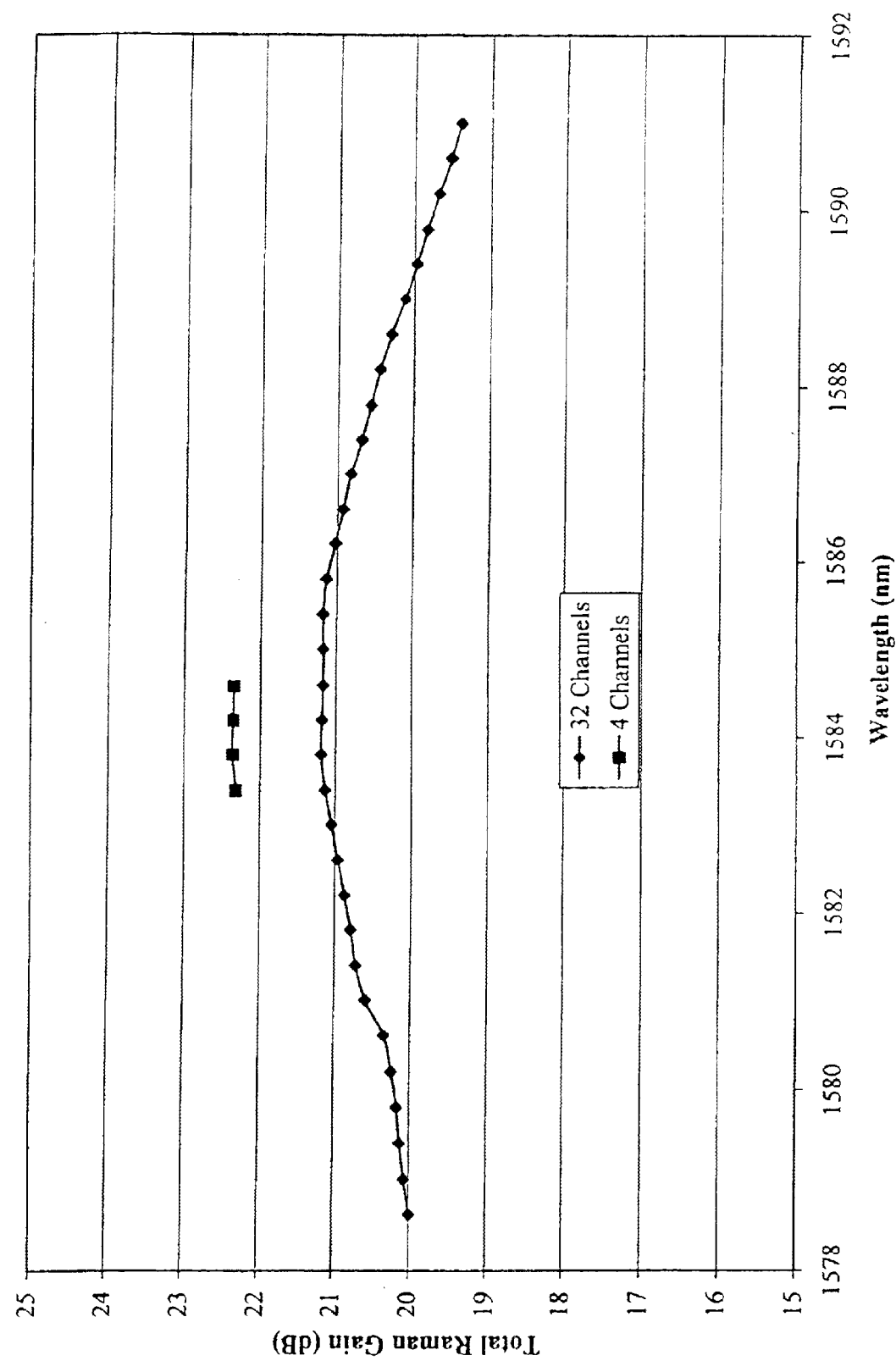
FIG. 41 is a graph showing a bi-directional Raman gain saturation of a 32 channel WDM system and a 4 channel WDM system.

FIG. 41 is a graph showing a bi-directional Raman gain saturation of a 32 channel WDM system and a 4 channel WDM system. A gain saturation of about 1.2 dB is attained with the reduction of 32 channels to 4 channels. Although a 1 dB gain saturation is acceptable in terms of Raman induced cross-talk, this effect is potentially detrimental with respect to fiber nonlinearities, when only a few channels are transmitted over ultra-long-haul WDM systems. In fact even a small power increase per span can accumulate over many spans and induce penalties due to nonlinear effects. The Raman gain control mechanism is also effective in avoiding these penalties. In fact, controlling the counter-propagating Raman pump units enables compensation for the gain saturation that is introduced by the co-propagant Raman pump units.

Figure 42:
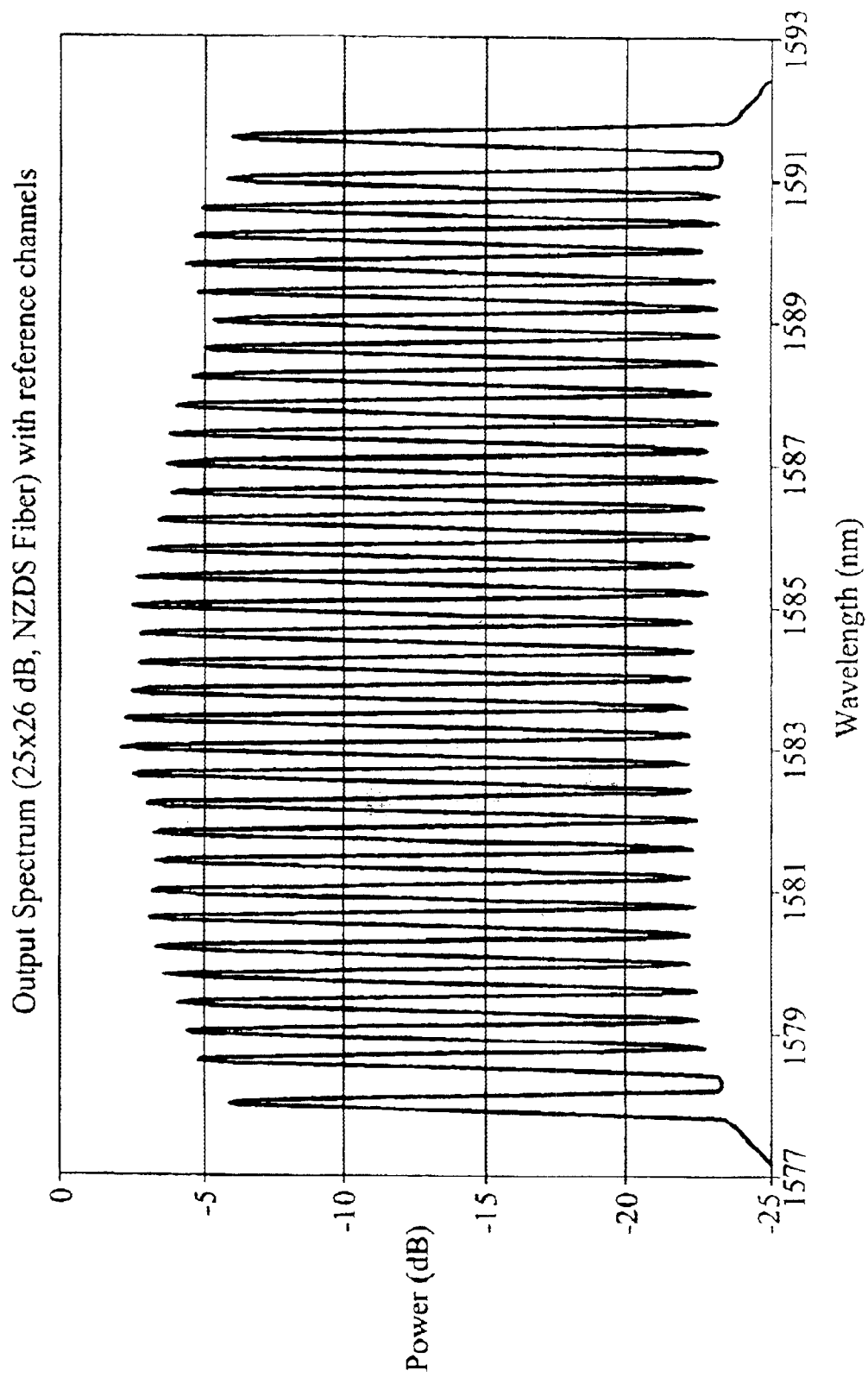
FIG. 42 is a graph of an output spectrum (25×26 dB, bi-directional Raman pumping, non-zero dispersion-shifted fiber) of a WDM system with 32 channels and reference channels regenerated every three spans.
Figure 43:
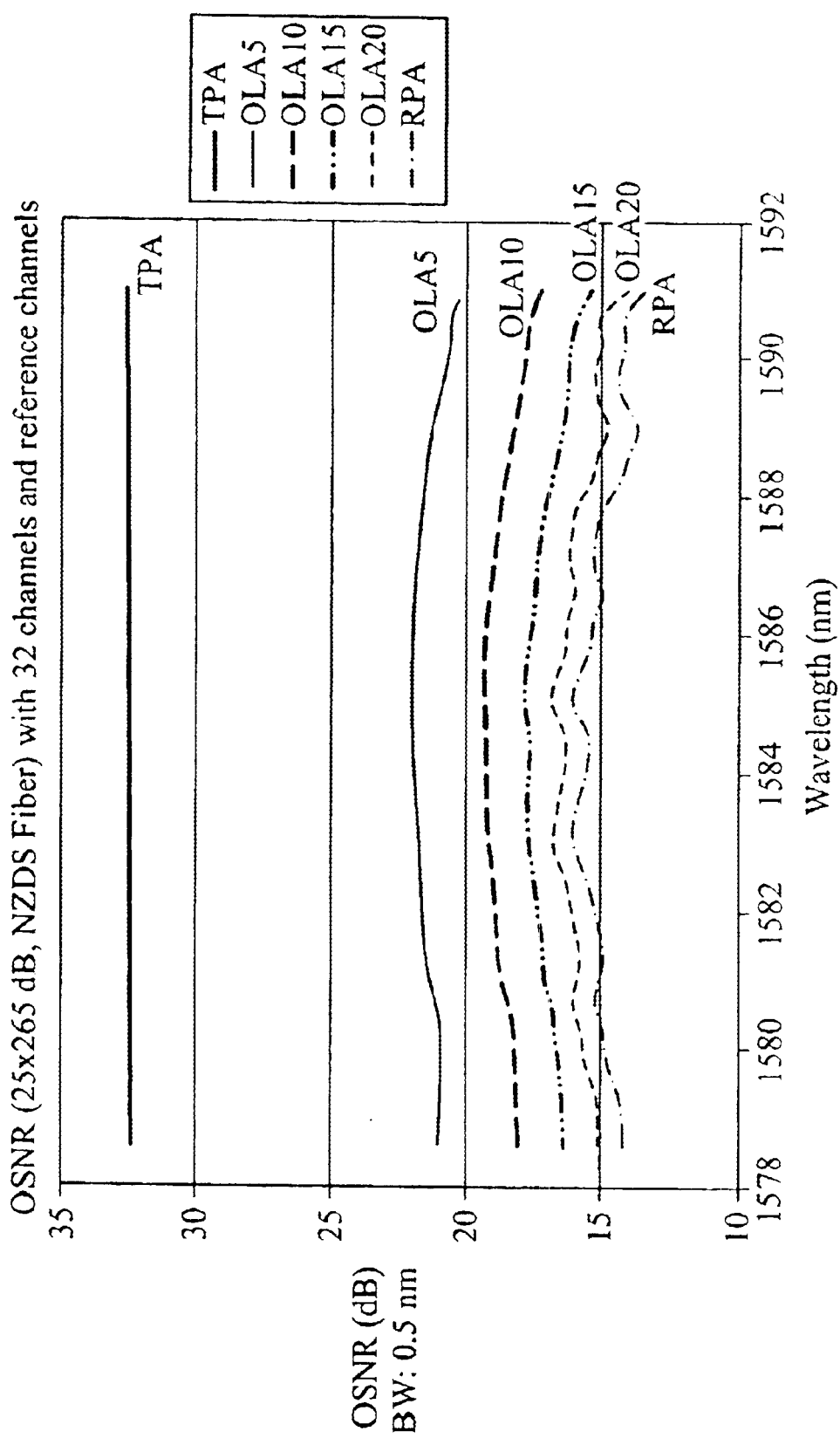
FIG. 43 is a graph of an OSNR (25×26 dB, bi-directional Raman pumping, non-zero dispersion-shifted fiber) of a WDM system with 32 channels and reference channels regenerated every three spans.

FIG. 42 is a graph of an output spectrum (25×26 dB, bi-directional Raman pumping, non-zero dispersion-shifted fiber) of a WDM system with 32 channels and reference channels regenerated every three spans. FIG. 43 is a graph of an OSNR (25×26 dB, bi-directional Raman pumping, non-zero dispersion-shifted fiber) of a WDM system with 32 channels and reference channels regenerated every three spans. In the systems of FIGS. 42 and 43, gain equalizing filters are employed at the line sites that provide extraction and regeneration of the reference signals. It is observed that the OSNR is greater than about 14 dB (0.5 nm) after 25 spans and that the maximum power variation among the channels is about 3 dB.

Figure 44:
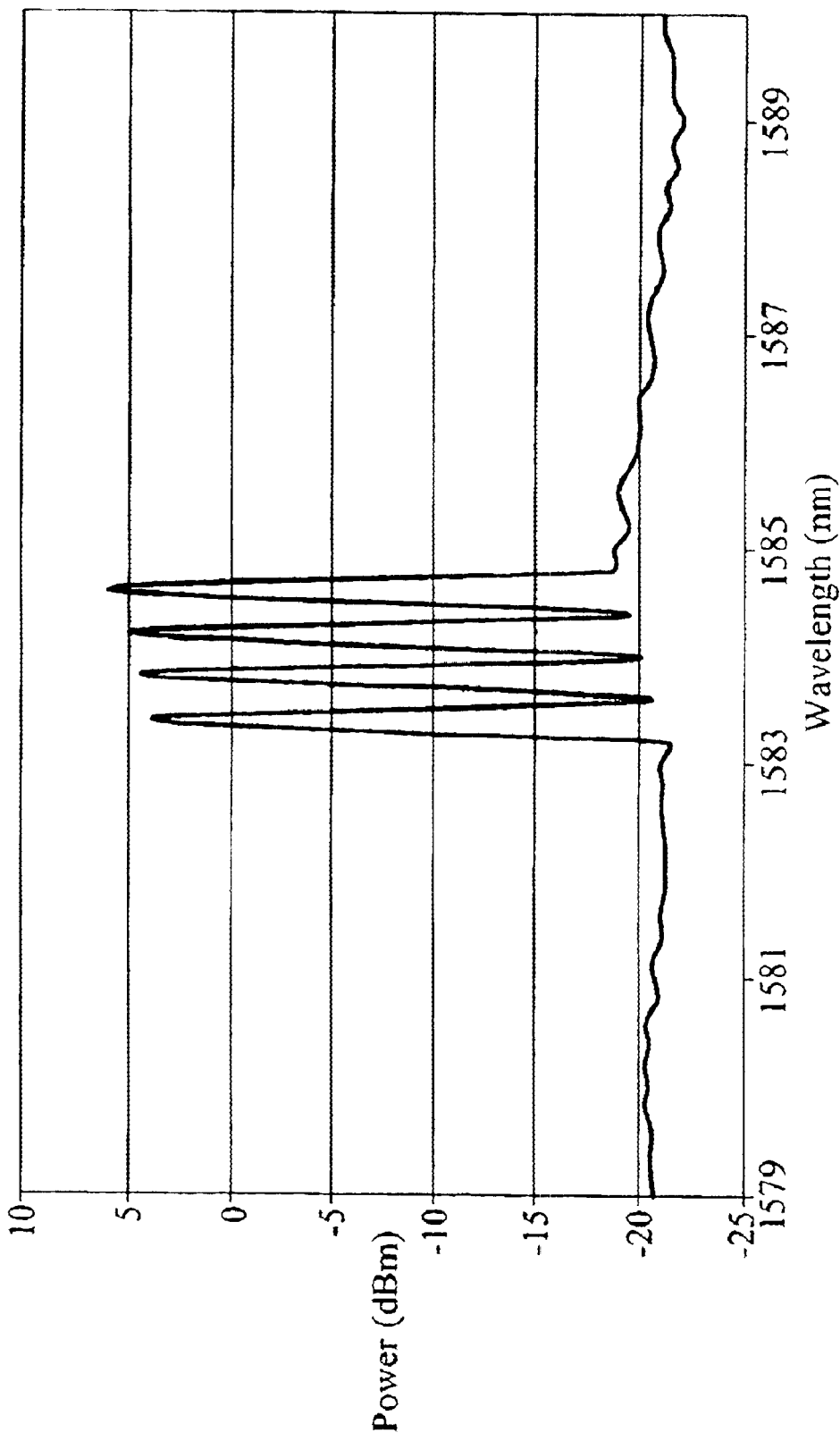
FIG. 44 is a graph of an output spectrum (25×26 dB, bi-directional Raman pumping, non-zero dispersion-shifted fiber) of a WDM system with 4 channels and without Raman gain control.
Figure 45:
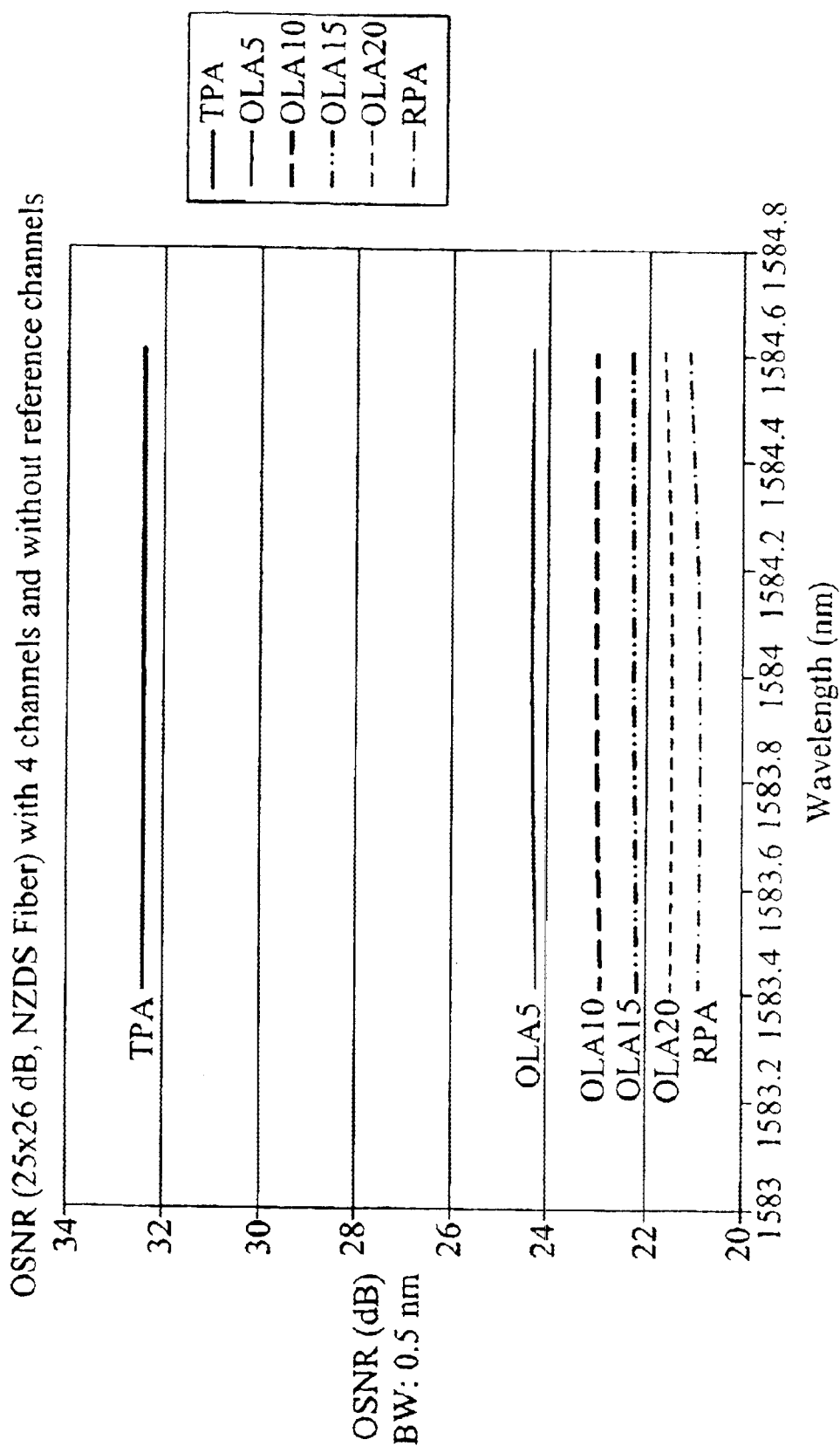
FIG. 45 is a graph of an OSNR (25×26 dB, bi-directional Raman pumping, non-zero dispersion-shifted fiber) of a WDM system with 4 channels and without Raman gain control.

FIGS. 44 and 45 show the output spectrum and OSNR performance of the 4 WDM channels without reference channels. Although the OSNR is improved by about 7 dB, the higher power per channel, which is induced by the co-propagant Raman gain, yields system penalties because of four-wave-mixing and cross-phase modulation. The four-wave-mixing crosstalk at the end of the transmission system is about ×22 dB, while a practical value for error free-transmission is about −30 dB.

Figure 46:
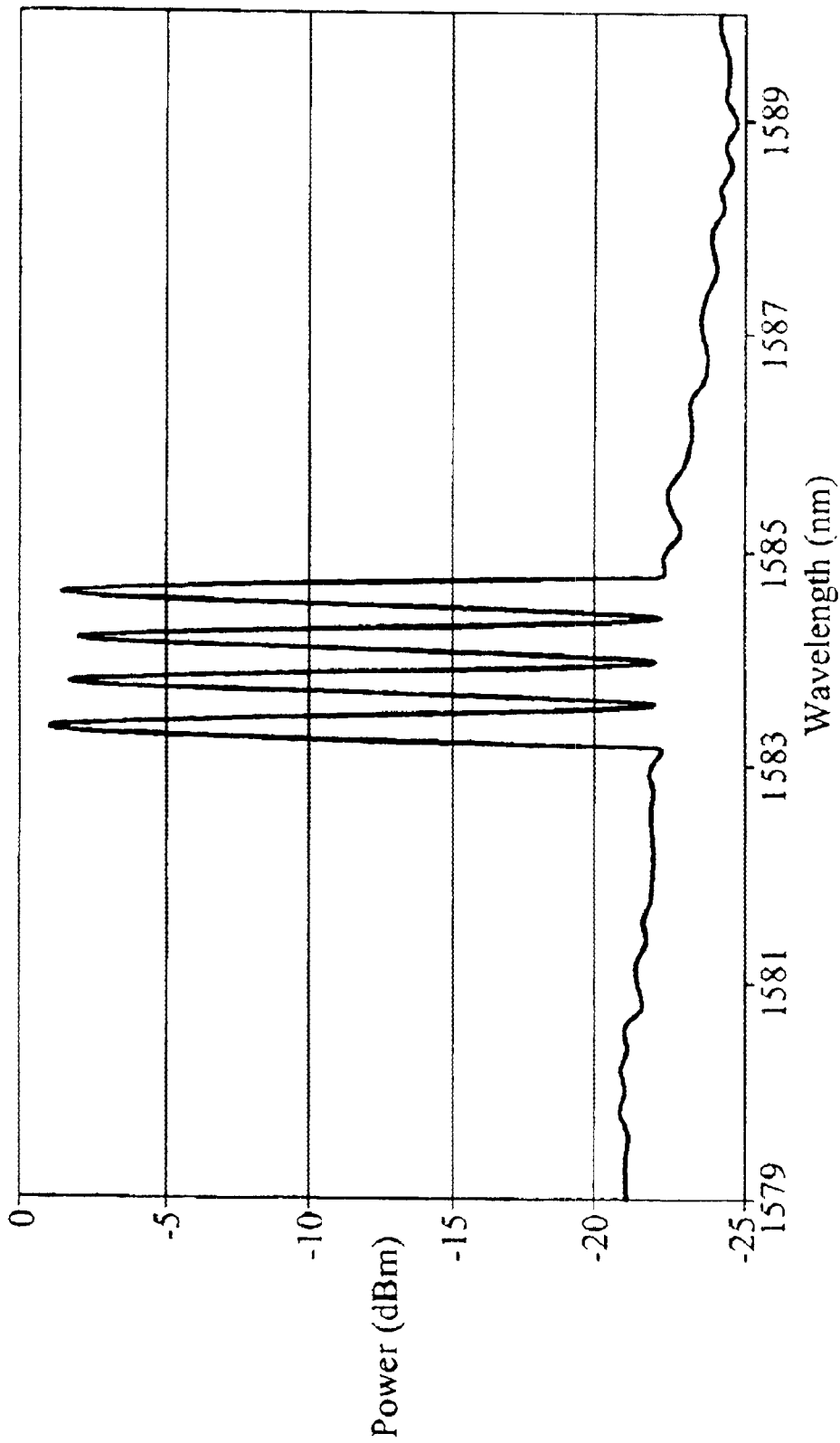
FIG. 46 is a graph of an output spectrum (25×26 dB, bi-directional Raman pumping, non-zero dispersion-shifted fiber) of a WDM system with 4 channels and reference channels regenerated every three spans.
Figure 47:
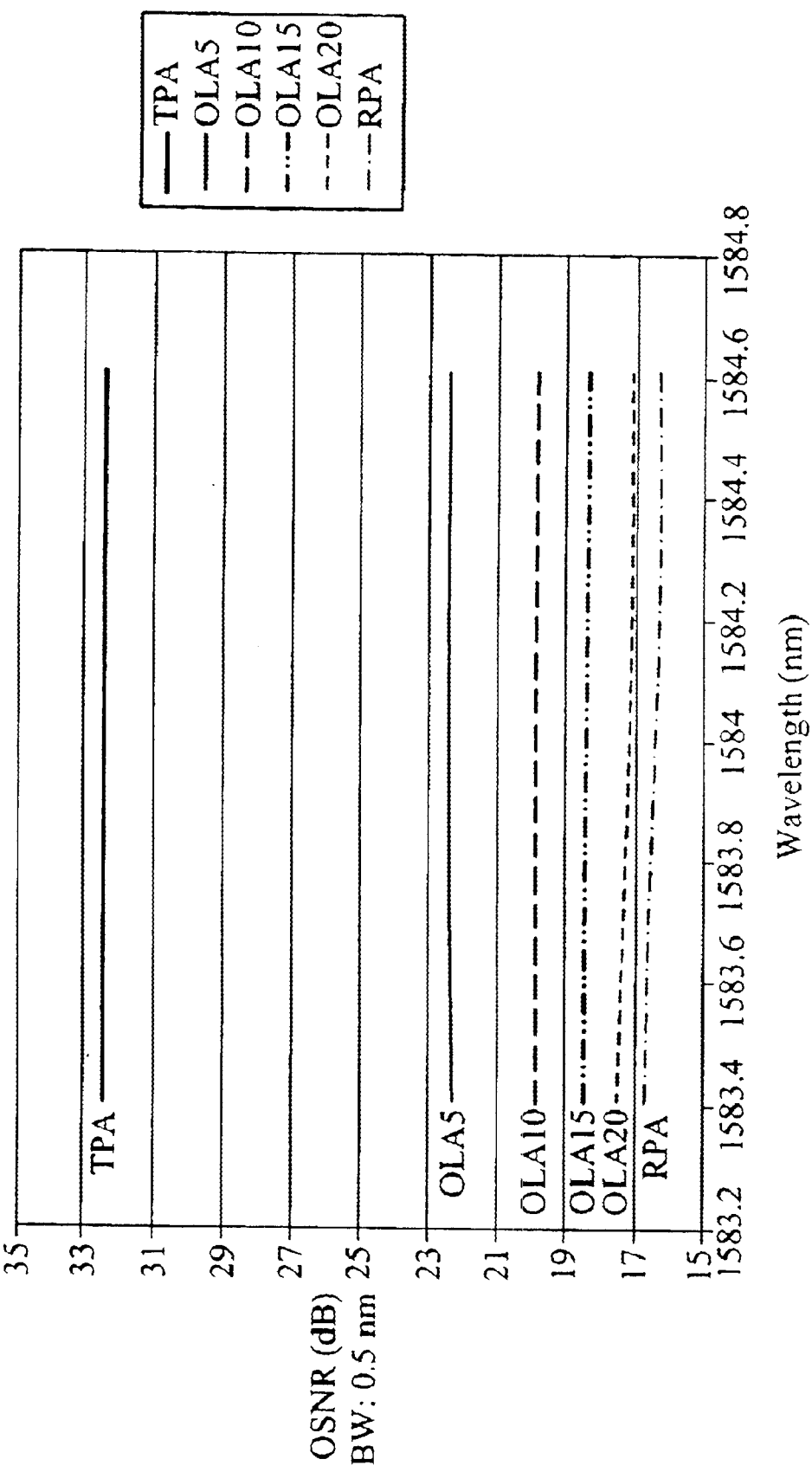
FIG. 47 is a graph of an optical SNR (25×26 dB, bi-directional Raman pumping, non-zero dispersion-shifted fiber) of a WDM system with 4 channels and reference channels regenerated every three spans.

FIG. 46 is a graph of an output spectrum (25×26 dB, bi-directional Raman pumping, non-zero dispersion-shifted fiber) of a WDM system with 4 channels and reference channels regenerated every three spans. FIG. 47 is a graph of an optical SNR (25×26 dB, bidirectional Raman pumping, non-zero dispersion-shifted fiber) of a WDM system with 4 channels and reference channels regenerated every three spans. In this case, the OSNR is improved by about only 2.5 dB, but without a power increase along the transmission fiber or the associated penalties from the non-linear effects. The four-wave-mixing crosstalk is less than about −30 dB at the end of the transmission fiber.

Figure 48:
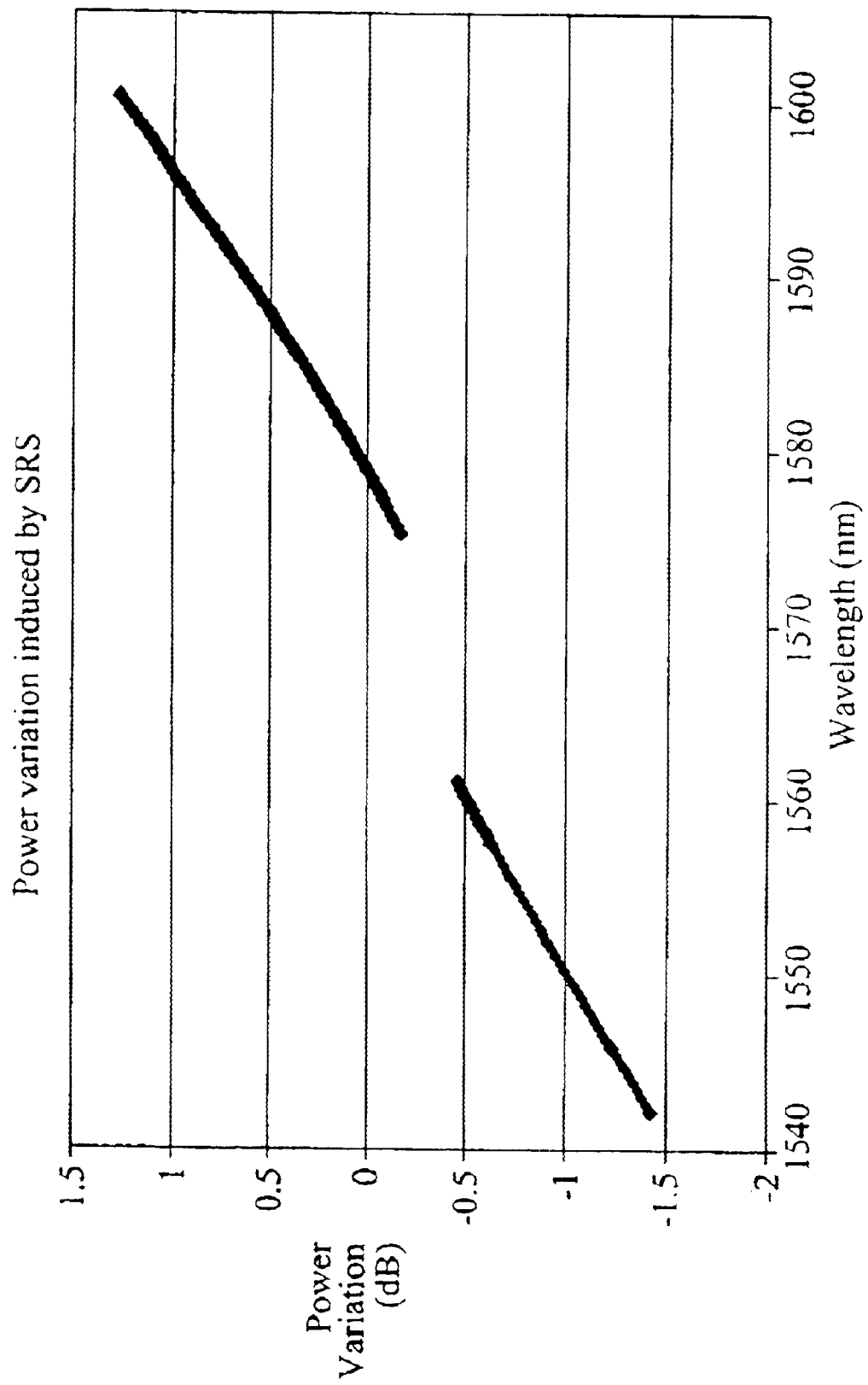
FIG. 48 is a graph of a power variation induced by SRS (Stimulated Raman Scattering) on SMR fiber (C+L Bands) of a WDM system.

FIG. 48 is a graph of a power variation induced by SRS on SMR fiber (C+L Bands), associated with a multi-band system. In multiband systems, additional problems arise that make the transmission over long distances, while maintaining acceptable performance, difficult. First, SRS scattering among the WDM channels impacts their power distribution. This effect causes lower power in the lower wavelength channels, while amplifying the longer wavelengths. The second problem relates to the pump interactions, which occur when several laser diodes are wavelength multiplexed to provide flat gain over wide wavelength regions. This interaction also depends on the configuration of WDM channels and makes difficult the choice of the optimum pump power distribution among the different wavelengths.

These problems are overcome, according to one embodiment of the present invention, by including two reference channels at the boundaries of each system sub-band, and controlling the multi-wavelength counter-propagating Raman pump power that is launched into the fiber.

The use of reference channels also permits automatically setting the pump power to provide flat Raman gain within each band. To illustrate out this feature, a dual-band system (C and L bands) whose structure is shown in FIG. 7b is examined. The system parameters are summarized in Table 3, below.

TABLE 3

| | |
|---|---|
| Maximum number of channels: | 48 + 2 reference channels in C-band |
| | 64 + 2 reference channels in L-band |
| Bit-rate: | 10 Gb/s |
| System bandwidth: | C-band 1542 nm–1560 nm |
| | L-band 1575 nm–1601 nm |
| System capacity: | 1.12 Tb/s |
| Channel spacing: | 50 GHz |
| Span budget: | 20 × 23 dB |
| Raman amplification: | counter-propaganting |
| Pump wavelengths for C-band: | 1435 nm, 1445 nm, 1455 nm |
| Pump wavelengths for L-band: | 1463 nm, 1478 nm, 1493 nm |
| Fiber types: | SMR |

For the purposes of explanation, a single span is considered. Each amplifier in the C- and L-band includes a gain equalizing filter within the pre- and post- amplifiers to ensure acceptable flatness at the system output, given the large bandwidths of the system. Because of the large number of channels, power/channel and band, the system is likely to experience problems associated with intra-band and inter-band SRS. The power variation within a single span induced by this effect, in the absence of distributed Raman pumping, is shown in FIG. 48. The SRS induced tilt causes non uniform power variation. Specifically, the shorter wavelength channels amplify the longer wavelength channels.

Figure 49:
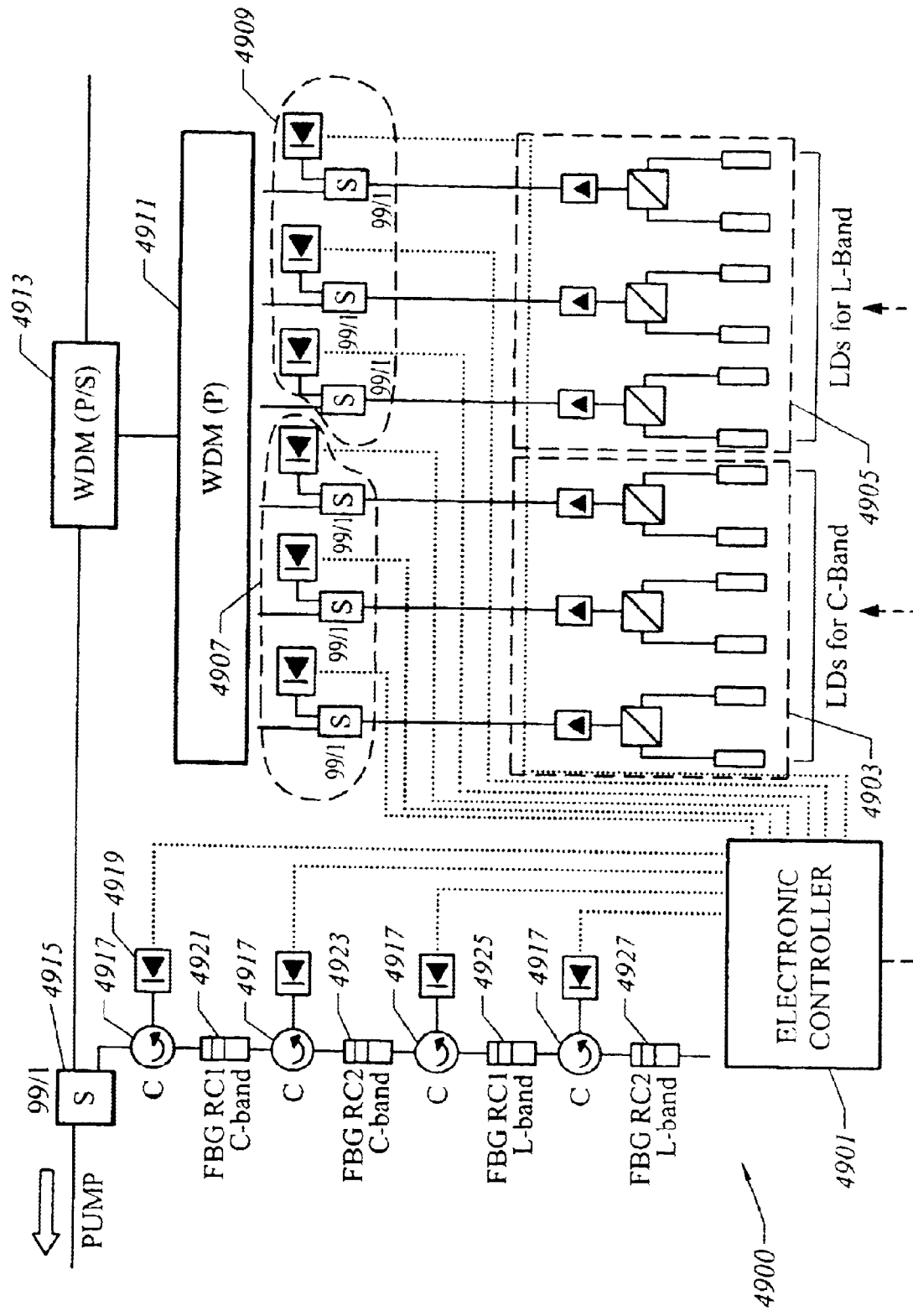
FIG. 49 is a diagram of a counter-propagating RPU unit for dual band WDM systems, according to an embodiment of the present invention.

FIG. 49 is a graph of a schematic structure of counter-propagating RPU unit for dual band WDM systems, according to an embodiment of the present invention. For a dual-band system, a counter-propagant RPU 4900 includes an electronic controller 4901 that controls two sets of pump lasers 4903 and 4905, respectively for each sub-band. Three lasers within each set 4903 and 4905 are controlled by the two reference channels of the C-band and the other three lasers by the reference channels of the L-band. When an upgrade of the system 4900 requires the addition of a new band, all 6 pump lasers in sets 4903 and 4905 are switched on and set at the right power levels to provide flat gain over the entire bandwidth.

Each set of pump lasers 4903 and 4905 along with the corresponding splitters and photodiodes 4907 and 4909, respectively, operate in a similar manner as that of the counter-propagant RPU 1400 of FIG. 14, as previously discussed. The splitters within the sets 4907 and 4909 are connected to a WDM (p) module 4911, with which is coupled to a WDM (P/S) module 4913. The WDM (P/S) module 4913 connects to a splitter 4915. The splitter 4915 is connected to a series of cascaded optical circulators 4917, which are coupled to photodiodes 4919. The photodiodes 4919 are driven by the electronic controller 4901. For each sub-band, a pair of FBGs 4921 and 4925 corresponding to each of the reference control channels, RC1 and RC2 are provided. In particular, FBG 4921 filters RC1 for the C-band; FBG 4923 filters the RC2 signal within this band. With respect to the L-band, FBG 4925 filters the RC1, while FBG 4927 filters RC2.

FIG. 50 is a graph of the Raman gain for dual-band and single-band WDM systems. FIG. 50 compares the Raman gain for the two combined bands and for the two bands considered separately. The pump powers for each laser diode are shown in Table 4, according to one embodiment of the present invention:

TABLE 5

| C-band: | 1435 nm: 140 mW |
| --- | --- |
|  | 1445 nm: 110 mW |
|  | 1455 nm: 150 mW |
| L-band: | 1463 nm: 200 mW |
|  | 1478 nm: 90 mW |
|  | 1493 nm: 180 mW |
| C + L-bands: | 1435 nm: 200 mW |
|  | 1445 nm: 110 mW |
|  | 1455 nm: 70 mW |
|  | 1463 nm: 40 mW |
|  | 1478 nm: 90 mW |
|  | 1493 nm: 135 mW |

FIG. 51 is a graph of a comparison of Raman gain for dual-band WDM systems. FIG. 51 shows a comparison of the Raman gain obtained using the optimized pump power distribution for C+L bands and the Raman gain which would be obtained by using the pump power levels required in case of separated bands. As seen in FIG. 51, there exists a strong correlation in the power among the 6 laser diodes, in case of dual-band system.

The techniques described herein provide several advantages over prior approaches to controlling tilt. A DRA amplifies multi-wavelength light in counter-propagant direction; the DRA is controlled to reduce the power level deviation of two reference channels of each sub-band and to control the absolute power levels of these two reference channels. A counter-propagant optical Raman pumping unit and a gain controlled EDFA is deployed between a transmitting station and a receiving station; the pump of the Raman amplifier is electronically controlled either locally or from a remote location. The system has light sources which generate multi-wavelength counter-propagating pump light and are positioned within each line site and receiving terminal. Each pump light source has a control circuit, which sets the pump light to adjust the light level of the two reference channels at the input of each EDFA. The system may also include co-propagant optical Raman pumping units that reside within the transmitting station and within each line terminal. The above approach advantageously enhances transmission capacity of a WDM system.

Obviously, numerous modifications and variations of the present invention are possible in light of the above teachings. It is therefore to be understood that within the scope of the appended claims, the invention may be practiced otherwise than as specifically described herein.

What is claimed is:

1. A method of providing automatic gain and tilt control in a WDM (wavelength division multiplexing) optical communication system, the method comprising:

receiving over an optical fiber at least one sub-band of WDM signals and first and second reference signals, the first reference signal at a first boundary of the sub-band and the second reference signal at a second boundary of the sub-band;

detecting the first and second reference signals;

analyzing the reference signals to determine power variation of the reference signals;

outputting a control signal to compensate for losses and gain tilt accumulation in the sub-band associated with the optical fiber based upon the analyzing step; and controlling an optical gain unit in response to the control signal.

2. The method according to claim 1, wherein the optical gain unit in the controlling step is a Raman pump unit, the method further comprising:

injecting a counter-propagant pump light by the Raman pump unit into the optical fiber in response to the control signal.

3. The method according to claim 2, further comprising:

injecting a co-propagant pump light into the optical fiber by another Raman pump unit.

4. The method according to claim 2, wherein the counter-propagant pump light in the injecting step is produced by the optical gain unit having a plurality of laser diodes generating a plurality of output lights of different wavelengths, the output lights being multiplexed.

5. The method according to claim 1, wherein the analyzing step comprises:

determining a relative power difference between the reference signals.

6. The method according to claim 1, wherein the analyzing step comprises:

determining an average power of the reference signals.

7. The method according to claim 1, wherein the analyzing step comprises:

generating voltages corresponding to the reference signals;

comparing the generated voltages to a reference voltage; and determining whether the reference signals are degraded based upon the comparing step.

8. The method according to claim 7, further comprising:

outputting an alarm signal based upon determining that one of the reference signals is degraded.

9. The method according to claim 1, further comprising:

extracting and regenerating the reference signals.

10. The method according to claim 1, wherein the receiving step comprises receiving over the optical fiber first and second sub-bands of WDM signals, and first and second reference signals for each sub-band, the first reference signal at a first boundary of its sub-band and the second reference signal at a second boundary of its sub-band.

11. The method of claim 10, wherein the first sub-band is part of C-band, and the second sub-band is part of L-band.

12. The method of claim 1, wherein the reference signals are part of the sub-band.

13. A WDM (wavelength division multiplexing) optical communication system for providing automatic gain and tilt control, comprising:

an optical fiber that carries at least one sub-band of WDM optical signals, a first reference signal at a first boundary of the sub-band, and a second reference signal at a second boundary of the sub-band;

an optical gain unit coupled to the optical fiber and configured to output lights to compensate for losses and gain tilt accumulation in the sub-band; and a controller configured to control the optical gain unit, the controller detecting and analyzing the reference signals to determine power variation of the reference signals, wherein the controller outputs a control signal to the optical gain unit based upon the analyzed reference signals.

14. The system according to claim 13, wherein the optical gain unit comprises a Raman pump unit that is configured to inject a counter-propagant pump light into the optical fiber.

15. The system according to claim 14, further comprising: another Raman pump unit coupled to the optical fiber and configured to inject a co-propagant pump light into the optical fiber.

16. The system according to claim 14, wherein the Raman pump unit is located remotely from the controller.

17. The system according to claim 14, wherein the controller is collocated with the Raman pump unit.

18. The system according to claim 14, wherein the Raman pump unit comprises:
a plurality of laser diodes that are individually controlled to output a plurality of output signals of different wavelengths, the output signals being multiplexed.

19. The system according to claim 13, wherein the reference signals are part of the sub-band.

20. The system according to claim 13, wherein the controller is configured to compute a relative power difference between the reference signals.

21. The system according to claim 13, wherein the controller is configured to determine an average power of the reference signals.

22. The system according to claim 13, wherein the controller is configured to generate voltages corresponding to the reference signals and to compare the generated voltages to a reference voltage to determine whether the reference signals are degraded.

23. The system according to claim 13, wherein the controller is configured to output an alarm signal based upon determining that one of the reference signals is degraded.

24. The system according to claim 13, further comprising:
an optical service channel (OSC) unit configured to extract and regenerate the reference signals, wherein the controller resides within the OSC unit.

25. The system according to claim 13, further comprising:
an extraction and regeneration circuit configured to extract and regenerate the reference signals, wherein the controller computes relative power difference and average power of the reference signals.

26. The system according to claim 13, wherein the optical fiber carries first and second sub-bands of WDM optical signals, a first reference signal at a first boundary of each sub-band and a second reference signal at a second boundary of each sub-band.

27. The system of claim 26, wherein the first sub-band is part of C-band, and the second sub-band is part of L-band.

28. The system of claim 13 further comprising an optical amplifier coupled to the optical fiber and configured to amplify the WDM optical signals, the optical gain unit providing a constant power per channel at an input of the optical amplifier.

29. The system according to claim 28, wherein the optical amplifier is an Erbium Doped Fiber Amplifier (EDFA).

30. An optical device for providing automatic gain and tilt control in a WDM (wavelength division multiplexing) optical communication system, comprising:
plan input coupled to an optical fiber carrying at least one sub-band of WDM optical signals and reference signals at the boundaries of the sub-band, the input receiving the reference signals;
a plurality of photodiodes configured to convert the reference signals to corresponding electrical signals; and
a controller coupled to the photodiodes and configured to output a control signal to at least one Raman pump unit and a variable optical attenuator to compensate for gain tilt and gain variation based upon the reference signals.

31. The device according to claim 30, wherein the Raman pump unit is configured to inject a counter-propagant pump light into the optical fiber.

32. The device of claim 31, further comprising a variable optical attenuator configured to control power from the optical fiber injected by the counter-propagant pump light from the Raman pump unit into an Erbium doped fiber amplifier.

33. The device according to claim 30, wherein the reference signals are part of the sub-band.

34. The device according to claim 30, wherein the controller is configured to determine a relative power difference between the reference signals.

35. The device according to claim 30, wherein the controller is configured to determine an average voltage of the reference signals and to compare the determined average voltage to a reference voltage.

36. The device according to claim 30, wherein the controller is configured to generate voltages of the electrical signals corresponding to the reference signals and to compare the generated voltages to a reference voltage to determine whether the reference signals are degraded.

37. The device according to claim 36, wherein the controller is configured to output an alarm signal based upon determining that one of the reference signals is degraded.

38. The device according to claim 30, further comprising:
an extraction and regeneration circuit configured to extract and regenerate the reference signals.

39. The device according to claim 30, wherein the optical fiber carries first and second sub-bands of WDM optical signals, and reference signals at the boundaries of each sub-band.

40. The device of claim 39, wherein a first sub-band is part of C-band, and a second sub-band is part of L-band.

41. A WDM (wavelength division multiplexing) optical communication system for providing automatic gain and tilt control, comprising:
an optical fiber that carries at least one sub-band of WDM optical signals and reference signals at the boundaries of the sub-band;
a light emitting means coupled to the optical fiber for outputting lights to compensate for losses and gain tilt accumulation;
a controlling means for controlling the light emitting means, the controlling means detecting and analyzing the reference signals to determine power variation of the reference signals, the controlling means outputting a control signal to the optical gain unit based upon the analyzed reference signals.

42. The system according to claim 41, wherein the light emitting means includes a Raman pump unit that injects a counter-propagant pump light into the optical fiber.

43. The system according to claim 42, wherein the Raman pump unit is located remotely from the controlling means.

44. The system according to claim 42, wherein the controlling means is collocated with the Raman pump unit.

45. The system according to claim 42, wherein the Raman pump unit comprises:

a plurality of laser diodes that are individually controlled to output a plurality of output signals at different wavelengths, the output signals being multiplexed.

46. The system according to claim 41, further comprising:

another light emitting means that includes a Raman pump unit that injects a co-propagant pump light into the optical fiber.

47. The system according to claim 41, wherein the reference signals are part of the sub-band.

48. The system according to claim 41, wherein the controlling means determines a relative power difference between the reference signals.

49. The system according to claim 41, wherein the controlling means determines an average voltage of the reference signals and compares the computed average voltage to a reference voltage.

50. The system according to claim 41, wherein the controlling means generates voltages corresponding to the reference signals and compares the generated voltages to a reference voltage to determine whether the reference signals are degraded.

51. The system according to claim 41, wherein the controlling means outputs an alarm signal based upon determining that one of the reference signals is degraded.

52. The system according to claim 41, further comprising:

an optical service channel (OSC) unit configured to extract and regenerate the reference signals, wherein the controlling means resides within the OSC unit.

53. The system according to claim 41, the system further comprising:

extraction and regeneration means for extracting and regenerating the reference signals, wherein the controlling means computes relative power difference and average power of the reference signals.

54. The system according to claim 41, wherein the optical fiber carries first and second sub-bands of WDM optical signals, and reference signals at the boundaries of each sub-band.

55. The system of claim 54, wherein a first sub-band is part of C-band, and a second sub-band is part of L-band.

56. The system of claim 41, further comprising an amplifying means coupled to the optical fiber for amplifying the optical signals, wherein the light emitting means provides a constant power per channel at an input of the amplifying means.

57. The system according to claim 56, wherein the amplifying means is an Erbium Doped Fiber Amplifier (EDFA).

* * * * *